US011330212B2

(12) United States Patent
Kawazu et al.

(10) Patent No.: US 11,330,212 B2
(45) Date of Patent: May 10, 2022

(54) IMAGING DEVICE AND DIAGNOSIS METHOD

(71) Applicant: SONY SEMICONDUCTOR SOLUTIONS CORPORATION, Kanagawa (JP)

(72) Inventors: Naoki Kawazu, Kanagawa (JP); Keita Sasaki, Kanagawa (JP); Takumi Oka, Kanagawa (JP); Mohammad Munirul Haque, San Jose, CA (US); Yuichi Motohashi, Tokyo (JP); Atsushi Suzuki, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 3 days.

(21) Appl. No.: 16/956,810

(22) PCT Filed: Oct. 15, 2018

(86) PCT No.: PCT/JP2018/038300
§ 371 (c)(1),
(2) Date: Jun. 22, 2020

(87) PCT Pub. No.: WO2019/130731
PCT Pub. Date: Jul. 4, 2019

(65) Prior Publication Data
US 2020/0404204 A1 Dec. 24, 2020

Related U.S. Application Data

(60) Provisional application No. 62/611,118, filed on Dec. 28, 2017.

(51) Int. Cl.
*H04N 5/369* (2011.01)
*H04N 5/359* (2011.01)
(Continued)

(52) U.S. Cl.
CPC ....... *H04N 5/36961* (2018.08); *H04N 5/3591* (2013.01); *H04N 5/378* (2013.01); *H04N 5/37457* (2013.01)

(58) Field of Classification Search
CPC ............. H04N 5/36961; H04N 5/3591; H04N 5/37457; H04N 5/378; H04N 5/3675; H04N 5/3696; H04N 9/04557; H04N 5/35563
See application file for complete search history.

(56) References Cited

U.S. PATENT DOCUMENTS

| 2004/0145664 | A1* | 7/2004 | Kobayashi | H04N 5/367 348/246 |
| 2011/0141333 | A1* | 6/2011 | Naruse | H04N 5/35563 348/308 |
| 2014/0146218 | A1* | 5/2014 | Kunieda | H04N 5/232122 348/345 |
| 2014/0320711 | A1* | 10/2014 | Fukuda | H01L 27/14627 348/294 |

(Continued)

FOREIGN PATENT DOCUMENTS

| CN | 102104053 A | 6/2011 |
| CN | 107409179 A | 11/2017 |

(Continued)

OTHER PUBLICATIONS

International Search Report and Written Opinion of PCT Application No. PCT/JP2018/038300, dated Dec. 6, 2018, 12 pages of ISRWO.

*Primary Examiner* — Nhan T Tran
(74) *Attorney, Agent, or Firm* — Chip Law Group

(57) ABSTRACT

An imaging device according to the present disclosure includes a plurality of pixels each including a first light-receiving element and a second light-receiving element, the plurality of pixels including a first pixel. The imaging device further includes a generating section that generates a first detection value on a basis of a light-receiving result by the first light-receiving element of each of the plurality of pixels, and generates a second detection value on a basis of a (Continued)

light-receiving result by the second light-receiving element of each of the plurality of pixels. The imaging device further includes a diagnosis section that performs a diagnosis processing on a basis of a detection ratio that is a ratio between the first detection value and the second detection value in the first pixel.

18 Claims, 29 Drawing Sheets

(51) Int. Cl.
*H04N 5/3745* (2011.01)
*H04N 5/378* (2011.01)

(56) References Cited

U.S. PATENT DOCUMENTS

| | | |
|---|---|---|
| 2016/0198105 A1 | 7/2016 | Kawai et al. |
| 2017/0085849 A1* | 3/2017 | Jeong .................. H04N 5/3653 |
| 2018/0241955 A1 | 8/2018 | Sakano et al. |

FOREIGN PATENT DOCUMENTS

| | | |
|---|---|---|
| JP | 2003-259220 A | 9/2003 |
| JP | 5454894 B2 | 3/2014 |
| JP | 5158340 B2 | 7/2017 |
| TW | 201143050 A | 12/2011 |
| WO | 2015/045785 A1 | 4/2015 |
| WO | 2016/147885 A1 | 9/2016 |

* cited by examiner

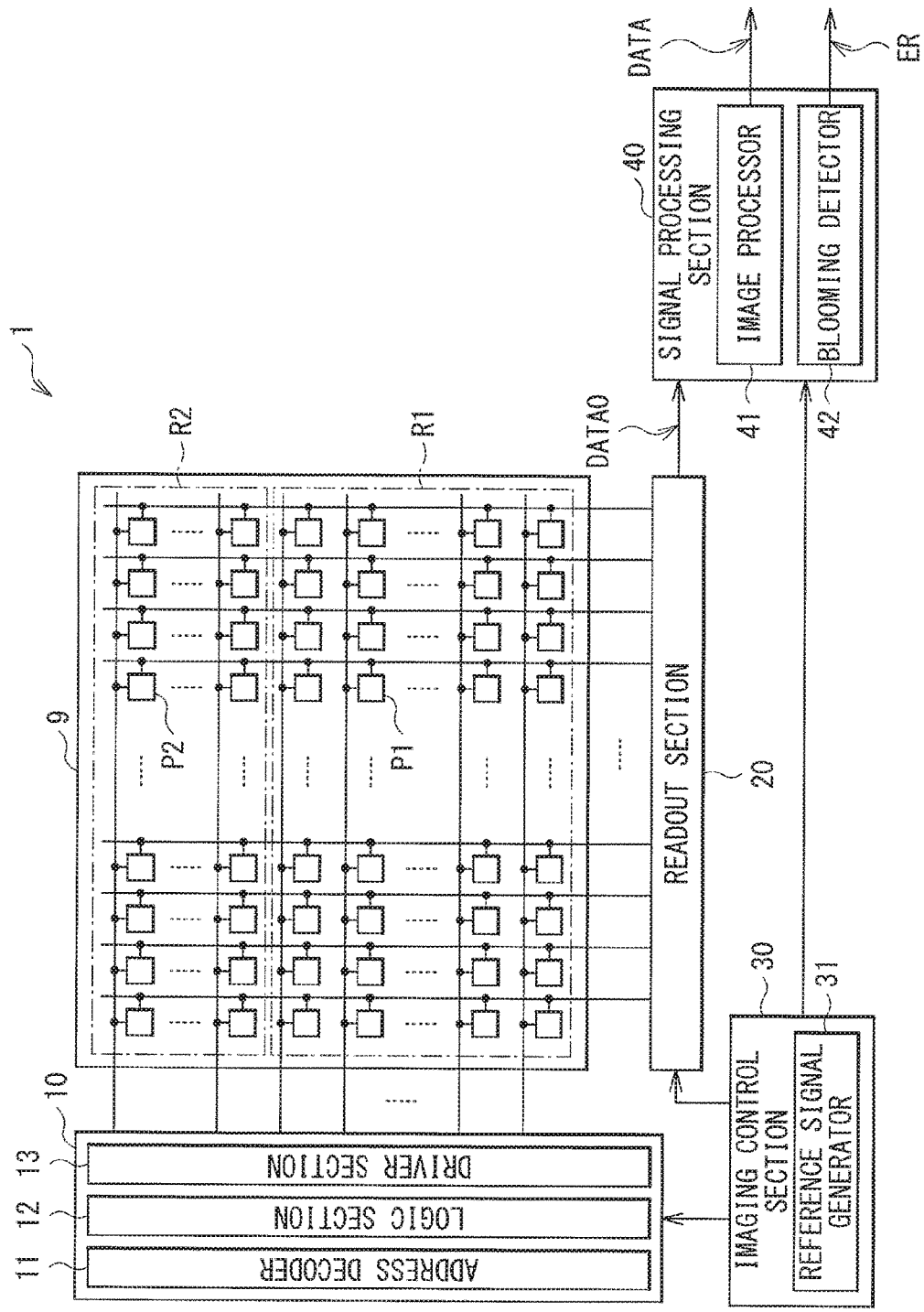
[FIG. 1]

[FIG. 2]
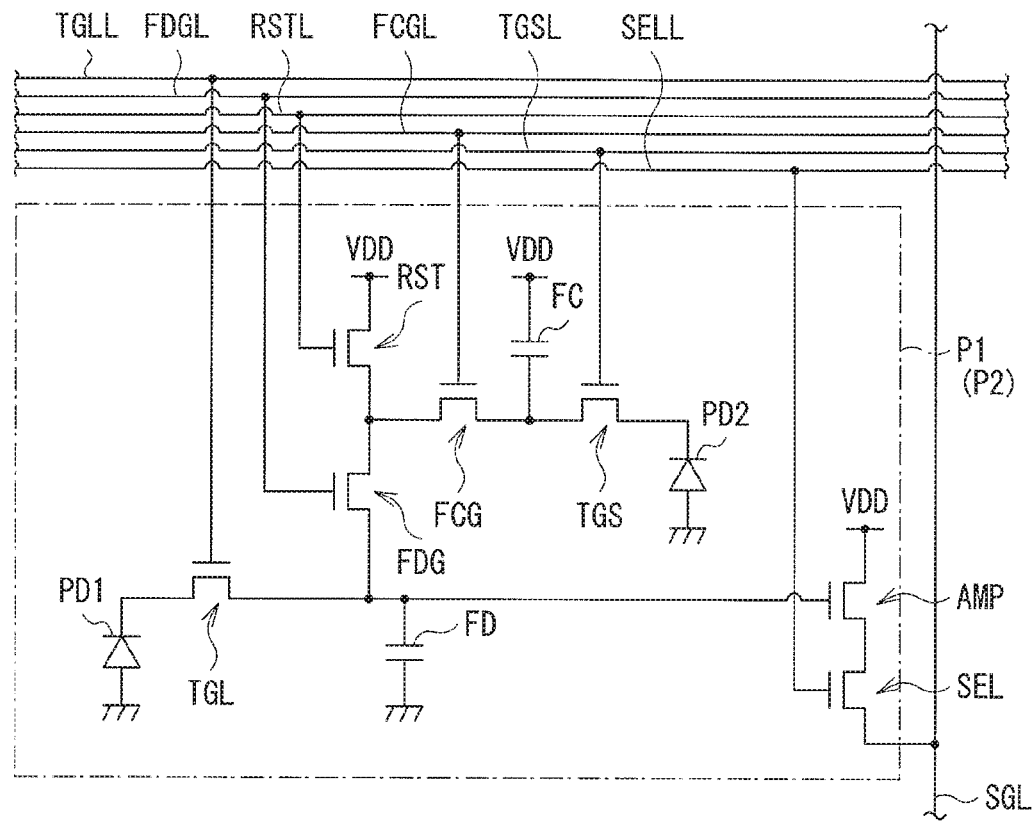
[FIG. 3]
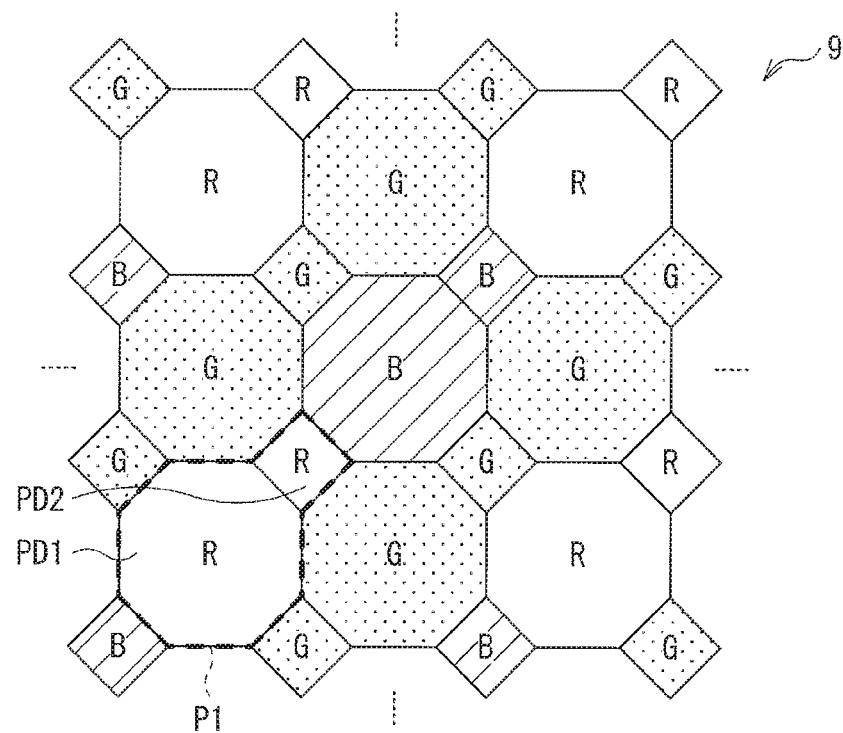

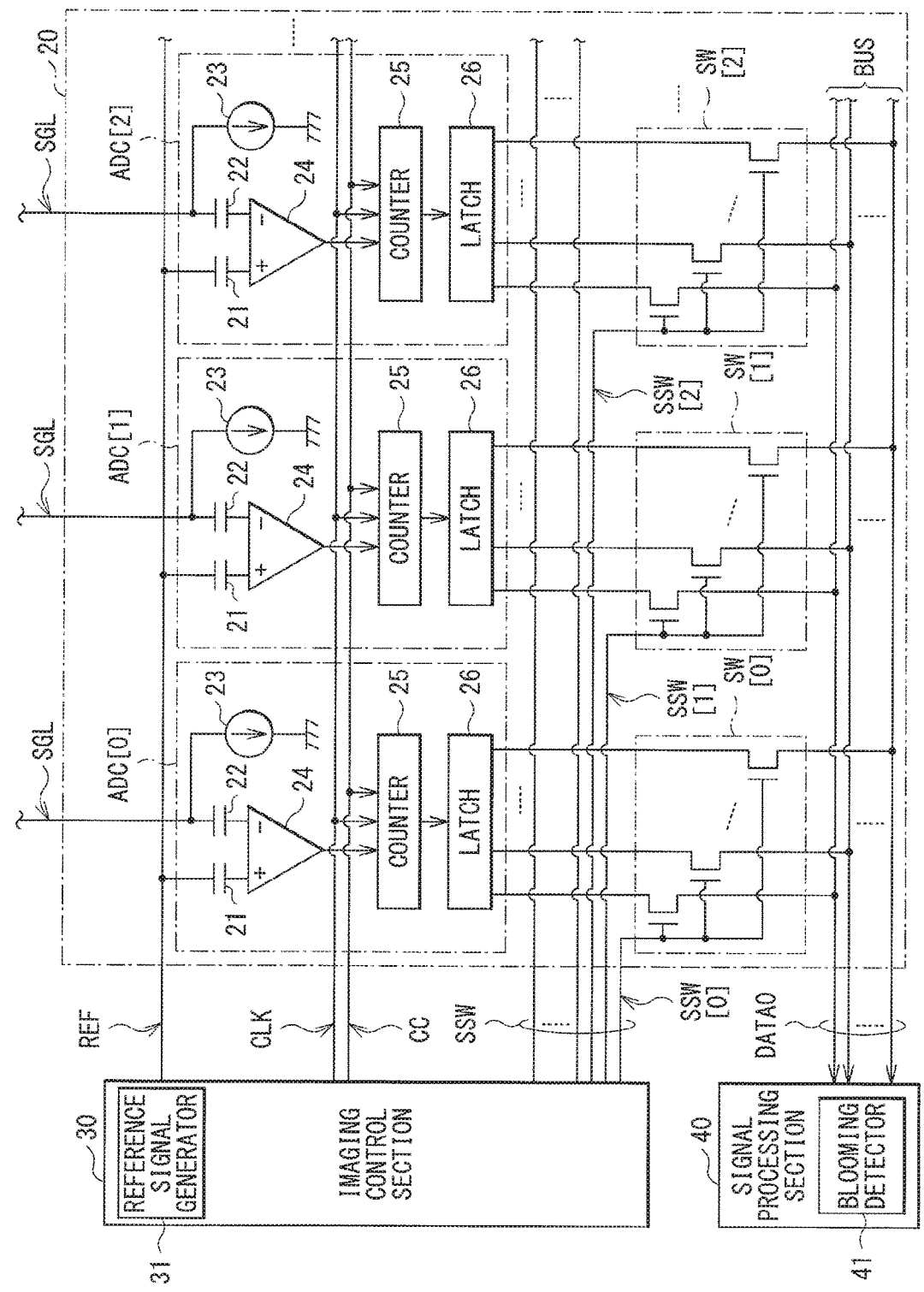
[FIG. 4]

[FIG. 5A]
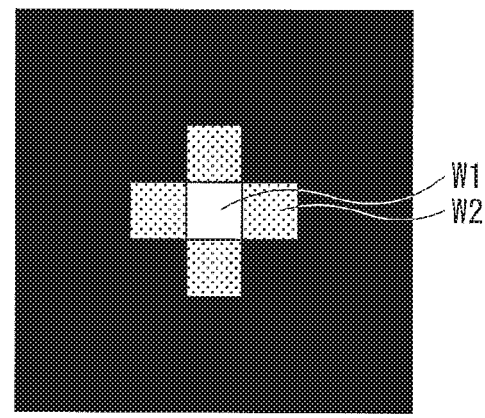
[FIG. 5B]
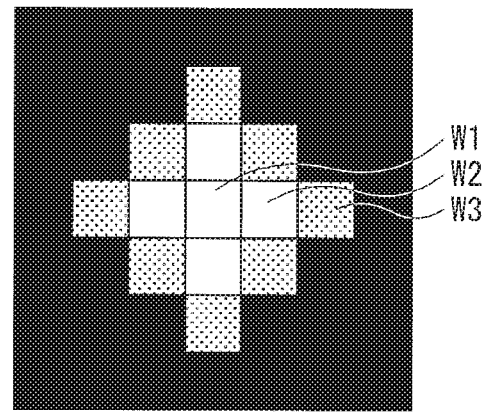
[FIG. 5C]
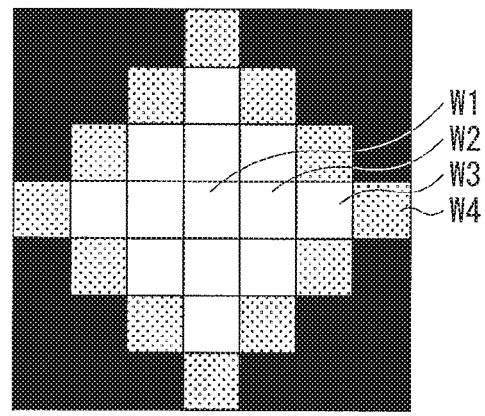

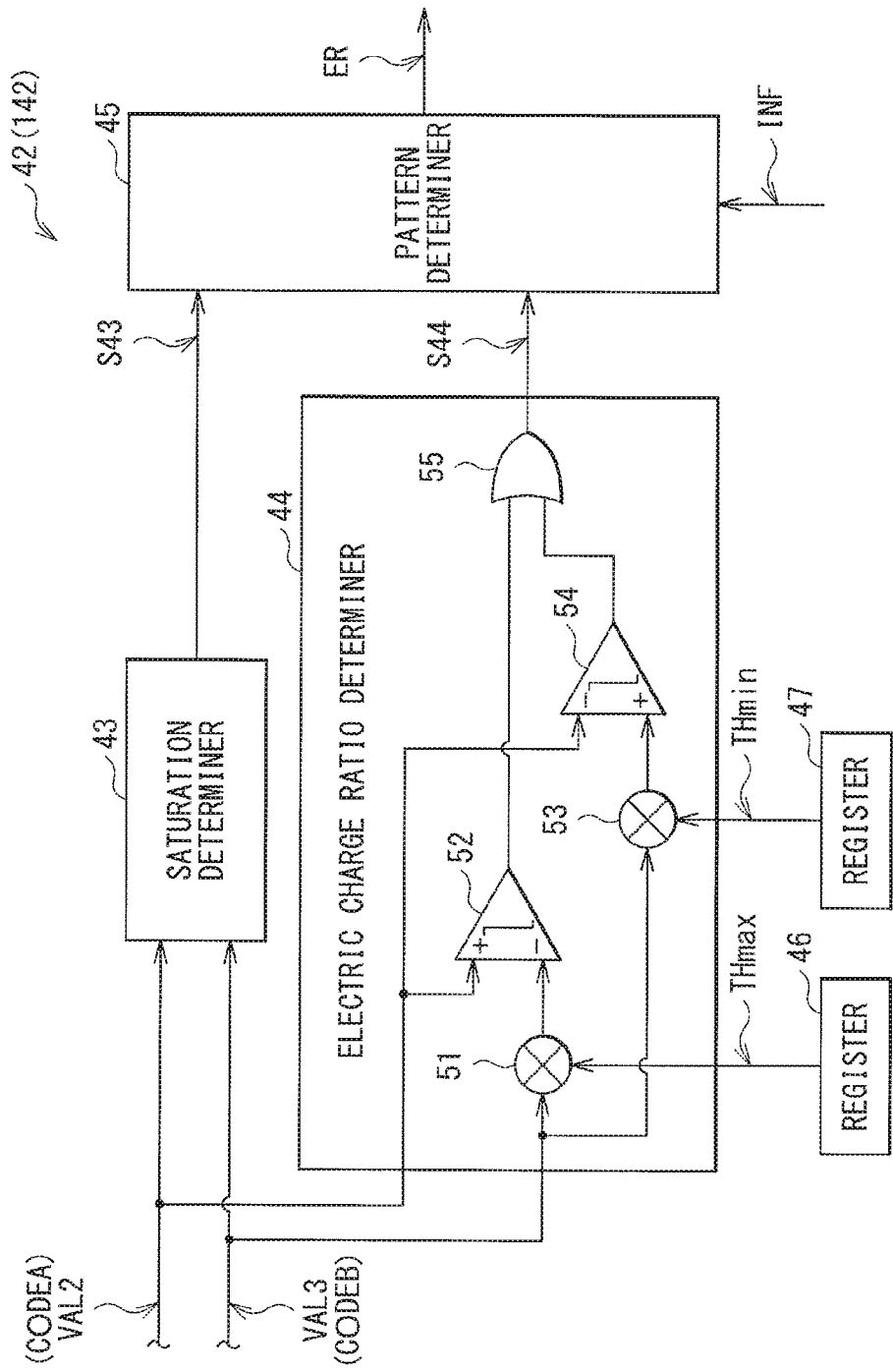

[FIG. 7]
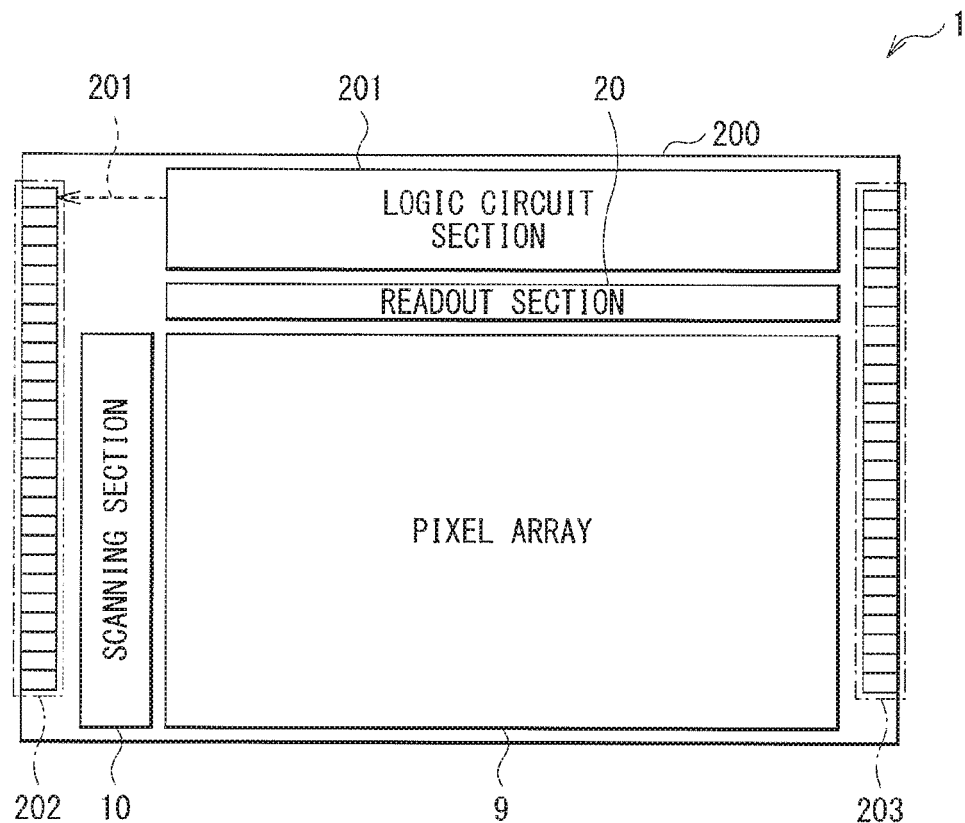
[FIG. 8]
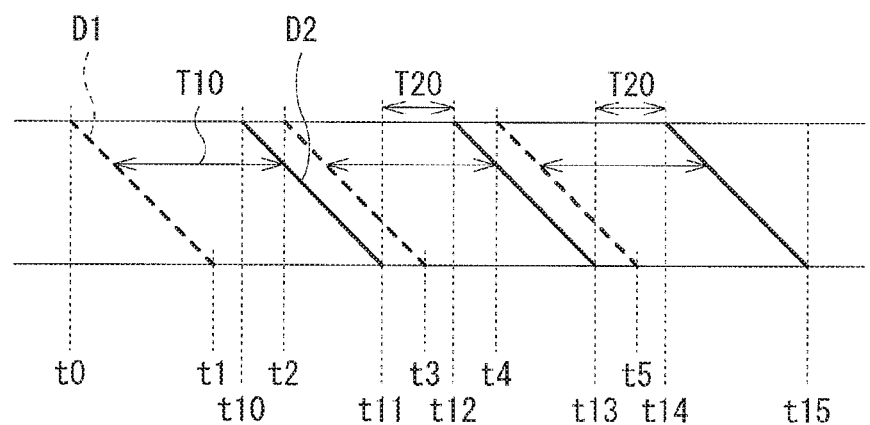

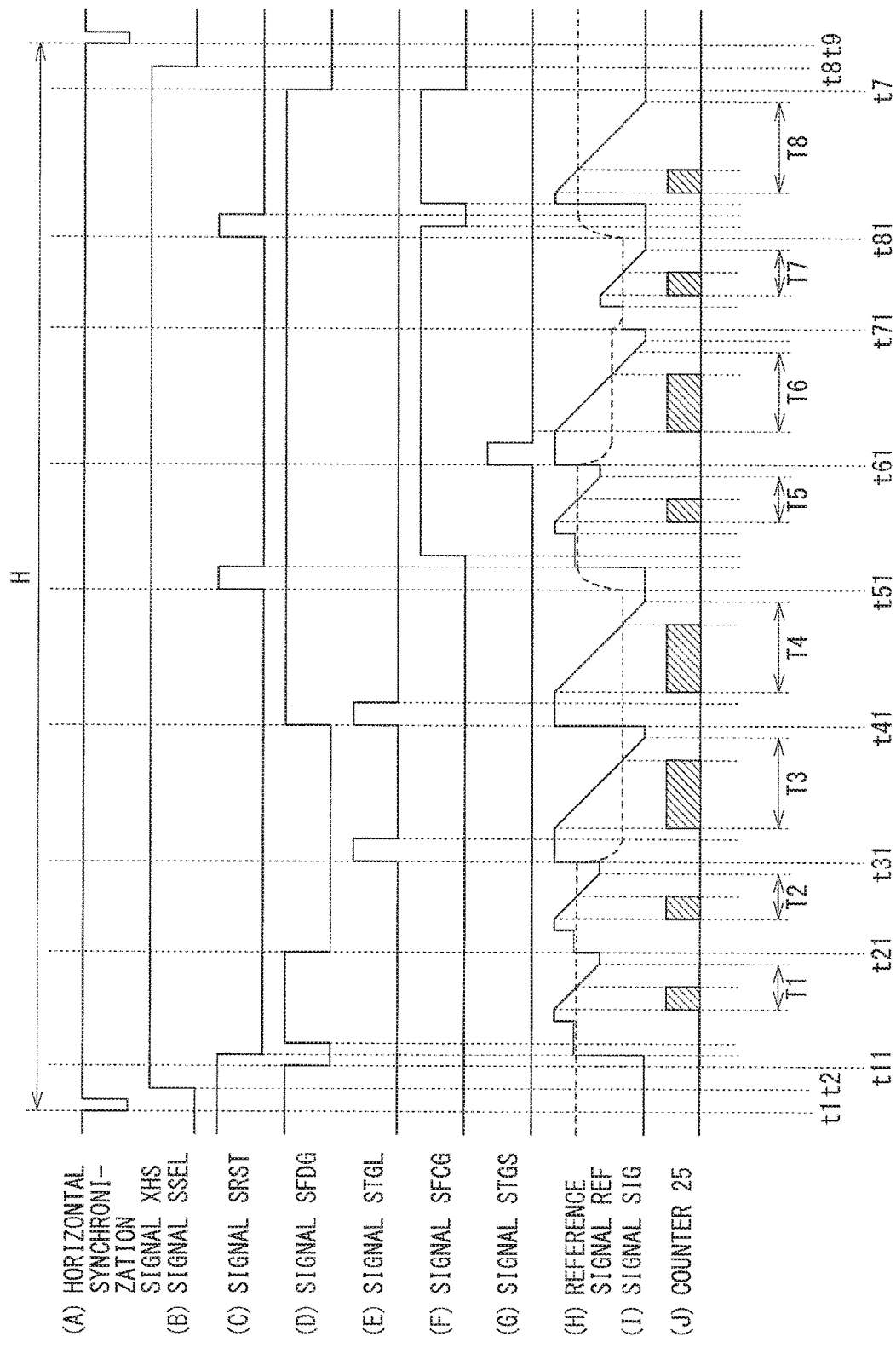
[FIG. 9]

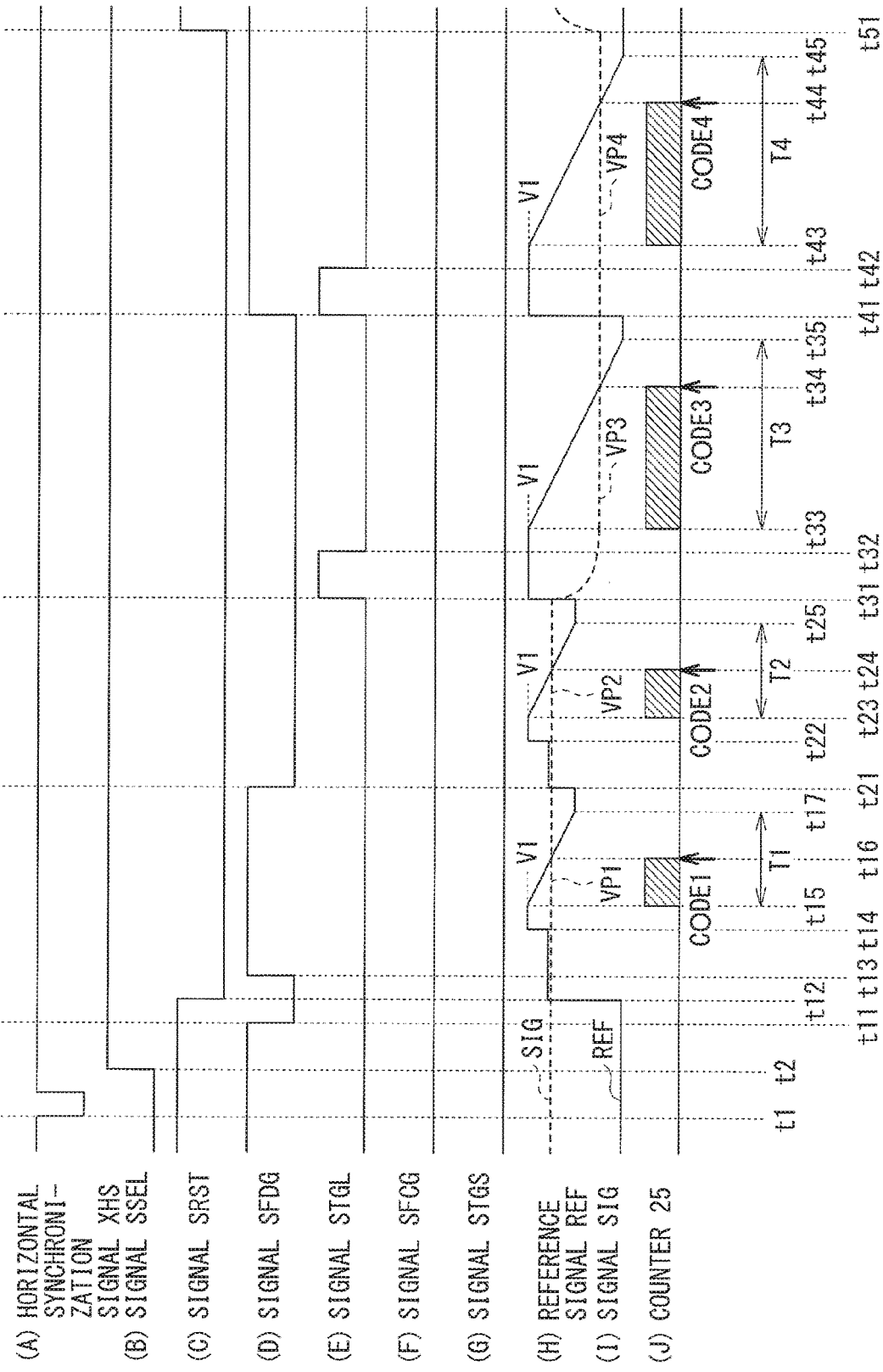

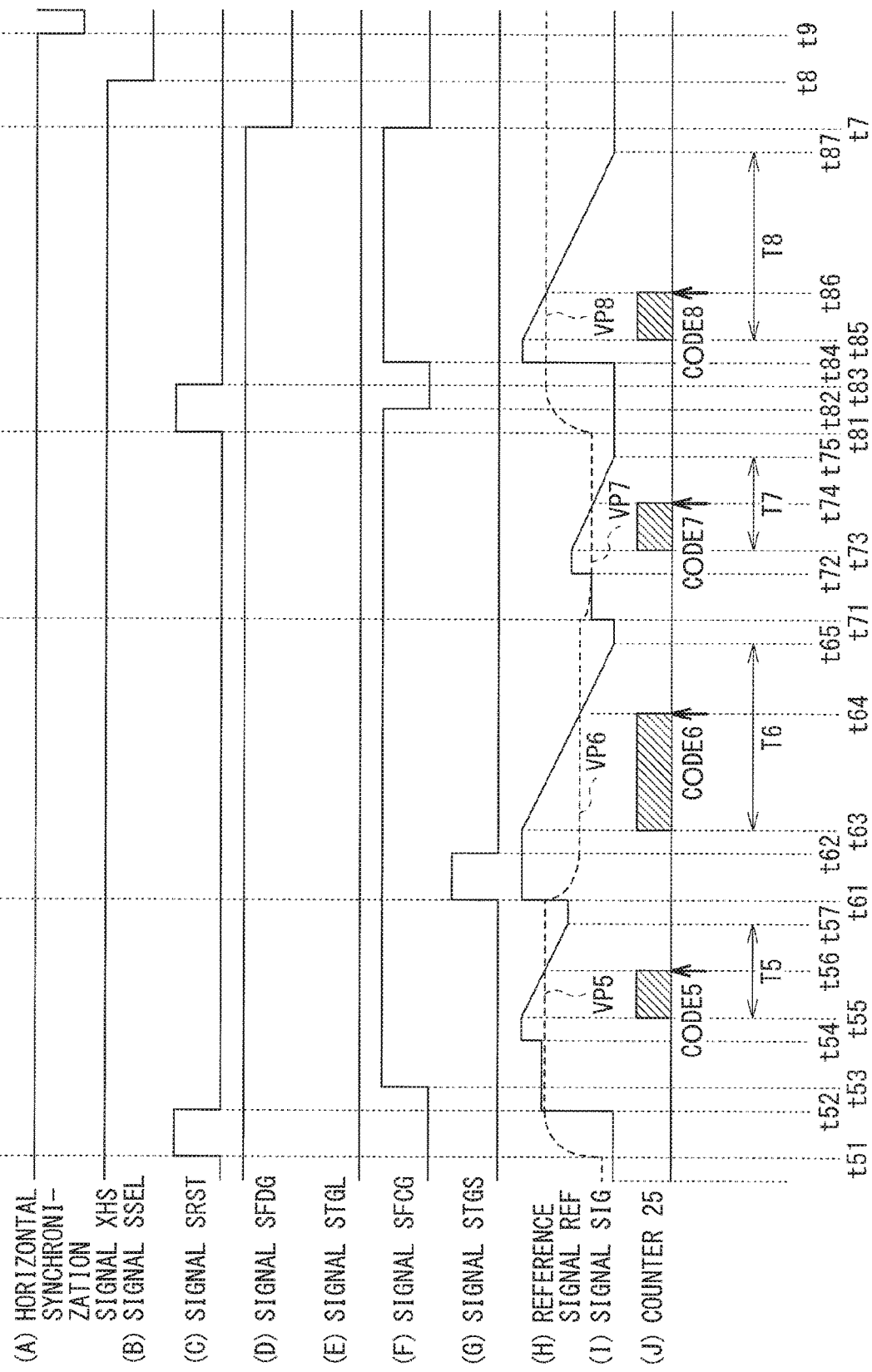

[FIG. 11A]
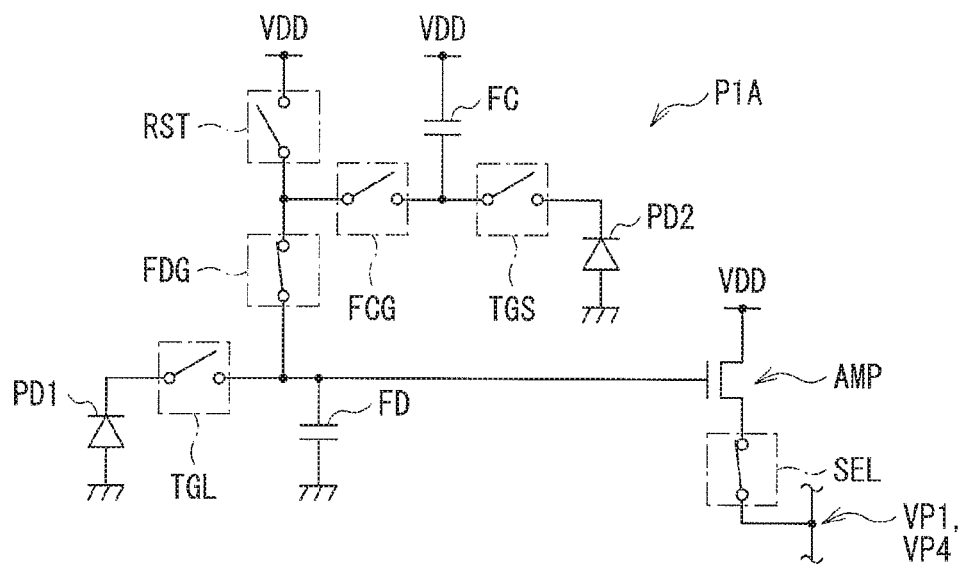
[FIG. 11B]
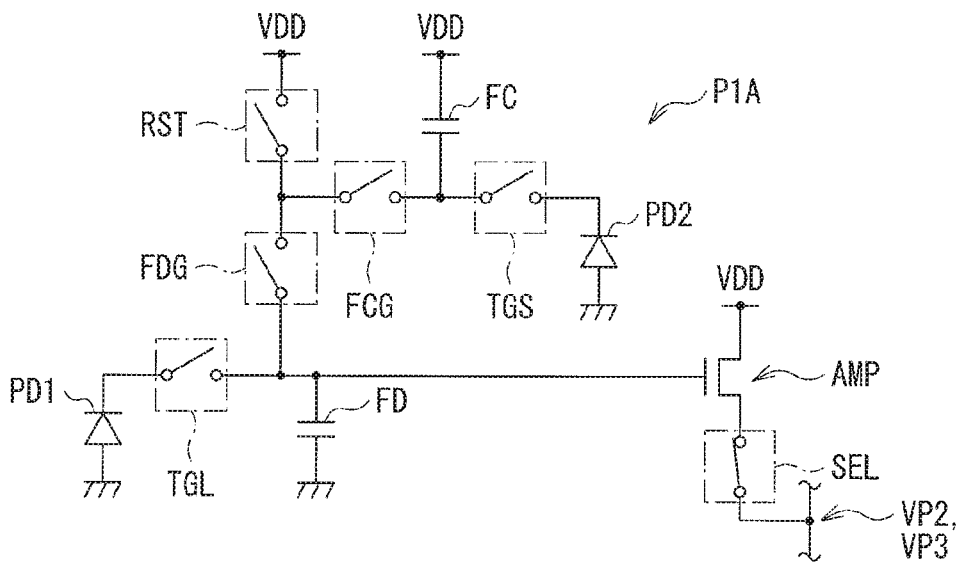

[FIG. 11C]
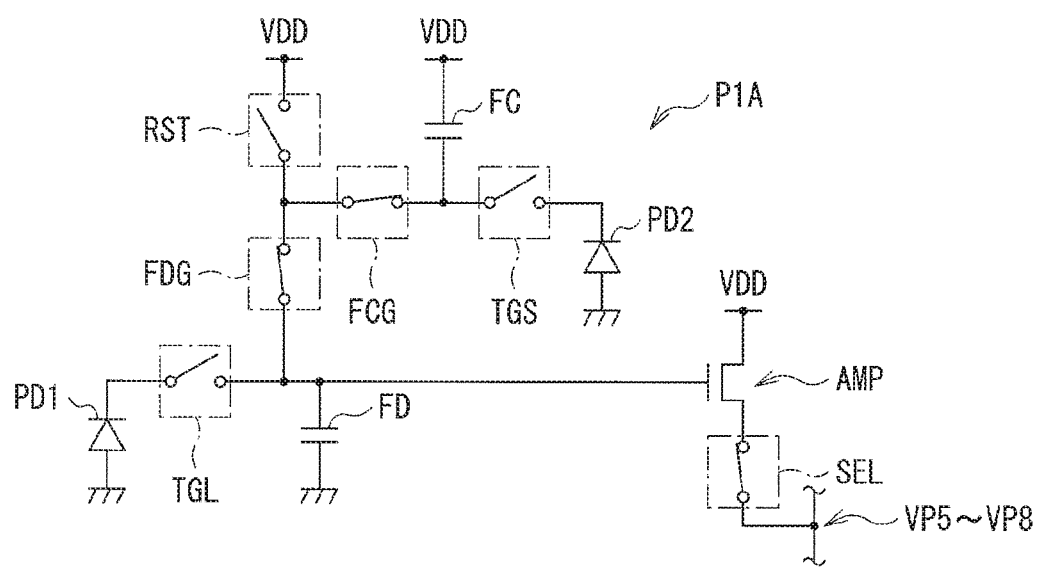

[FIG. 12]
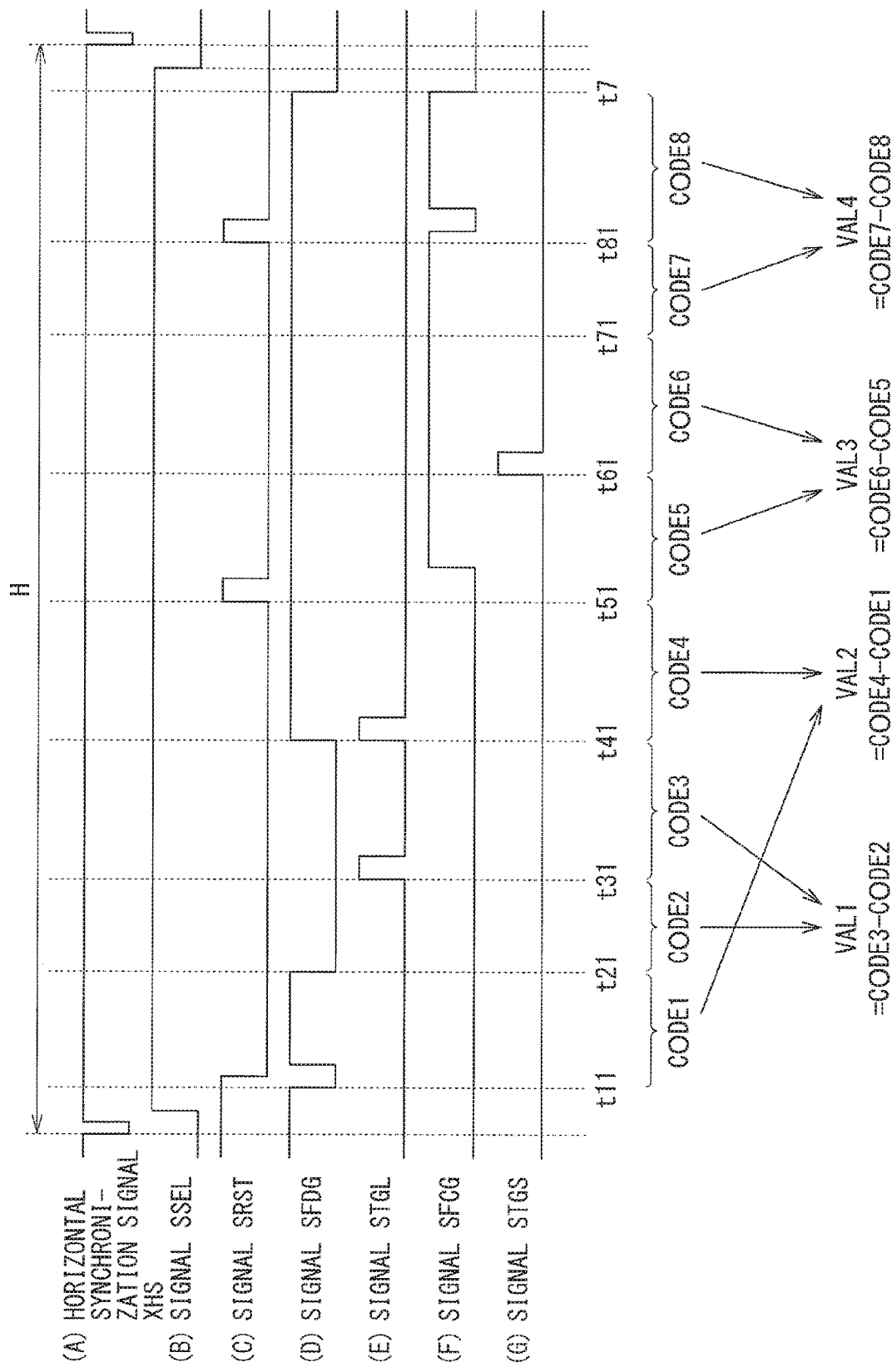

[FIG. 13]
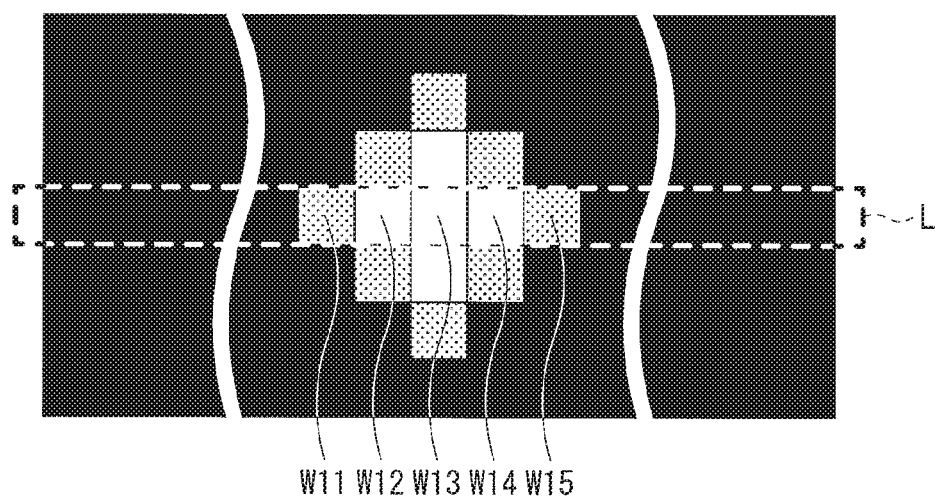

[FIG. 14]

| SET VALUE INFORMATION INF | REFERENCE PATTERN PAIR | |
|---|---|---|
| 1 | ▨ | |
| 2 | ▨▨ | ▨ |
| 3 | ▨▨▨ | ▨▨ |
| 4 | ▨▨▨▨ | ▨▨ ▨▨ |
| 5 | ▨▨▨▨▨ | ▨▨▨ ▨▨▨ |
| 6 | ▨▨▨▨▨▨ | ▨▨▨▨ ▨▨▨▨ |
| 7 | ▨▨▨▨▨▨▨ | ▨▨▨▨▨ ▨▨▨▨▨ |

▨ : DATA A   ▨ : DATA B

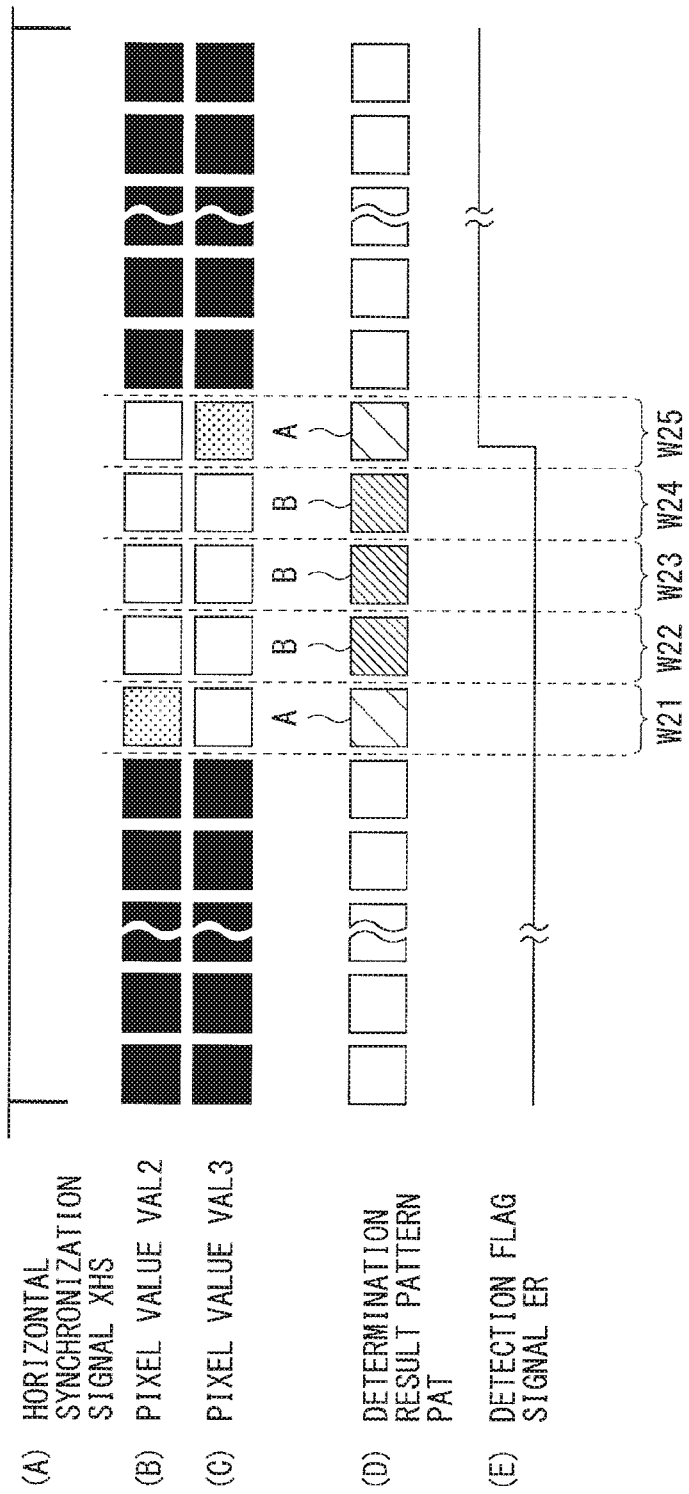

[FIG. 16]
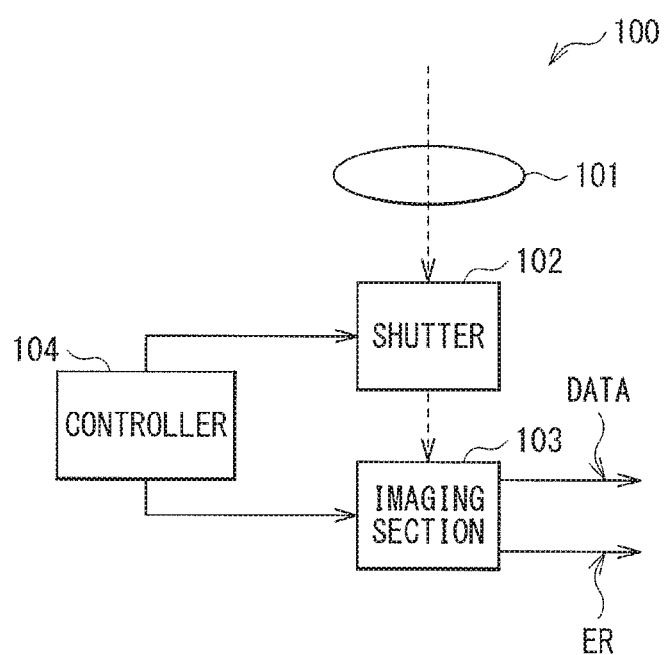

[FIG. 17]
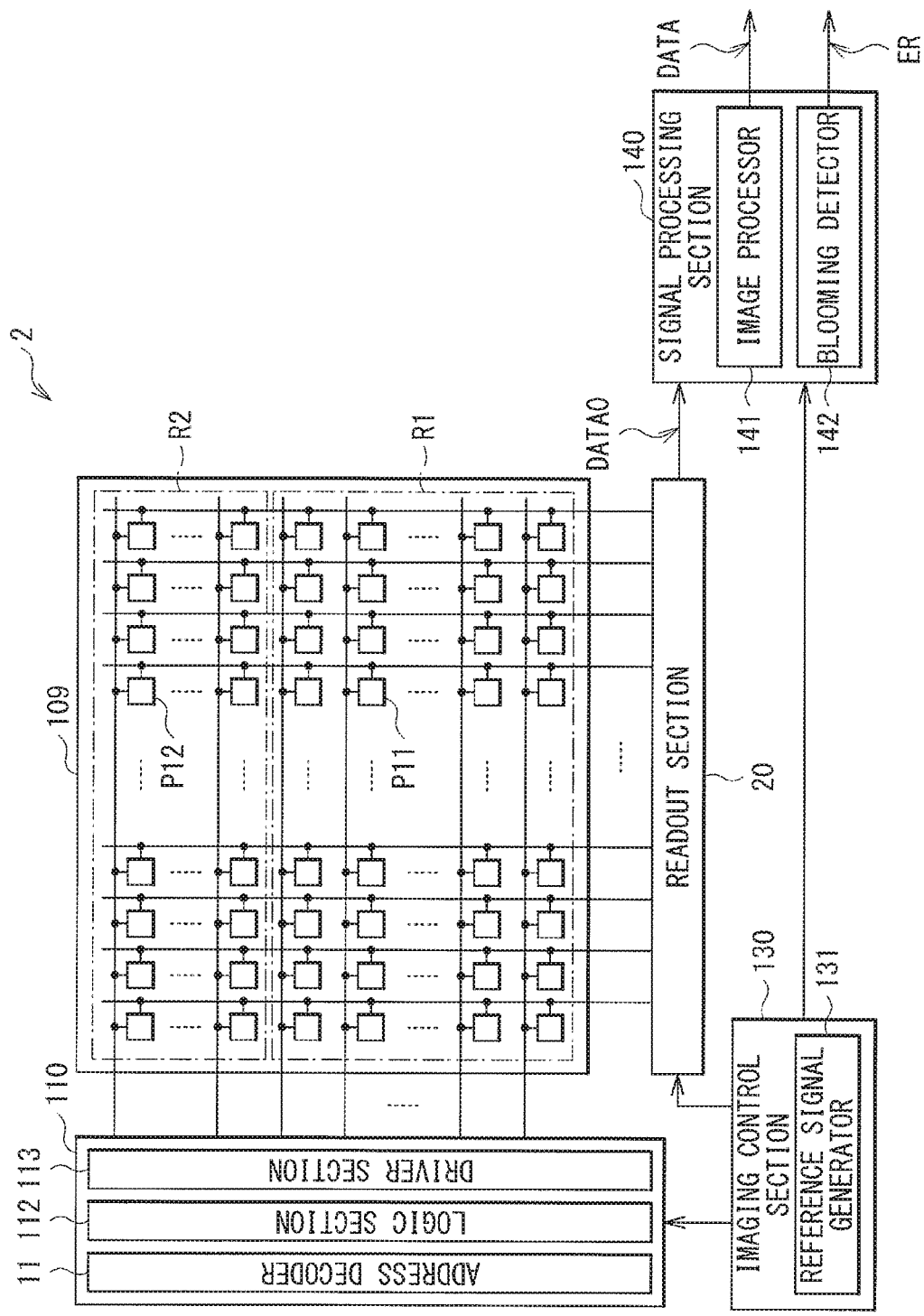

[FIG. 18]
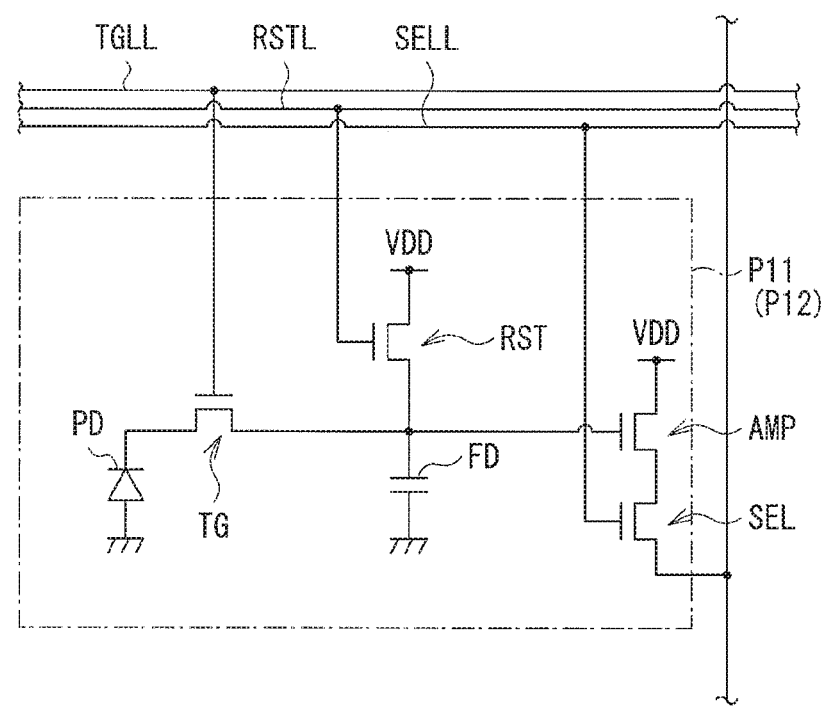

[FIG. 19]
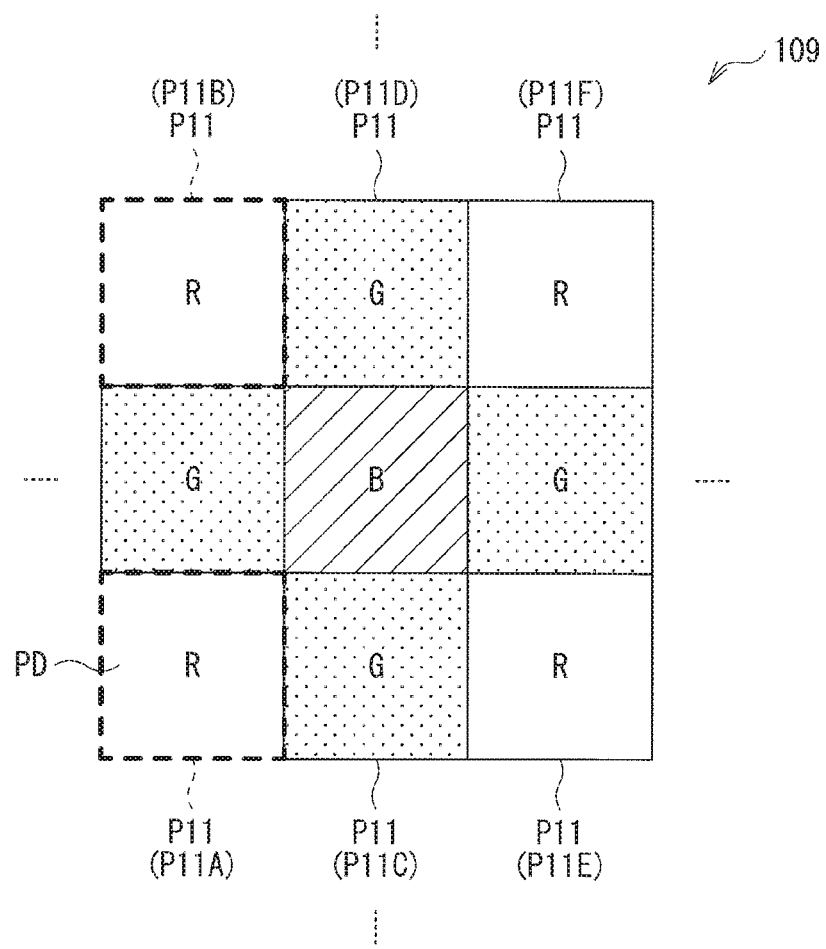

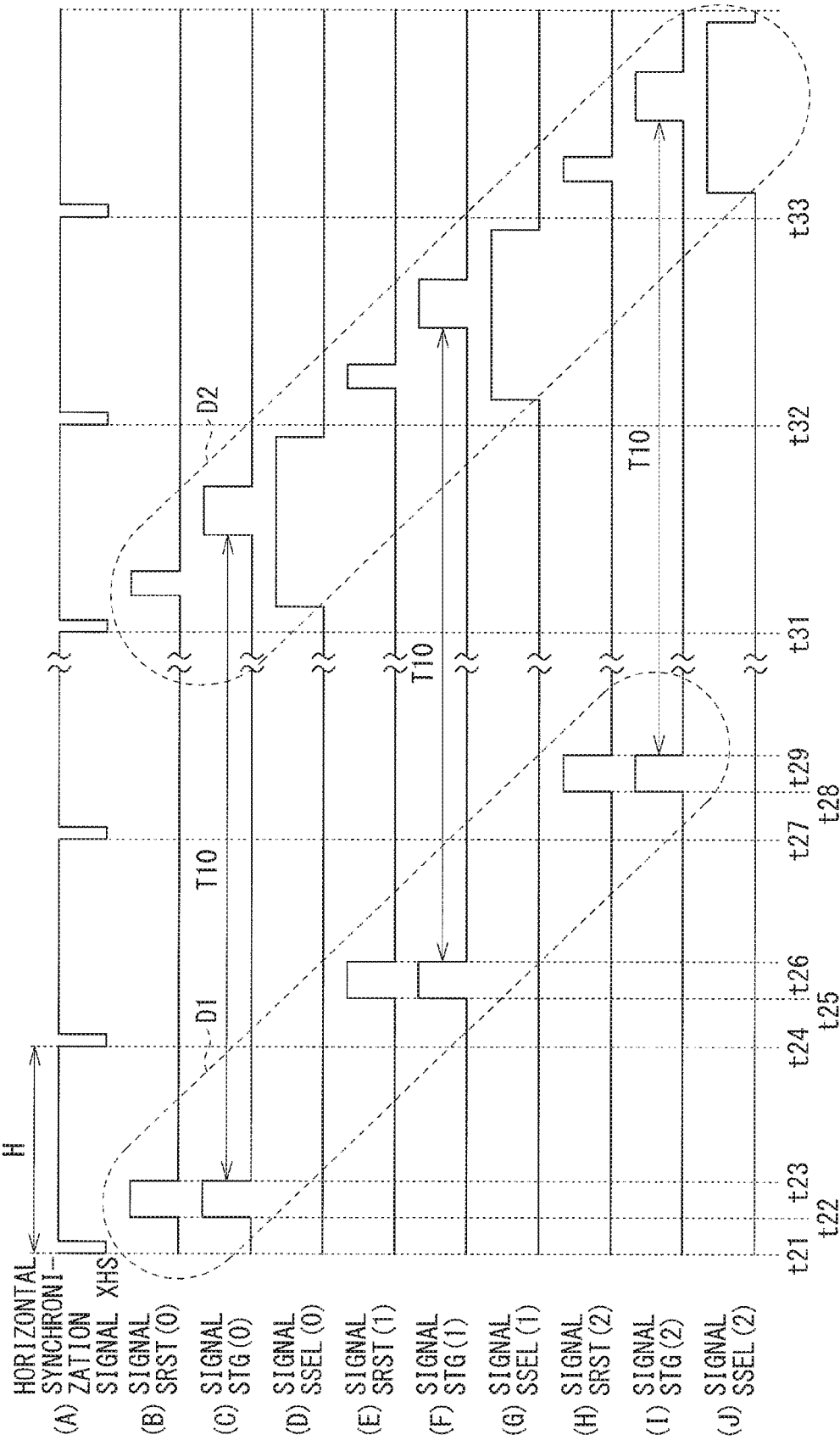

[FIG. 21]
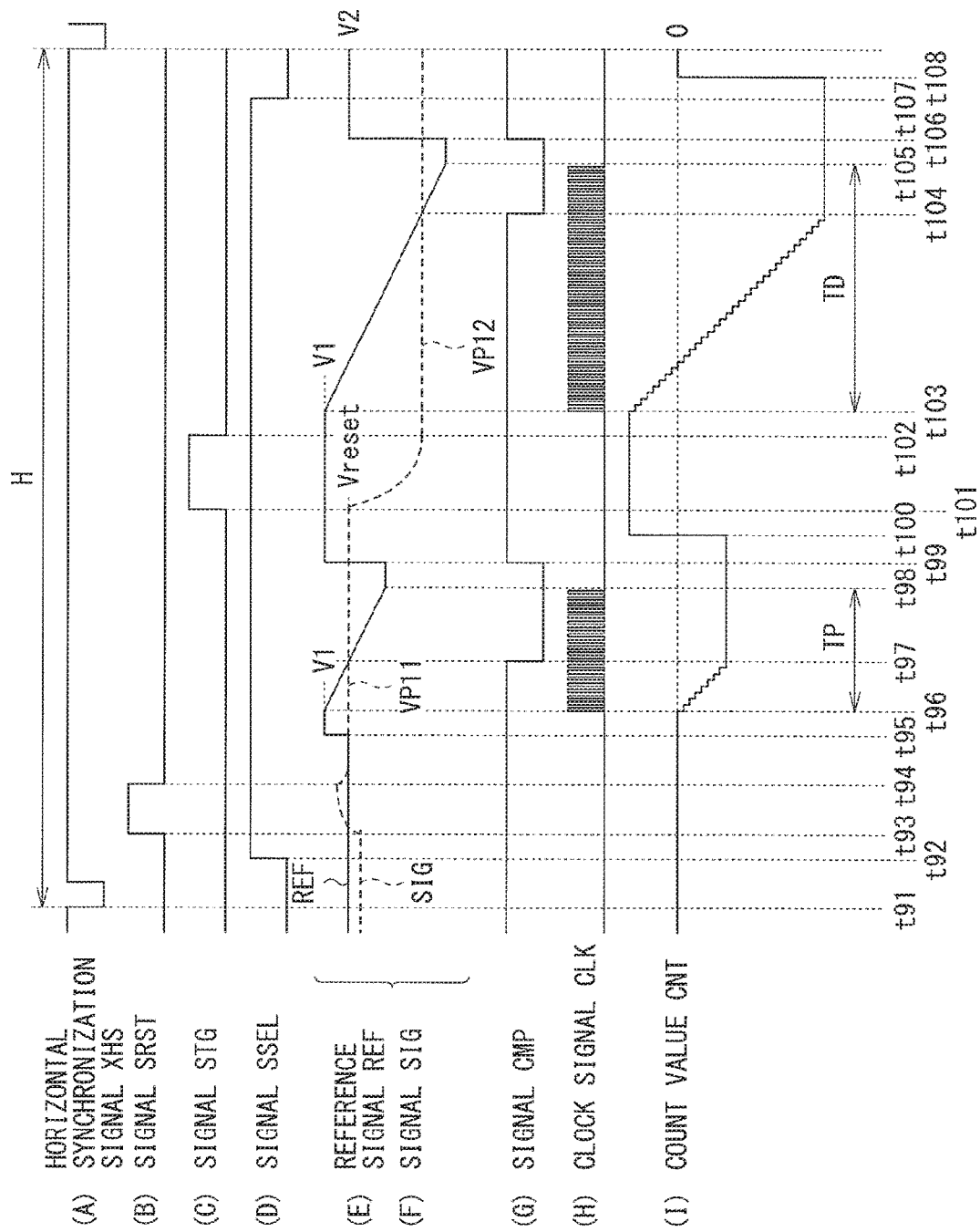

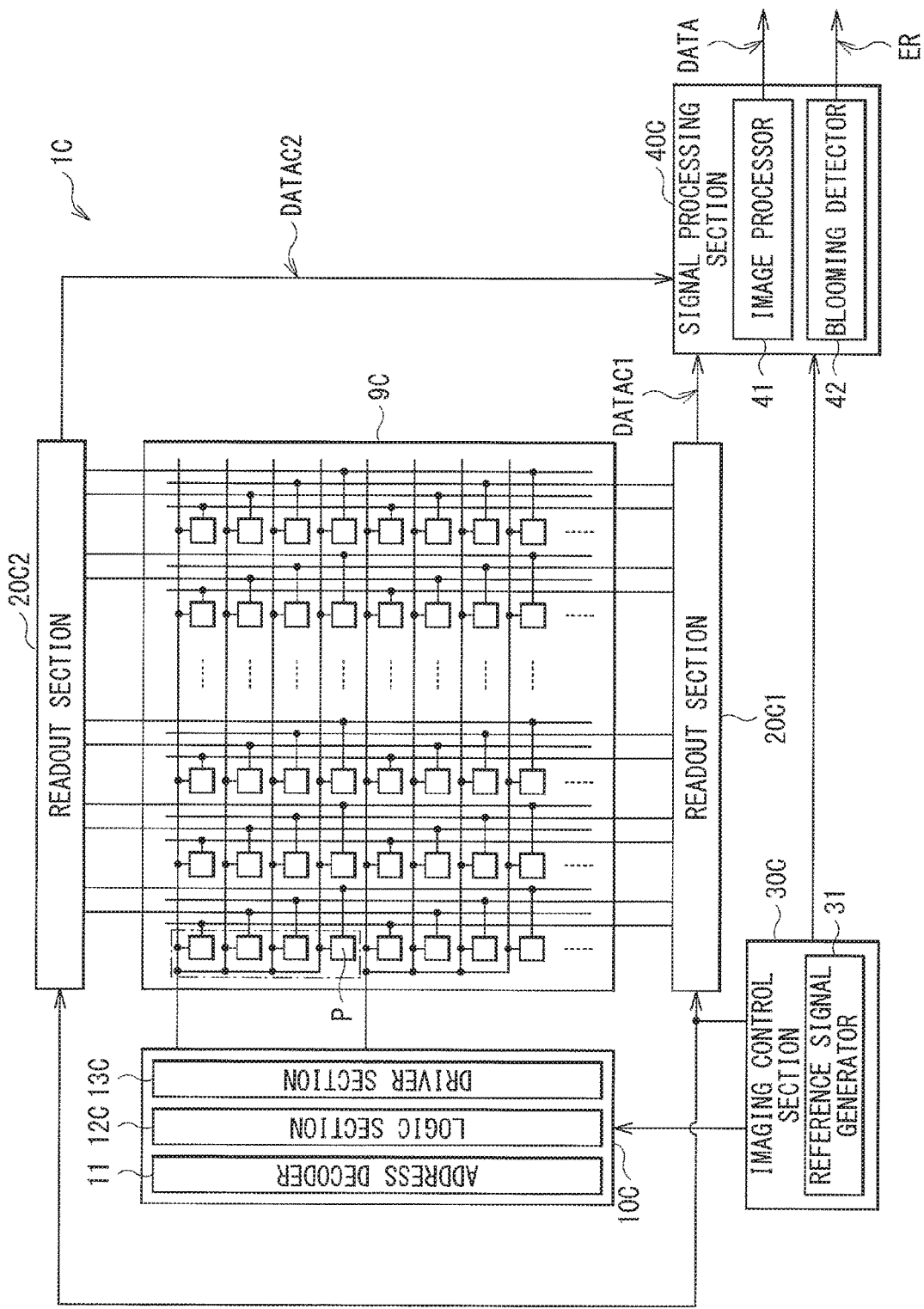
[FIG. 22]

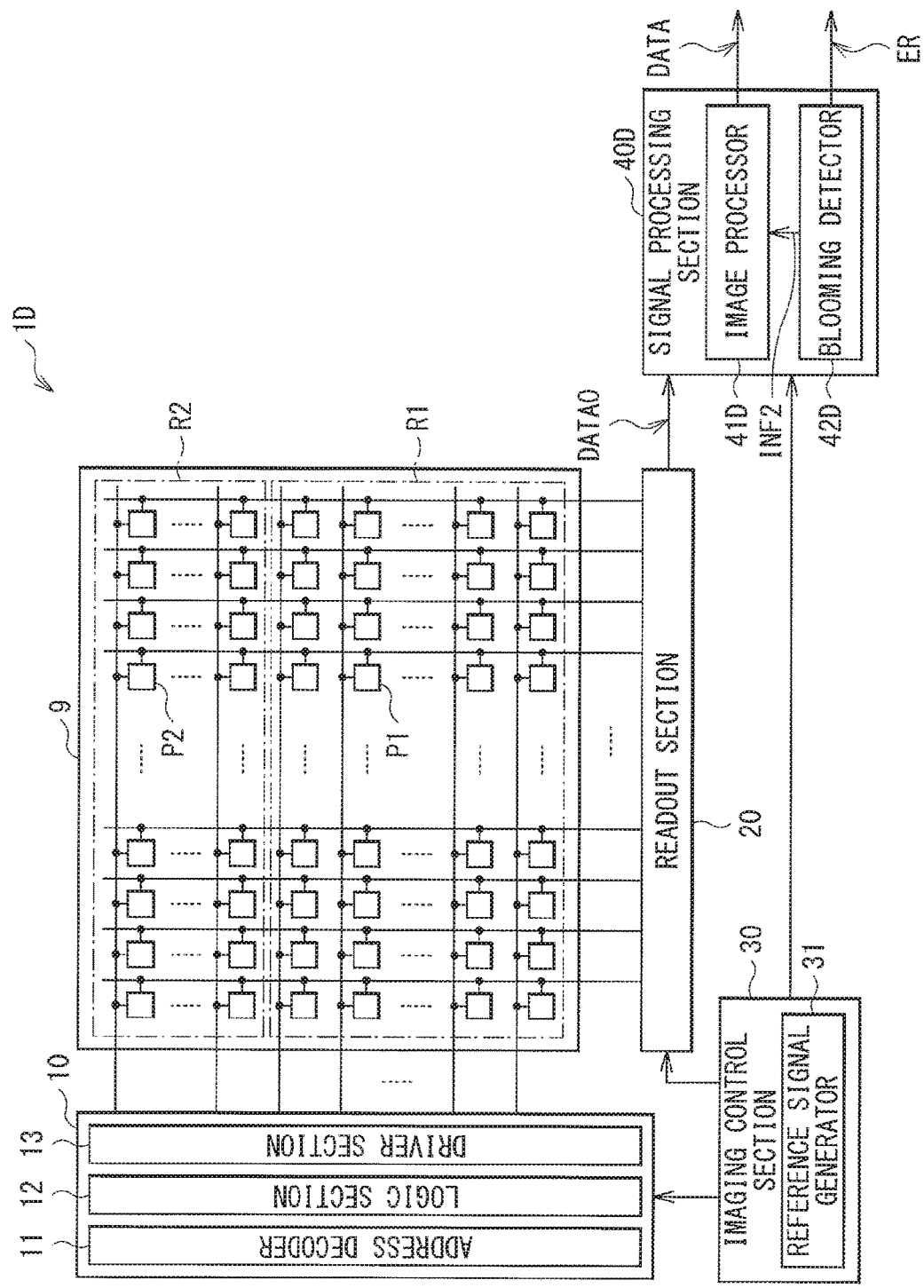
[FIG. 23]

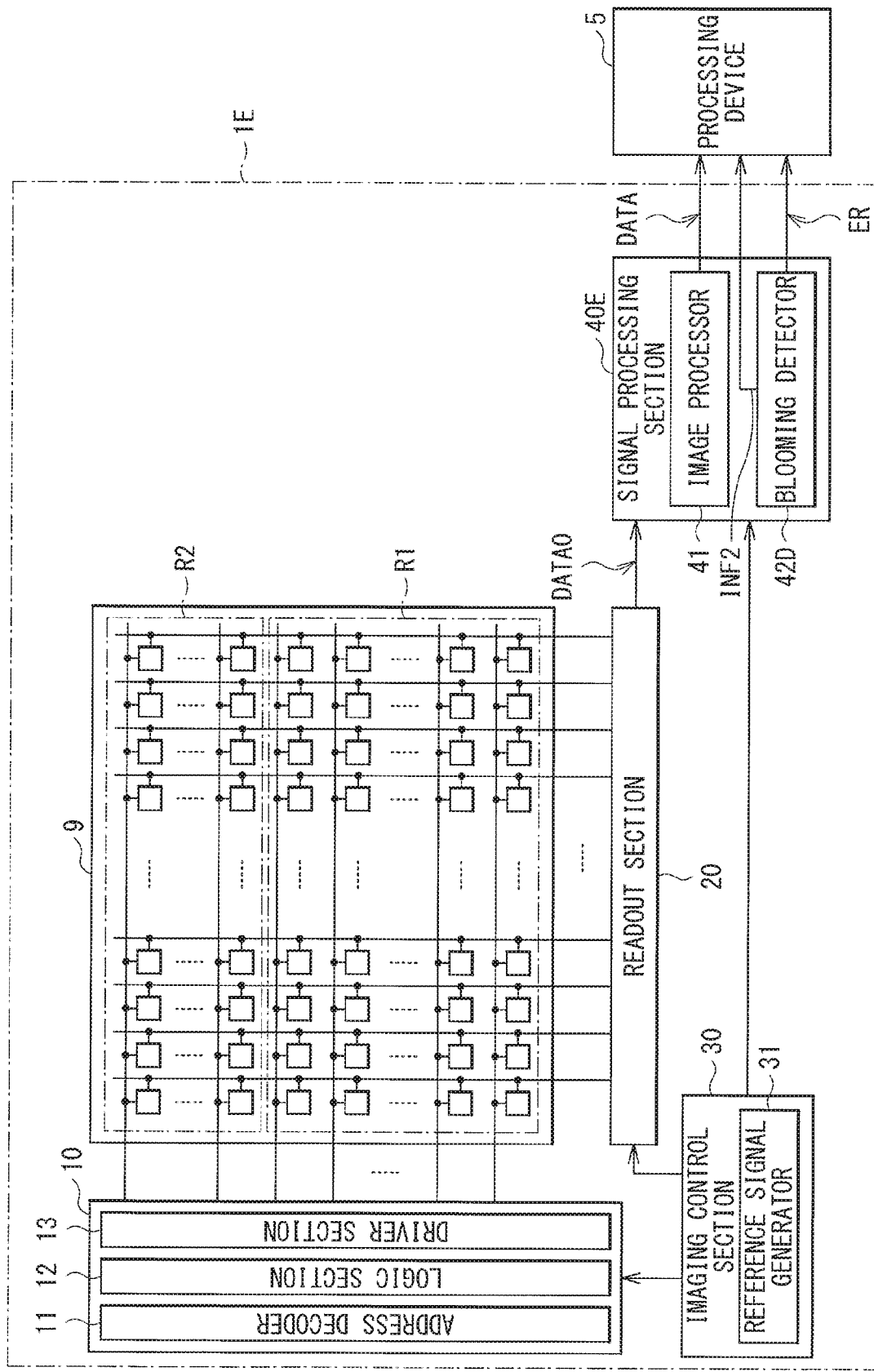
[FIG. 24]

[FIG. 25]
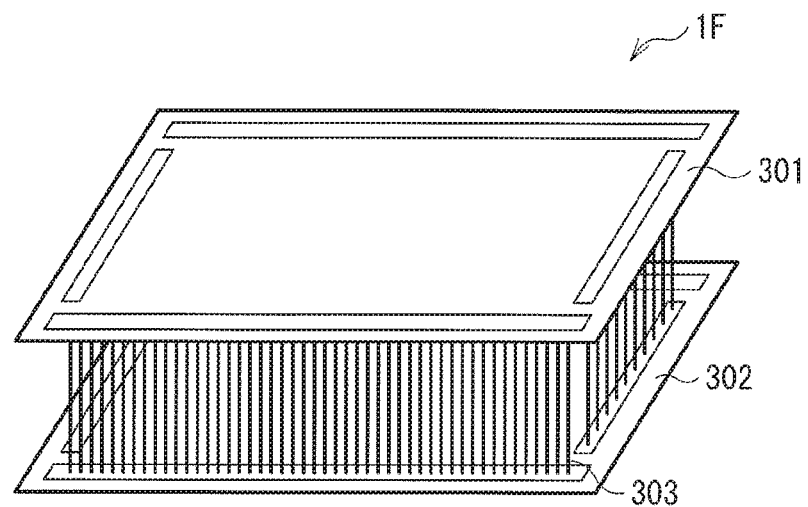

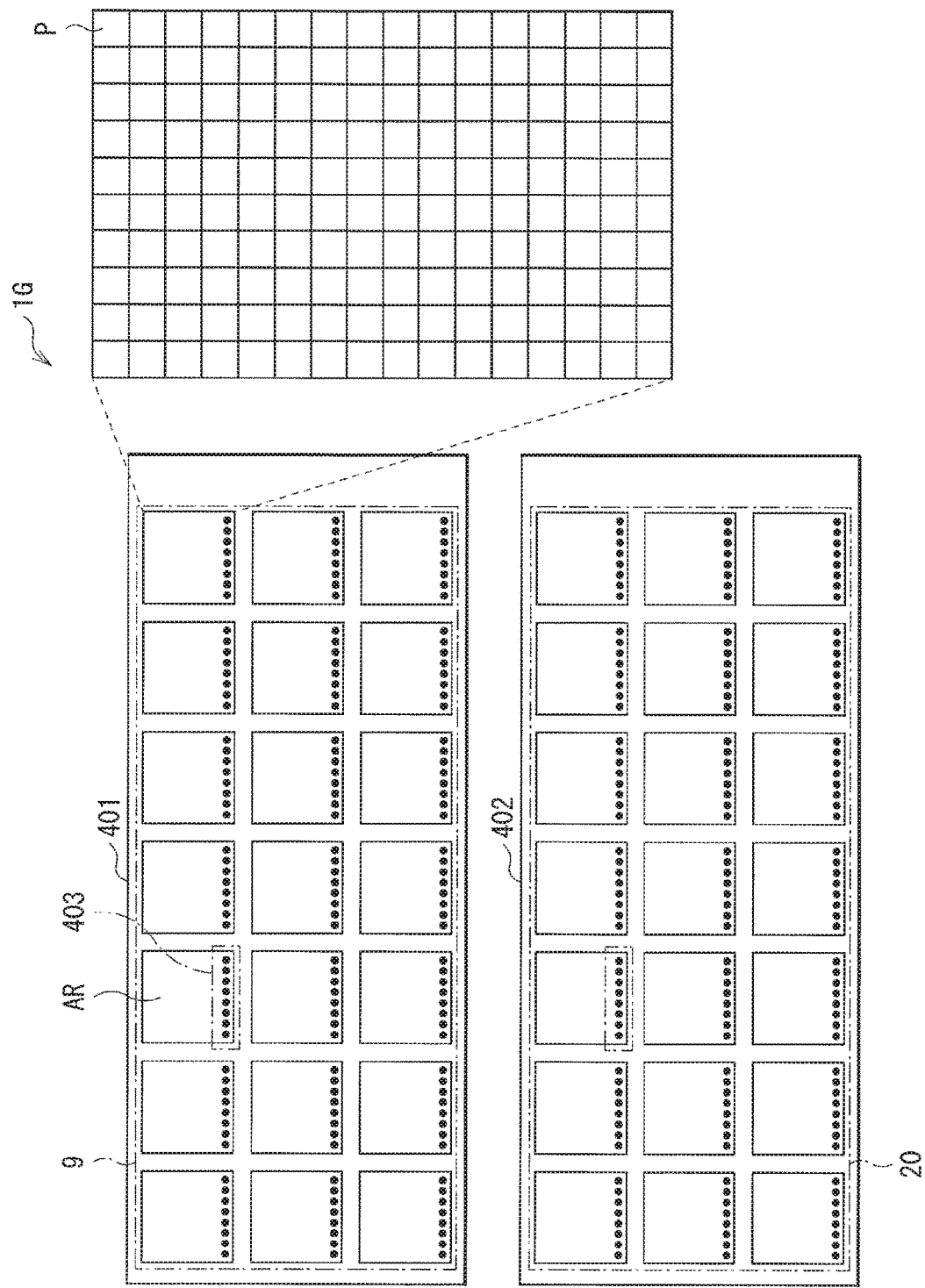

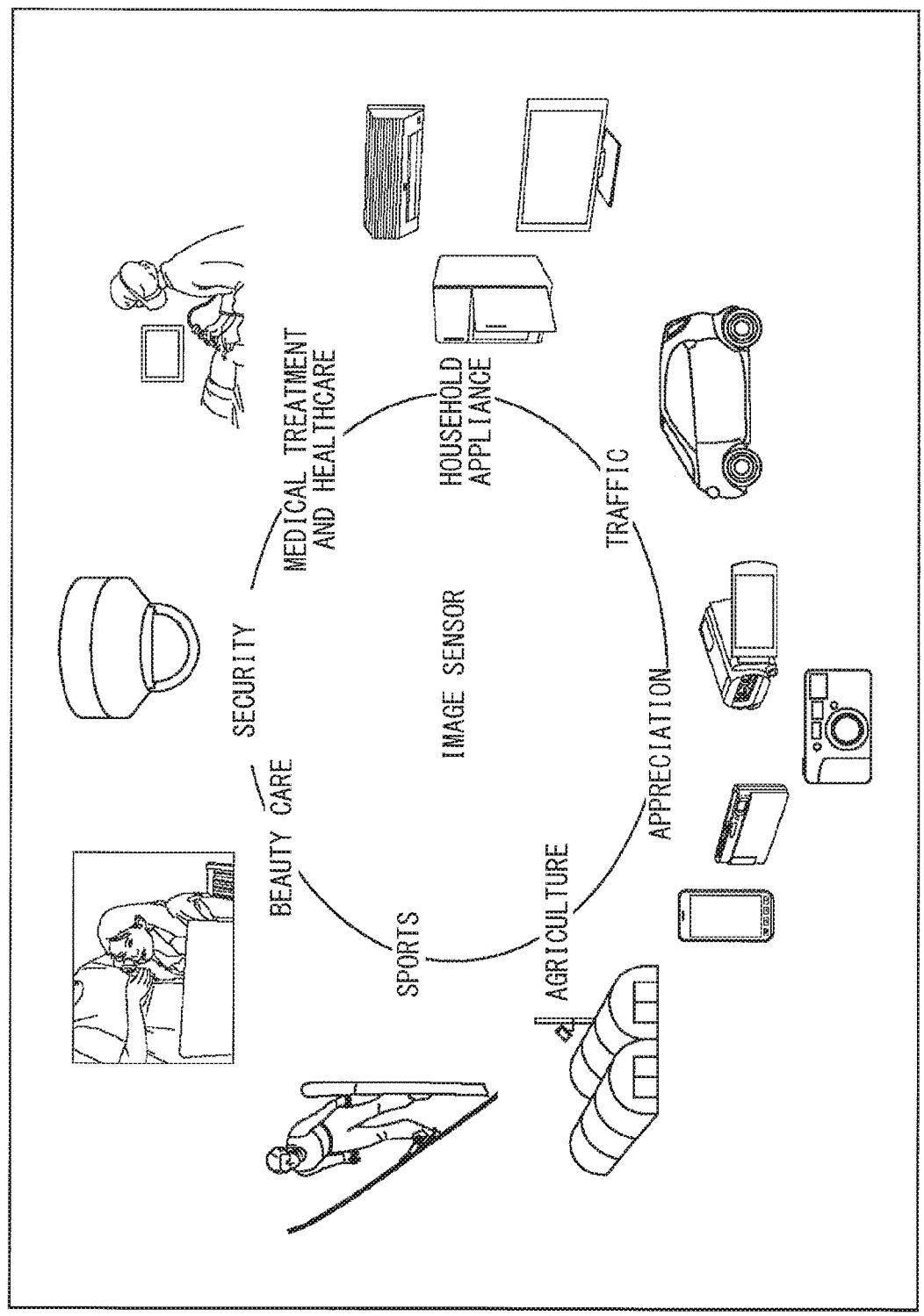
[FIG. 27]

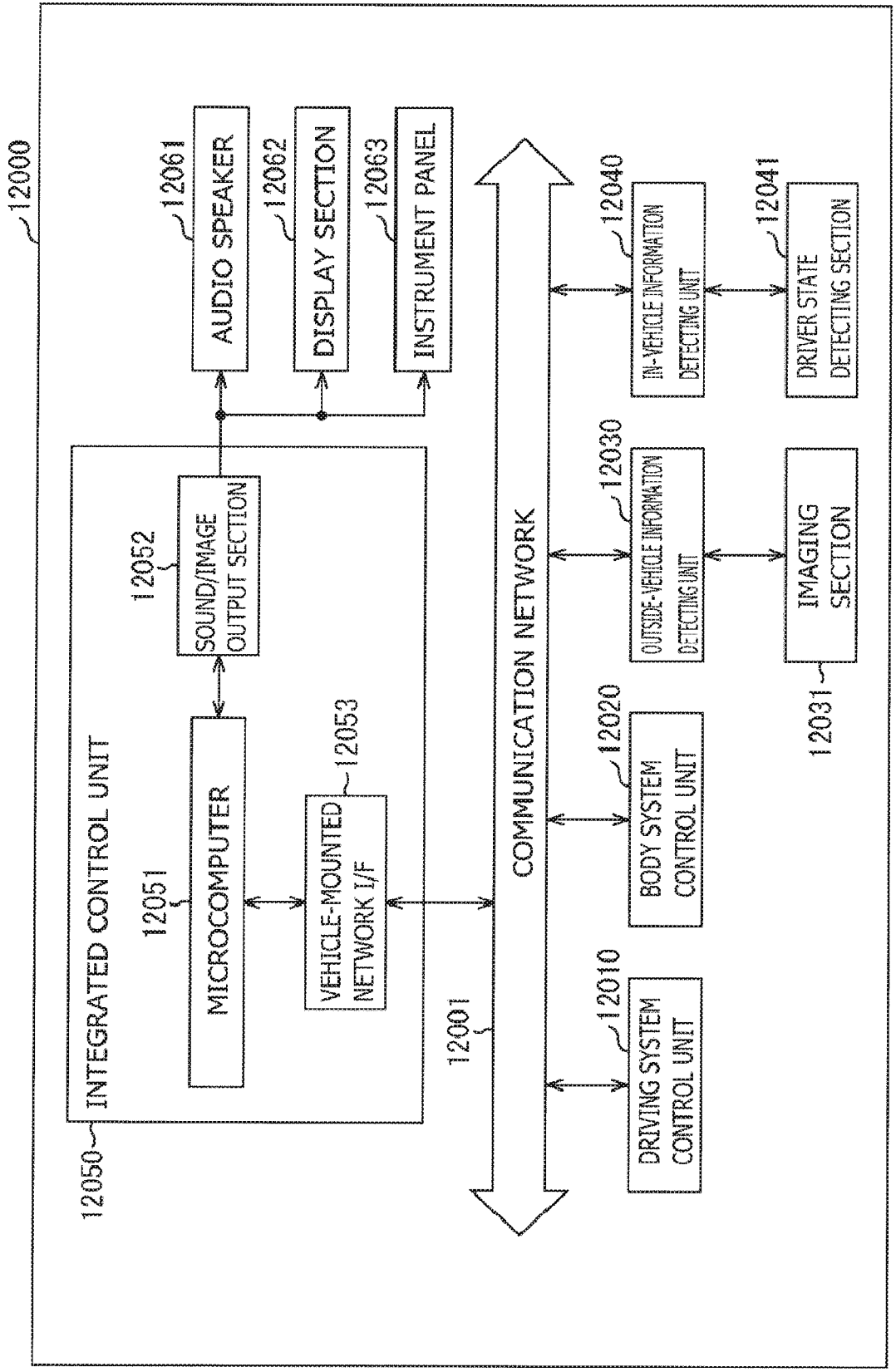
[FIG. 28]

[FIG. 29]
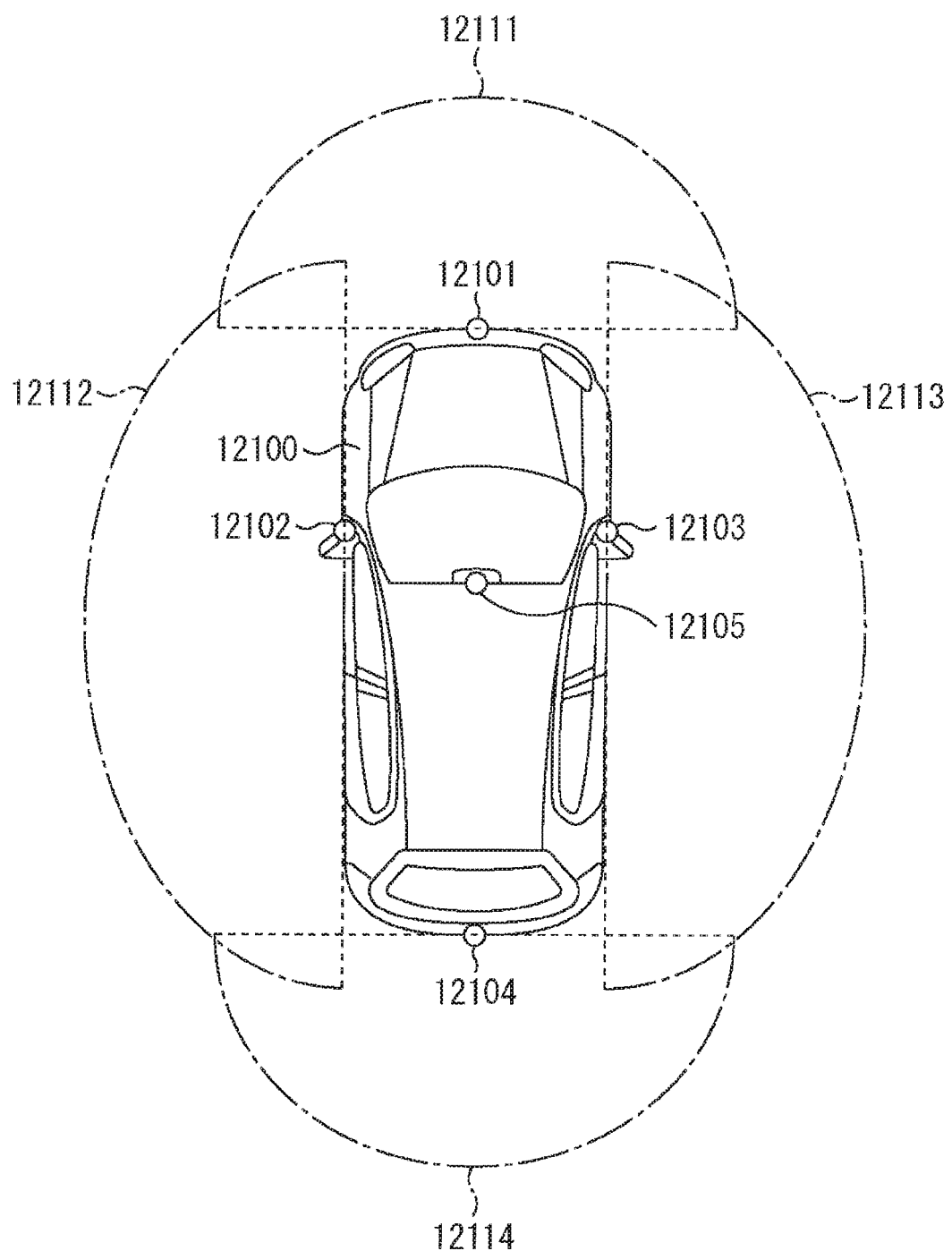

IMAGING DEVICE AND DIAGNOSIS METHOD

CROSS REFERENCE TO RELATED APPLICATIONS

This application is a U.S. National Phase of International Patent Application No. PCT/JP2018/038300 filed on Oct. 15, 2018, which claims priority benefit of U.S. Provisional Application No. 62/611,118 filed in the U.S. Patent Office on Dec. 28, 2017. Each of the above-referenced applications is hereby incorporated herein by reference in its entirety.

TECHNICAL FIELD

The present disclosure relates to an imaging device that captures an image, and a diagnosis method of the imaging device.

BACKGROUND ART

Typically, in an imaging device, pixels each having a photodiode are disposed in matrix, and each of the pixels generates an electric signal corresponding to an amount of light reception. In the pixel, for example, a defect may occur. PTL 1, for example, discloses an image data processing device that causes a memory section to store an address of a specific pixel on an image sensor and corrects pixel data of the specific pixel to thereby perform defect correction.

CITATION LIST

Patent Literature

[PTL 1]
Japanese Unexamined Patent Application Publication No. 2003-259220

SUMMARY

Technical Problem

It is desired for an imaging device to enhance reliability of a captured image, and further improvement of reliability is expected.

It is desirable to provide an imaging device and a diagnosis method that make it possible to enhance reliability of a captured image.

Solution to Problem

A first imaging device according to an embodiment of the present disclosure includes a plurality of pixels, a generating section, and a diagnosis section. The plurality of pixels each include a first light-receiving element and a second light-receiving element, and include a first pixel. The generating section is able to generate a first detection value on a basis of a light-receiving result by the first light-receiving element of each of the plurality of pixels, and is able to generate a second detection value on a basis of a light-receiving result by the second light-receiving element of each of the plurality of pixels. The diagnosis section is able to perform a diagnosis processing on a basis of a detection ratio that is a ratio between the first detection value and the second detection value in the first pixel.

A second imaging device according to an embodiment of the present disclosure includes a plurality of pixels, a generating section, and a diagnosis section. The plurality of pixels each include a light-receiving element, and are divided into a first pixel group and a second pixel group. The generating section is able to generate a first detection value on a basis of a light-receiving result by the light-receiving element of each of the plurality of pixels belonging to the first pixel group, and is able to generate a second detection value on a basis of a light-receiving result by the light-receiving element of each of the plurality of pixels belonging to the second pixel group. The plurality of pixels belonging to the first pixel group and the plurality of pixels belonging to the second pixel group are associated with each other respectively to form a plurality of pixel pairs. The plurality of pixel pairs include a first pixel pair. The diagnosis section is able to perform a diagnosis processing on a basis of a detection ratio that is a ratio between the first detection value and the second detection value in the first pixel pair.

A first diagnosis method according to an embodiment of the present disclosure includes: generating a first detection value on a basis of a light-receiving result by a first light-receiving element of each of a plurality of pixels each including the first light-receiving element and a second light-receiving element; generating a second detection value on a basis of a light-receiving result by the second light-receiving element of each of the plurality of pixels; and performing a diagnosis processing on a basis of a detection ratio that is a ratio between the first detection value and the second detection value in a first pixel of the plurality of pixels.

A second diagnosis method according to an embodiment of the present disclosure includes: generating a first detection value on a basis of a light-receiving result by a light-receiving element of each of a plurality of pixels belonging to a first pixel group of a plurality of pixels that each include the light-receiving element and are divided into the first pixel group and a second pixel group; generating a second detection value on a basis of a light-receiving result by the light-receiving element of each of a plurality of pixels belonging to the second pixel group; and performing a diagnosis processing on a basis of a detection ratio that is a ratio between the first detection value and the second detection value in a first pixel pair of a plurality of pixel pairs formed by the plurality of pixels belonging to the first pixel group and the plurality of pixels belonging to the second pixel group that are associated with each other respectively.

In the first imaging device and the first diagnosis method according to the respective embodiments of the present disclosure, a first detection value is generated on a basis of a light-receiving result by a first light-receiving element of each of a plurality of pixels, and a second detection value is generated on a basis of a light-receiving result by the second light-receiving element of each of the plurality of pixels. Further, a diagnosis processing is performed on a basis of a detection ratio that is a ratio between the first detection value and the second detection value in a first pixel.

In the second imaging device and the second diagnosis method according to the respective embodiments of the present disclosure, a first detection value is generated on a basis of a light-receiving result by a light-receiving element of each of a plurality of pixels belonging to a first pixel group, and a second detection value is generated on a basis of a light-receiving result by the light-receiving element of each of a plurality of pixels belonging to a second pixel group. The plurality of pixels belonging to the first pixel group and the plurality of pixels belonging to the second pixel group are associated with each other respectively to form a plurality of pixel pairs. Further, a diagnosis processing is performed on a basis of a detection ratio that is a ratio between the first detection value and the second detection value in a first pixel pair.

Advantageous Effects of Invention

According to the first imaging device and the first diagnosis method in the respective embodiments of the present disclosure, a diagnosis processing is performed on a basis of a detection ratio that is a ratio between the first detection value and the second detection value in the first pixel, thus making it possible to enhance reliability of a captured image.

According to the second imaging device and the second diagnosis method in the respective embodiments of the present disclosure, a diagnosis processing is performed on a basis of a detection ratio that is a ratio between the first detection value and the second detection value in the first pixel pair, thus making it possible to enhance reliability of a captured image.

It is to be noted that an effect described herein is not necessarily limiting and may be any of effects described in the disclosure.

BRIEF DESCRIPTION OF DRAWINGS

FIG. 1 is a block diagram illustrating a configuration example of an imaging device according to an embodiment of the present disclosure.

FIG. 2 is a circuit diagram illustrating a configuration example of a pixel array illustrated in FIG. 1.

FIG. 3 is an explanatory diagram illustrating a configuration example of the pixel array illustrated in FIG. 1.

FIG. 4 is a circuit diagram illustrating a configuration example of a readout section illustrated in FIG. 1.

FIG. 5A is an explanatory diagram illustrating an example of blooming.

FIG. 5B is another explanatory diagram illustrating an example of the blooming.

FIG. 5C is another explanatory diagram illustrating an example of the blooming.

FIG. 6 is a block diagram illustrating a configuration example of a blooming detector illustrated in FIG. 1.

FIG. 7 is an explanatory diagram illustrating an example in which the imaging device illustrated in FIG. 1 is mounted.

FIG. 8 is a timing chart illustrating an operation example of the imaging device illustrated in FIG. 1.

FIG. 9 is a timing waveform chart illustrating an operation example of the imaging device illustrated in FIG. 1.

FIG. 10A is another timing waveform chart illustrating an operation example of the imaging device illustrated in FIG. 1.

FIG. 10B is another timing waveform chart illustrating an operation example of the imaging device illustrated in FIG. 1.

FIG. 11A is an explanatory diagram illustrating an operation state of the imaging device illustrated in FIG. 1.

FIG. 11B is an explanatory diagram illustrating another operation state of the imaging device illustrated in FIG. 1.

FIG. 11C is an explanatory diagram illustrating another operation state of the imaging device illustrated in FIG. 1.

FIG. 12 is an explanatory diagram illustrating an example of image synthesis in the imaging device illustrated in FIG. 1.

FIG. 13 is an explanatory diagram illustrating an example of blooming detection in the imaging device illustrated in FIG. 1.

FIG. 14 is an explanatory diagram illustrating an example of a reference pattern.

FIG. 15 is a timing chart illustrating an operation example of the blooming detector illustrated in FIG. 6.

FIG. 16 is a configuration diagram illustrating a configuration example of an imaging system according to a modification example.

FIG. 17 is a block diagram illustrating a configuration example of an imaging device according to another modification example.

FIG. 18 is a circuit diagram illustrating a configuration example of a pixel array illustrated in FIG. 17.

FIG. 19 is an explanatory diagram illustrating a configuration example of the pixel array illustrated in FIG. 17.

FIG. 20 is a timing waveform chart illustrating an operation example of the imaging device illustrated in FIG. 17.

FIG. 21 is another timing waveform chart illustrating the operation example of the imaging device illustrated in FIG. 17.

FIG. 22 is a block diagram illustrating a configuration example of an imaging device according to another modification example.

FIG. 23 is a block diagram illustrating a configuration example of an imaging device according to another modification example.

FIG. 24 is a block diagram illustrating a configuration example of an imaging device according to another modification example.

FIG. 25 is an explanatory diagram illustrating an example in which an imaging device according to another modification example is mounted.

FIG. 26 is an explanatory diagram illustrating an example in which an imaging device according to another modification example is mounted.

FIG. 27 is an explanatory diagram illustrating use examples of the imaging device.

FIG. 28 is a block diagram depicting an example of schematic configuration of a vehicle control system.

FIG. 29 is a diagram of assistance in explaining an example of installation positions of an outside-vehicle information detecting section and an imaging section.

DESCRIPTION OF EMBODIMENTS

In the following, some embodiments of the present disclosure are described in detail with reference to the accompanying drawings. It is to be noted that the description is given in the following order.
1. Embodiment
2. Use Examples of Imaging Device
3. Example of Application to Mobile Body 1. Embodiment Configuration Example FIG. 1 illustrates a configuration example of an imaging device (an imaging device 1) according to an embodiment. The imaging device 1 includes a pixel array 9, a scanning section 10, a readout section 20, an imaging control section 30, and a signal processing section 40.

In the pixel array 9, a plurality of pixels P are disposed in matrix. The plurality of pixels P include a plurality of imaging pixels P1 and a plurality of light-shielded pixels P2. The imaging pixels P1 includes a photodiode, and generates a pixel voltage VP corresponding to an amount of light reception. The light-shielded pixel P2 is a pixel shielded from light, and serves to detect a dark current of the photodiode, as described later. The pixel array 9 is provided with a normal pixel region R1 and a light-shielded pixel region R2. The plurality of imaging pixels P1 are disposed in the normal pixel region R1, and the plurality of light-shielded pixels P2 are disposed in the light-shielded pixel region R2. In this example, the light-shielded pixel region R2 is disposed above the normal pixel region R1 in a vertical direction (a longitudinal direction in FIG. 1).

Description is given in detail below of the imaging pixel P1 and the light-shielded pixel P2.

FIG. 2 illustrates a configuration example of the imaging pixel P1 in the normal pixel region R1. The pixel array 9 includes, in the normal pixel region R1, a plurality of control lines TGLL, a plurality of control lines FDGL, a plurality of control lines RSTL, a plurality of control lines FCGL, a plurality of control lines TGSL, a plurality of control lines SELL, and a plurality of signal lines SGL. The control line TGLL extends in a horizontal direction (a lateral direction in FIG. 1), and a signal STGL is applied to the control line TGLL by the scanning section 10. The control line FDGL extends in a horizontal direction, and a signal SFDG is applied to the control line FDGL by the scanning section 10. The control line RSTL extends in a horizontal direction, and a signal SRST is applied to the control line RSTL by the scanning section 10. The control line FCGL extends in a horizontal direction, and a signal SFCG is applied to the control line FCGL by the scanning section 10. The control line TGSL extends in a horizontal direction, and a signal STGS is applied to the control line TGSL by the scanning section 10. The control line SELL extends in a horizontal direction, and a signal SSEL is applied to the control line SELL by the scanning section 10. The signal line SGL extends in a vertical direction (the longitudinal direction in FIG. 1), and is coupled to the readout section 20. The plurality of signal lines SGL are each so disposed as to penetrate the normal pixel region R1 and the light-shielded pixel region R2.

The imaging pixel P1 includes a photodiode PD1, a transistor TGL, a photodiode PD2, a transistor TGS, a capacitor element FC, transistors FCG, RST, and FDG, a floating diffusion FD, and transistors AMP and SEL. The transistors TGL, TGS, FCG, RST, FDG, AMP, and SEL are each an N-type MOS transistor in this example.

The photodiode PD1 is a photoelectric conversion element that generates an electric charge in an amount corresponding to an amount of light reception and stores it inside. A light-receiving region of the photodiode PD1 where light is receivable is broader than a light-receiving region of the photodiode PD2 where light is receivable. An anode of the photodiode PD1 is grounded, and a cathode thereof is coupled to a source of the transistor TGL.

A gate of the transistor TGL is coupled to the control line TGLL, a source thereof is coupled to the cathode of the photodiode PD1, and a drain thereof is coupled to the floating diffusion FD.

The photodiode PD2 is a photoelectric conversion element that generates an electric charge in an amount corresponding to an amount of light reception and stores it inside. The light-receiving region of the photodiode PD2 where light is receivable is narrower than the light-receiving region of the photodiode PD1 where light is receivable. An anode of the photodiode PD2 is grounded, and a cathode thereof is coupled to a source of the transistor TGS.

A gate of the transistor TGS is coupled to the control line TGSL, the source thereof is coupled to the cathode of the photodiode PD2, and a drain thereof is coupled to one end of the capacitor element FC and to a source of the transistor FCG.

One end of the capacitor element FC is coupled to the drain of the transistor TGS and to the source of the transistor FCG, and a power supply voltage VDD is supplied to the other end thereof.

A gate of the transistor FCG is coupled to the control line FCGL, and the source thereof is coupled to one end of the capacitor element FC and to the drain of the transistor TGS, and a drain thereof is coupled to a source of the transistor RST and to a drain of the FDG.

A gate of the transistor RST is coupled to the control line RSTL, and the power supply voltage VDD is supplied to a drain thereof, and the source thereof is coupled to the respective drains of the transistors FCG and FDG.

A gate of the transistor FDG is coupled to the control line FDGL, the drain thereof is coupled to the source of the transistor RST and to the drain of the transistor FCG, and a source thereof is coupled to the floating diffusion.

The floating diffusion FD stores electric charges supplied from the photodiodes PD1 and PD2, and is configured using a diffusion layer formed on a surface of a semiconductor substrate, for example. In FIG. 2, the floating diffusion FD is denoted by a symbol of a capacitor element.

A gate of the transistor AMP is coupled to the floating diffusion FD, the power supply voltage VDD is supplied to a drain thereof, and a source thereof is coupled to a drain of the transistor SEL.

A gate of the transistor SEL is coupled to the control line SELL, the drain thereof is coupled to the source of the transistor AMP, and a source thereof is coupled to the signal line SGL.

This configuration brings the transistor SEL into an ON state in the imaging pixel P1 on the basis of the signal SSEL applied to the control line SELL, thereby causing the imaging pixel P1 to be electrically coupled to the signal line SGL. This causes the transistor AMP to be coupled to a current source 23 (described later) of the readout section 20 and thus to operate as a source follower. Further, the imaging pixel P1 outputs, as the signal SIG, the pixel voltage VP corresponding to a voltage in the floating diffusion FD to the signal line SGL. Specifically, the imaging pixel P1 sequentially outputs eight pixel voltages VP (VP1 to VP8) during eight periods (conversion periods T1 to T8) within a so-called horizontal period H, as described later.

FIG. 3 illustrates an example of an arrangement of photodiodes PD1 and PD2 in the normal pixel region R1. In FIG. 3, "R" denotes a red color filter, "G" denotes a green color filter, and "B" denotes a blue color filter. In this example, the photodiode PD1 has an octagonal shape, and the photodiode PD2 has a quadrangular shape. As illustrated in this diagram, the light-receiving region of the photodiode PD1 where light is receivable is broader than the light-receiving region of the photodiode PD2 where light is receivable. In each of the imaging pixels P1, the photodiode PD2 is formed at the upper right of the photodiode PD1. Color filters of the same color are formed on the respective two photodiodes PD1 and PD2 in each of the imaging pixels P1.

Description is given next of the light-shielded pixel P2 in the light-shielded pixel region R2. Similarly to the normal pixel region R1 (FIG. 2), the pixel array 9 includes, in the light-shielded pixel region R2, the plurality of control lines TGLL, the plurality of control lines FDGL, the plurality of control lines RSTL, the plurality of control lines FCGL, the plurality of control lines TGSL, the plurality of control lines SELL, and the plurality of signal lines SGL.

Similarly to the imaging pixel P1 (FIG. 2), the light-shielded pixel P2 includes the photodiode PD1, the transistor TGL, the photodiode PD2, the transistor TGS, the capacitor element FC, the transistors FCG, RST, and FDG, the floating diffusion FD, and the transistors AMP and SEL. Unlike the imaging pixel P1, the light-shielded pixel P2 is shielded from light to prevent light from entering the photodiodes PD1 and PD2.

Similarly to the imaging pixel P1, this configuration brings the transistor SEL into an ON state in the light-shielded pixel P2 on the basis of the signal SSEL applied to the control line SELL, thereby causing the light-shielded pixel P2 to be electrically coupled to the signal line SGL. Further, the light-shielded pixel P2 outputs, as the signal SIG, the pixel voltage VP corresponding to a voltage in the floating diffusion FD to the signal line SGL. The light-shielded pixel P2 is shielded from light, and thus outputs the signal SIG corresponding to a dark current of each of the photodiodes PD1 and PD2.

The scanning section 10 (FIG. 1) sequentially drives the imaging pixels P1 and the light-shielded pixels P2 in the pixel array 9 in a unit of pixel line L, on the basis of an instruction from the imaging control section 30. The scanning section 10 includes an address decoder 11, a logic section 12, and a driver section 13.

The address decoder 11 selects, on the basis of an address signal supplied from the imaging control section 30, a pixel line L, in the pixel array 9, corresponding to an address indicated by the address signal. The logic section 12 generates each of signals STGL1, SFDG1, SRST1, SFCG1, STGS1, and SSEL1 corresponding to respective pixel lines L on the basis of an instruction from the address decoder 11. The driver section 13 generates each of the signals STGL, SFDG, SRST, SFCG, STGS, and SSEL corresponding to the respective pixel lines L, on the basis of the signals STGL1, SFDG1, SRST1, SFCG1, STGS1, and SSEL1 corresponding to the respective pixel lines L.

The readout section 20 generates image signal DATA0 by performing AD conversion on the basis of the signal SIG supplied from the pixel array 9 through the signal line SGL.

FIG. 4 illustrates a configuration example of the readout section 20. It is to be noted that FIG. 4 also depicts the imaging control section 30 and the signal processing section 40, in addition to the readout section 20. The readout section 20 includes a plurality of AD (Analog to Digital) conversion sections ADC (AD conversion sections ADC[0], ADC[1], ADC[2], . . . ), a plurality of switch sections SW (switch sections SW[0], SW[1], SW[2], . . . ), and a bus wiring line BUS.

The AD conversion section ADC converts a voltage of the signal SIG to a digital code CODE by performing AD conversion on the basis of the signal SIG supplied from the pixel array 9. The plurality of AD conversion sections ADC are provided in a manner corresponding to the respective plurality of signal lines SGL. Specifically, a 0-th AD conversion section ADC[0] is provided in a manner corresponding to a 0-th signal line SGL[0]. A first AD conversion section ADC[1] is provided in a manner corresponding to a first signal line SGL[1]. A second AD conversion section ADC[2] is provided in a manner corresponding to a second signal line SGL[2].

The AD conversion section ADC includes capacitor elements 21 and 22, the current source 23, a comparator 24, a counter 25, and a latch 26. A reference signal REF is supplied to one end of the capacitor element 21, and the other end thereof is coupled to a positive input terminal of the comparator 24. The reference signal REF is generated by a reference signal generator 31 (described later) of the imaging control section 30, and has a so-called ramp waveform in which a voltage level is gradually lowered with lapse of time, during the eight periods (conversion periods T1 to T8) for performing of the AD conversion, as described later. One end of the capacitor element 22 is coupled to the signal line SGL, and the other end thereof is coupled to a negative input terminal of the comparator 24. The current source 23 flows a current of a predetermined current value to the ground from the signal line SGL. The comparator 24 compares an input voltage at the positive input terminal and an input voltage at the negative input terminal with each other, and outputs a result of the comparison as a signal CMP. The reference signal REF is supplied to the positive input terminal of the comparator 24 through the capacitor element 21, and the signal SIG is supplied to the negative input terminal thereof through the capacitor element 22. The comparator 24 also has a function of performing a zero adjustment in which the positive input terminal and the negative input terminal are electrically coupled together during a predetermined period described later. The counter 25 performs a counting operation on the basis of the signal CMP supplied from the comparator 24, and on the basis of a clock signal CLK and a control signal CC that are supplied from the imaging control section 30. The latch 26 retains a count value CNT obtained by the counter 25, as the digital code CODE having a plurality of bits.

The switch section SW supplies the digital code CODE outputted from the AD conversion section ADC to the bus wiring line BUS on the basis of a control signal SSW supplied from the imaging control section 30. The plurality of switch sections SW are provided in a manner corresponding to the respective plurality of AD conversion sections ADC. Specifically, a 0-th switch section SW[0] is provided in a manner corresponding to the 0-th AD conversion section ADC[0]. A first switch section SW[1] is provided in a manner corresponding to the first AD conversion section ADC[1]. A second switch section SW[2] is provided in a manner corresponding to the second AD conversion section ADC[2].

In this example, the switch section SW is configured using the same number of transistors as the number of bits of the digital code CODE. These transistors are each controlled to be ON/OFF on the basis of each of bits of the control signal SSW (control signals SSW[0], SSW[1], SSW[2], . . . ) supplied from the imaging control section 30. Specifically, for example, the 0-th switch section SW[0] supplies to the bus wiring line BUS the digital code CODE outputted from the 0-th AD conversion section ADC[0], upon each of the transistors being brought into an ON state on the basis of the control signal SSW[0]. Likewise, for example, the first switch section SW[1] supplies to the bus wiring line BUS the digital code CODE outputted from the first AD conversion section ADC[1], upon each of the transistors being brought into an ON state on the basis of the control signal SSW[1]. The same holds true also for other switch sections SW.

The bus wiring line BUS includes a plurality of wiring lines, and transmits the digital code CODE outputted from the AD conversion section ADC. The readout section 20 uses the bus wiring line BUS to sequentially transfer to the signal processing section 40 the plurality of digital code CODE supplied from the AD conversion section ADC as the image signal DATA0 (data transfer operation).

The imaging control section 30 (FIG. 1) supplies the control signal to the scanning section 10, the readout section 20, and the signal processing section 40, and controls operations of these circuits to thereby control an operation of the imaging device 1.

The imaging control section 30 includes the reference signal generator 31. The reference signal generator 31 generates the reference signal REF. The reference signal REF has the so-called ramp waveform in which a voltage level is gradually lowered with lapse of time, during the eight periods (conversion periods T1 to T8) for performing of the AD conversion. Further, the reference signal generator 31 supplies the generated reference signal REF to the AD conversion section ADC of the readout section 20.

This configuration allows the imaging control section 30 to supply an address signal to the scanning section 10, for example, to thereby control the scanning section 10 to sequentially drive, in the unit of pixel line L, the imaging pixels P1 and the light-shielded pixels P2 in the pixel array 9. Further, the imaging control section 30 supplies to the readout section 20 the reference signal REF, the clock signal CLK, the control signal CC, and the control signal SSW (control signals SSW[0], SSW[1], SSW[2], . . . ) to thereby control the readout section 20 to generate the image signal DATA0 on the basis of the signal SIG. Further, the imaging control section 30 supplies the control signal to the signal processing section 40 to thereby control the operation of the signal processing section 40.

The signal processing section 40 performs a signal processing on an image represented by the image signal DATA0. The signal processing section 40 includes an image processor 41 and a blooming detector 42.

The image processor 41 performs a predetermined image processing on an image represented by the image signal DATA0. The predetermined image processing includes a dark current correction processing and an image synthesis processing, for example. In the dark current correction processing, the image processor 41 subtracts a contributed part of the dark current of each of the photodiodes PD1 and PD2 from the digital code CODE included in the image signal DATA0. Specifically, the signal processing section 40 performs the dark current correction processing by correcting the digital code CODE of the imaging pixel P1 on the basis of the digital code CODE of the light-shielded pixel P2. In the image synthesis processing, the image processor 41 generates four images PIC (images PIC1, PIC2, PIC3, and PIC4) on the basis of eight digital codes CODE (digital codes CODE1 to CODER) that are supplied from the readout section 20 and obtained during the eight periods (conversion periods T1 to T8) for performing of the AD conversion. Further, the image processor 41 synthesizes the four images PIC to thereby generate one captured image PICA. Thereafter, the image processor 41 outputs the captured image PICA as the image signal DATA.

The blooming detector 42 detects so-called blooming in which the imaging pixels P1 and the light-shielded pixels P2 are in a saturated state due to the dark current of each of the photodiodes PD1 and PD2.

FIGS. 5A, 5B, and 5C each schematically illustrate the blooming, and indicate a pixel value in each of the pixels. In FIGS. 5A, 5B, and 5C, a pixel having a high pixel value is drawn white, and a pixel having a low pixel value is drawn black. For example, in a case where the imaging device 1 is operated for a long period of time, there may be a case where the dark current of the photodiode is increased in a later stage. The pixel value in each of the pixels in a captured image is a sum of a pixel value resulting from an amount of light reception and a pixel value resulting from the dark current. Accordingly, in a case where the dark current of the photodiode is increased, a pixel value of a pixel including the photodiode results in being higher than a desired pixel value. In particular, an electric charge resulting from the dark current of the photodiode is accumulated to such a state that the pixel is not be able to accumulate the electric charge any more (saturated state), the pixel including the photodiode (e.g., a pixel W1 in FIG. 5A) is saturated. The electric charge resulting from the dark current of the photodiode is leaked to pixels (e.g., a pixel W2 in FIG. 5A) near the pixel W1, causing a pixel value in the pixel W2 to be increased. Thereafter, with further lapse of time, the pixel W2 is also brought into a saturated state, and the electric charge in the pixel W2 is leaked to pixels (e.g., a pixel W3 in FIG. 5B) near the pixel W2, causing a pixel value in the pixel W3 to be increased. Thereafter, with further lapse of time, the pixel W3 is also brought into a saturated state, and the electric charge in the pixel W3 is leaked to pixels (e.g., a pixel W4 in FIG. 5C) near the pixel W3, causing a pixel value in the pixel W4 to be increased. In this manner, the blooming expands isotropically with lapse of time. It is possible for the blooming detector 42 to detect blooming in one or a plurality of pixels.

The blooming detector 42 performs blooming detection, for example, by detecting whether the photodiode PD1 is in a saturated state, whether the photodiode PD2 is in a saturated state, and whether a ratio (an electric charge ratio RQ) between the electric charge amount caused by the photodiode PD1 and the electric charge amount caused by the photodiode PD2 is within a predetermined range, in each of the plurality of imaging pixels P1 and the plurality of light-shielded pixels P2, on the basis of the digital code CODE included in the image signal DATA0. That is, for example, it is possible for the blooming detector 42 to determine that blooming has occurred to the photodiode PD1 in a case where the photodiode PD1 is saturated, and to determine that blooming has occurred to the photodiode PD2 in a case where the photodiode PD2 is saturated. Further, it is possible for the blooming detector 42 to determine that blooming has occurred to the pixel P (imaging pixel P1 or light-shielded pixel P2) including the photodiodes PD1 and PD2 in a case where the electric charge ratio RQ is outside the predetermined range. That is, in a case where time for electric charge accumulation is the same between the photodiode PD1 and the photodiode PD2, the electric charge ratio RQ is expected to be a predetermined value that is determined mainly by an area ratio between the light-receiving regions of the photodiodes PD1 and PD2, and by a material and a shape of each of the photodiodes PD1 and PD2. Accordingly, in the case where the electric charge ratio RQ is outside the predetermined range, it is possible for the blooming detector 42 to determine that blooming has occurred to the pixel P including the photodiodes PD1 and PD2.

The blooming detector 42 determines illuminance (luminance) on the basis of a captured image, and performs the blooming detection in a case where the illuminance is within a predetermined range. That is, for example, in a case where illuminance is high, there is a possibility that, for example, the electric charge amount caused by the photodiode PD1 may be saturated, thus leading to a possibility that blooming may not be detected accurately. Further, in a case where illuminance is low, for example, an S/N ratio caused by the photodiode PD2 is lowered, thus leading to a possibility that blooming may not be detected accurately. Accordingly, the blooming detector 42 performs the blooming detection in such an illumination range as not to saturate the electric charge amount caused by the photodiode PD1 and as not to lower the S/N ratio caused by the photodiode PD2.

FIG. 6 illustrates a configuration example of the blooming detector 42. As described later, when generating the four images PIC (images PIC1 to PIC4) on the basis of the eight digital codes CODE (digital codes CODE1 to CODER) that are supplied from the readout section 20 and obtained during the eight periods (conversion periods T1 to T8) for performing of the AD conversion, the image processor 41 generates a pixel value VAL2 on the basis of the digital codes CODE1 and CODE4, and generates a pixel value VAL3 on the basis of the digital codes CODE5 and CODE6. The pixel value VAL2 is a value corresponding to the electric charge amount caused by the photodiode PD1, and the pixel value VAL3 is a value corresponding to the electric charge amount caused by the photodiode PD2. The blooming detector 42 performs the blooming detection on the basis of the pixel values VAL2 and VAL3. The blooming detector 42 includes a saturation determiner 43, an electric charge ratio determiner 44, a pattern determiner 45, and registers 46 and 47. The blooming detector 42 is configured using a logic circuit in this example.

The saturation determiner 43 determines whether the photodiode PD1 is in a saturated state on the basis of the pixel value VAL2, and determines whether the photodiode PD2 is in a saturated state on the basis of the pixel value VAL3. Further, the saturation determiner 43 outputs a determination result as a determination result signal S43.

The electric charge ratio determiner 44 detects whether the ratio (the electric charge ratio RQ) between the electric charge amount caused by the photodiode PD1 and the electric charge amount caused by the photodiode PD2 is within a predetermined range on the basis of the pixel values VAL2 and VAL3. The electric charge ratio determiner 44 includes a multiplication circuit 51, a comparator 52, a multiplication circuit 53, a comparator 54, and an OR circuit 55.

The multiplication circuit 51 multiplies the pixel value VAL3 and a threshold value THmax together. The comparator 52 compares the pixel value VAL2 and an output value of the multiplication circuit 51 with each other. The pixel value VAL2 is supplied to a positive input terminal of the comparator 52, and the output value of the multiplication circuit 51 is supplied to a negative input terminal of the comparator 52. This configuration allows the comparator 52 to output "1" in a case where the pixel value VAL2 is larger than the output value (VAL3×THmax) of the multiplication circuit 51, and to output "0" in a case where the pixel value VAL2 is smaller than the output value (VAL3×THmax) of the multiplication circuit 51.

The multiplication circuit 53 multiplies the pixel value VAL3 and a threshold value THmin together. The comparator 54 compares the pixel value VAL2 and an output value of the multiplication circuit 53 with each other. The output value of the multiplication circuit 53 is supplied to a positive input terminal of the comparator 54, and the pixel value VAL2 is supplied to a negative input terminal thereof. This configuration allows the comparator 54 to output "1" in a case where the pixel value VAL2 is smaller than the output value (VAL3×THmin) of the multiplication circuit 53, and to output "0" in a case where the pixel value VAL2 is larger than the output value (VAL3×THmin) of the multiplication circuit 53.

The OR circuit 55 determines a logic sum (OR) of an output signal of the comparator 52 and an output signal of the comparator 54. Further, the OR circuit 55 outputs an operation result as a determination result signal S44.

This configuration allows the electric charge ratio determiner 44 to set the determination result signal S44 to "1" in a case where the pixel value VAL2 is larger than the output value (VAL3×THmax) of the multiplication circuit 51 and in a case where the pixel value VAL2 is smaller than the output value (VAL3×THmin) of the multiplication circuit 53. In addition, this configuration allows the electric charge ratio determiner 44 to set the determination result signal S44 to "1" in a case where the pixel value VAL2 is larger than the output value (VAL3×THmin) of the multiplication circuit 53 and where the pixel value VAL2 is smaller than the output value (VAL3×THmax) of the multiplication circuit 51. In this manner, the electric charge ratio determiner 44 detects whether the ratio (the electric charge ratio RQ) between the electric charge amount caused by the photodiode FD1 and the electric charge amount caused by the photodiode FD2 is within a predetermined range.

As described later, the pattern determiner 45 detects blooming by generating a determination result pattern PAT corresponding to the pixel line L in one row on the basis of the determination result signals S43 and S44, and by determining whether the determination result pattern PAT includes a reference pattern PATR (described later) corresponding to set value information INF supplied from the outside. Further, the pattern determiner 45 outputs a detection result as a detection flag signal ER.

The register 46 stores the threshold value THmax, and the register 47 stores the threshold value THmin.

In the imaging device 1, each block illustrated in FIG. 1 may be formed on one semiconductor substrate, for example.

FIG. 7 illustrates an example of a circuit arrangement in a semiconductor substrate 200. The pixel array 9 is formed on the semiconductor substrate 200. Further, in FIG. 7, the scanning section 10 is formed on the left of the pixel array 9, and the readout section 20 and a logic circuit section 201 are formed in this order on the pixel array 9. The logic circuit section 201 corresponds to the imaging control section 30 and the signal processing section 40. Further, a terminal section 202 including a plurality of terminals is formed at the left end of the semiconductor substrate 200. Likewise, a terminal section 203 including a plurality of terminals is formed at the right end of the semiconductor substrate 200. The detection flag signal ER outputted from the signal processing section 40 (logic circuit section 201) is outputted from the imaging device 1 through, for example, a terminal, in the terminal section 202, nearest to the signal processing section 40, as indicated by an arrow in FIG. 7.

Here, the imaging pixel P1 and the light-shielded pixel P2 correspond to a specific example of a "pixel" in the present disclosure. The readout section 20 corresponds to a specific example of a "generating section" in the present disclosure. The blooming detector 42 corresponds to a specific example of a "diagnosis section" in the present disclosure. The electric charge ratio RQ corresponds to a specific example of a "detection ratio" in the present disclosure. The control line TGLL corresponds to a specific example of a "first control line" in the present disclosure. The control line RSTL corresponds to a specific example of a "second control line" in the present disclosure. The control line FDGL corresponds to a specific example of a "third control line" in the present disclosure. The control line TGSL corresponds to a specific example of a "fourth control line" in the present disclosure. The control line FCGL corresponds to a specific example of a "fifth control line" in the present disclosure.

The floating diffusion FD corresponds to a specific example of a "first accumulation section" in the present disclosure. The capacitor element FC corresponds to a specific example of a "second accumulation section" in the present disclosure. The transistor TGL corresponds to a specific example of a "first transistor" in the present disclosure. The transistor RST corresponds to a specific example of a "second transistor" in the present disclosure. The transistor FDG corresponds to a specific example of a "third transistor" in the present disclosure. The transistor TGS corresponds to a specific example of a "fourth transistor" in the present disclosure. The transistor FCG corresponds to a specific example of a "fifth transistor" in the present disclosure. The transistors AMP and SEL correspond to a specific example of an "output section" in the present disclosure.

Operations and Workings

Description is given next of operations and workings of the imaging device 1 of the present embodiment.

(Overview of Overall Operation)

First, description is given of an overview of an overall operation of the imaging device 1 with reference to FIGS. 1 and 4. The scanning section 10 sequentially drives the imaging pixels P1 and the light-shielded pixels P2 in the pixel array 9 in the unit of pixel line L. The imaging pixel P1 and the light-shielded pixel P2 each sequentially output the eight pixel voltages VP1 to VP8 during the eight conversion periods T1 to T8. The AD conversion sections ADC of the readout section 20 each perform AD conversion on the basis of these eight pixel voltages VP1 to VP8, and each output the eight digital codes CODE (digital codes CODE1 to CODE8). The signal processing section 40 generates the four images PIC (images PIC1 to PIC4) on the basis of the eight digital codes CODE1 to CODE8 that are supplied from the readout section 20. Further, the signal processing section 40 synthesizes the four images PIC to thereby generate one captured image PICA, and outputs the captured image PICA as the image signal DATA. The blooming detector 42 of the signal processing section 40 detects so-called blooming in which the imaging pixels P1 and the light-shielded pixels P2 are in a saturated state due to the dark current of each of the photodiodes PD1 and PD2, and outputs the detection result as the detection flag signal ER.

(Detailed Operation)

In the imaging device 1, the plurality of pixels P (imaging pixels P1 and light-shielded pixels P2) in the pixel array 9 each accumulate an electric charge corresponding to an amount of light reception, and output the pixel voltage VP corresponding to the amount of light reception as the signal SIG. In the following, this operation is described in detail.

FIG. 8 illustrates an example of an operation of scanning the plurality of pixels P in the pixel array 9.

The imaging device 1 performs an accumulation start drive D1 on the plurality of pixels P in the pixel array 9 sequentially from above in a vertical direction during a period of timings t0 to t1. Specifically, the scanning section 10 sets the transistors TGL, RST, FDG, TGS, and FCG to be in an ON state during a predetermined period within the horizontal period H, for example, sequentially from above in the vertical direction in the unit of pixel line L. This allows an electric charge to be accumulated in each of the plurality of pixels P during an accumulation period T10 that lasts until a readout drive D2 is performed.

Further, the imaging device 1 performs the readout drive D2 on the plurality of pixels P sequentially from above in the vertical direction during a period of timings t10 to t11. This allows each of the plurality of pixels P to sequentially output the eight pixel voltages VP1 to VP8. The readout section 20 performs the AD conversion on the basis of each of these eight pixel voltages VP1 to VP8, and outputs each of the eight digital codes CODE (CODE1 to CODE8).

Thereafter, the signal processing section 40 generates the four images PIC (images PIC1, PIC2, PIC3, and PIC4) on the basis of the eight digital codes CODE1 to CODE8 that are supplied from the readout section 20, and synthesizes the four images PIC to thereby generate one captured image PICA.

The imaging device 1 repeats the accumulation start drive D1 and the readout drive D2 in this manner. Specifically, as illustrated in FIG. 8, the imaging device 1 performs the accumulation start drive D1 during a period of timings t2 to t3, and performs the readout drive D2 during a period of timings t12 to t13. Further, the imaging device 1 performs the accumulation start drive D1 during a period of timings t4 to t5, and performs the readout drive D2 during a period of timings t14 to t15.

(Concerning Readout Drive D2)

Description is given next in detail of the readout drive D2. An operation of the imaging pixel P1A is described below in detail by focusing on an imaging pixel P1A of the plurality of imaging pixels P1.

FIGS. 9, 10A, and 10B each illustrate an operation example of the imaging device 1, in which (A) indicates a waveform of a horizontal synchronization signal XHS, (B) indicates a waveform of the signal SSEL to be supplied to the imaging pixel P1A, (C) indicates a waveform of the signal SRST to be supplied to the imaging pixel P1A, (D) indicates a waveform of the signal SFDG to be supplied to the imaging pixel P1A, (E) indicates a waveform of the signal STGL to be supplied to the imaging pixel P1A, (F) indicates a waveform of the signal SFCG to be supplied to the imaging pixel P1A, (G) indicates a waveform of the signal STGS to be supplied to the imaging pixel P1A, (H) indicates a waveform of the reference signal REF, (I) indicates a waveform of the signal SIG to be outputted from the imaging pixel P1A, and (J) indicates an operation of the counter 25 in the AD conversion section ADC coupled to the imaging pixel P1A. FIG. 10A illustrates a former half operation of the operation illustrated in FIG. 9, and FIG. 10B illustrates a latter half operation of the operation illustrated in FIG. 9. In (H) and (I) of FIG. 9, (H) and (I) of FIG. 10A, and (H) and (I) of FIG. 10B, waveforms of the respective signals are indicated in the same voltage axis. The reference signal REF in each of (H) of FIG. 9, (H) of FIG. 10A, and (H) of FIG. 10B indicates a waveform of the comparator 24 at the positive input terminal, and the signal SIG in each of (I) of FIG. 9, (I) of FIG. 10A, and (I) of FIG. 10B indicates a waveform of the comparator 24 at the negative input terminal. Further, in (J) of FIG. 9, (J) of FIG. 10A, and (J) of FIG. 10B, hatched lines indicate a counting operation performed by the counter 25.

FIGS. 11A, 11B, and 11C each indicate a state of the imaging pixel P1A. The FIGS. 11A, 11B, and 11C each illustrate the transistors TGL, RST, FDG, TGS, FCG, and SEL using respective switches in response to operation states of the transistors.

In the imaging device 1, in a certain horizontal period H, the scanning section 10 first selects a pixel line L including the imaging pixel P1A using the signal SSEL, and electrically couples the imaging pixel P1A to the signal line SGL corresponding to the imaging pixel P1A. Further, the scanning section 10 controls the operation of the imaging pixel P1A using the signals SRST, SFDG, STGL, SFCG, and STGS, and the imaging pixel P1A sequentially outputs the eight pixel voltages VP1 to VP8 during the eight conversion periods T1 to T8. Further, the AD conversion sections ADC of the readout section 20 each perform the AD conversion on the basis of these eight pixel voltages VP1 to VP8, and output the eight digital codes CODE1 to CODER. The operation is described below in detail.

First, when the horizontal period H is started at the timing t1, the scanning section 10 changes a voltage of the signal SSEL from a low level to a high level at the timing t2 ((B) of FIG. 10A). This brings the transistor SEL into an ON state in the imaging pixel P1A, causing the imaging pixel P1A to be electrically coupled to the signal line SGL.

During a period until the timing t11, the scanning section 10 brings both the signals SRST and SFDG into a high level ((C) and (D) of FIG. 10A). This brings both the transistors RST and FDG into an ON state in the imaging pixel P1A, causing a voltage of the floating diffusion FD to be set at the power supply voltage VDD, and the floating diffusion FD is reset.

(Operations at Timings t11 to t21)

Next, at the timing t11, the scanning section 10 changes a voltage of the signal SFDG from a high level to a low level ((D) of FIG. 10A). This brings the transistor FDG into an OFF state in the imaging pixel P1A. Next, at the timing t12, the scanning section 10 changes a voltage of the signal SRST from a high level to a low level ((C) of FIG. 10A). This brings the transistor RST into an OFF state in the imaging pixel P1A. Next, at the timing t13, the scanning section 10 changes the voltage of the signal SFDG from a low level to a high level ((D) of FIG. 10A). This brings the transistor FDG into an ON state in the imaging pixel P1A. Further, the comparator 24 performs the zero adjustment in which the positive input terminal and the negative input terminal are electrically coupled together during a period of the timings t13 to t14.

Next, at the timing t14, the comparator 24 ends the zero adjustment to electrically cut the positive input terminal and the negative input terminal from each other. Further, at the timing t14, the reference signal generator 31 changes a voltage of the reference signal REF to a voltage V1 ((H) of FIG. 10A).

As illustrated in FIG. 11A, in the imaging pixel P1A, this brings the transistors FDG and SEL into an ON state, and brings all other transistors into an OFF state. Because of the ON state of the transistor FDG, the floating diffusion FD and the transistor FDG configure a combined capacitance. The combined capacitance serves as a conversion capacitance that converts an electric charge into a voltage in the imaging pixel P1A. In this manner, the transistor FDG is in an ON state in the imaging pixel P1A, and accordingly a capacitance value of the conversion capacitance in the imaging pixel P1A is large, thus resulting in low conversion efficiency from an electric charge to a voltage. This conversion capacitance retains an electric charge at a time when the floating diffusion FD is reset during the period until the timing t12. The imaging pixel P1A outputs the pixel voltage VP (a pixel voltage VP1) corresponding to the voltage in the floating diffusion FD at that time.

Next, during a period of timings t15 to t17 (a conversion period T1), the AD conversion section ADC performs the AD conversion on the basis of the pixel voltage VP1. Specifically, at the timing t15, the imaging control section 30 starts generating the clock signal CLK. At the same time, the reference signal generator 31 starts lowering the voltage of the reference signal REF from the voltage V1 at a predetermined change degree ((H) of FIG. 10A). The counter 25 of the AD conversion section ADC accordingly starts the counting operation ((J) of FIG. 10A).

Further, at the timing t16, the voltage of the reference signal REF falls below the voltage of the signal SIG (the pixel voltage VP1) ((H) and (I) of FIG. 10A). The comparator 24 of the AD conversion section ADC accordingly changes a voltage of the signal CMP. As a result, the counter 25 stops the counting operation ((J) of FIG. 10A). The count value CNT of the counter 25 at a time when the counting operation is stopped corresponds to the pixel voltage VP1. The AD conversion section ADC thus performs the AD conversion on the basis of the pixel voltage VP1, and the latch 26 of the AD conversion section ADC outputs the count value CNT of the counter 25 as the digital code CODE1 ((J) of FIG. 10A).

Thereafter, at the timing t17, the imaging control section 30 stops generating the clock signal CLK along with the end of the conversion period T1, the reference signal generator 31 stops changing the voltage of the reference signal REF ((H) of FIG. 10A), and the counter 25 resets the count value CNT.

(Operations at Timings t21 to t31)

Next, at the timing t21, the scanning section 10 changes the voltage of the signal SFDG from a high level to a low level ((D) of FIG. 10A). This brings the transistor FDG into an OFF state in the imaging pixel HA. Further, the comparator 24 performs the zero adjustment in which the positive input terminal and the negative input terminal are electrically coupled together during a period of timings t21 to t22.

Next, at the timing t22, the comparator 24 ends the zero adjustment to electrically cut the positive input terminal and the negative input terminal from each other. Further, at the timing t22, the reference signal generator 31 changes the voltage of the reference signal REF to the voltage V1 ((H) of FIG. 10).

As illustrated in FIG. 11B, in the imaging pixel P1A, this brings the transistor SEL into an ON state, and brings all other transistors into an OFF state. In this manner, the transistor FDG is in an OFF state in the imaging pixel P1A, and accordingly the capacitance value of the conversion capacitance in the imaging pixel P1A is small, thus resulting in high conversion efficiency from an electric charge to a voltage. This conversion capacitance retains an electric charge at a time when the floating diffusion FD is reset during the period until the timing t12. The imaging pixel P1A outputs the pixel voltage VP (a pixel voltage VP2) corresponding to the voltage in the floating diffusion FD at that time.

Next, during a period of timings t23 to t25 (a conversion period T2), the AD conversion section ADC performs the AD conversion on the basis of the pixel voltage VP2. This operation is similar to the operation in the conversion period T1. The AD conversion section ADC performs the AD conversion on the basis of the pixel voltage VP2, and the latch 26 of the AD conversion section ADC outputs the count value CNT of the counter 25 as the digital code CODE2 ((J) of FIG. 10A).

(Operations at Timings t31 to t41)

Next, at a timing t31, the scanning section 10 changes a voltage of the signal STGL from a low level to a high level ((E) of FIG. 10A). This brings the transistor TGL into an ON state in the imaging pixel P1A. This allows an electric charge generated at the photodiode PD1 to be transferred to the floating diffusion FD. Further, at the timing t31, the reference signal generator 31 changes the voltage of the reference signal REF to the voltage V1 ((H) of FIG. 10A).

Next, at a timing t32, the scanning section 10 changes the voltage of the signal STGL from a high level to a low level ((E) of FIG. 10A). This brings the transistor TGL into an OFF state in the imaging pixel P1A.

As illustrated in FIG. 11B, this causes the transistor FDG to be in an OFF state in the imaging pixel HA, and accordingly the capacitance value of the conversion capacitance in the imaging pixel HA is small, thus resulting in high conversion efficiency from an electric charge to a voltage. This conversion capacitance retains an electric charge transferred from the photodiode PD1 at the timings t31 to t32. The imaging pixel P1A outputs the pixel voltage VP (a pixel voltage VP3) corresponding to the voltage in the floating diffusion FD at that time.

Next, during a period of timings t33 to t35 (a conversion period T3), the AD conversion section ADC performs the AD conversion on the basis of the pixel voltage VP3. This operation is similar to the operation in the conversion period T1. The AD conversion section ADC performs the AD conversion on the basis of the pixel voltage VP3, and the latch 26 of the AD conversion section ADC outputs the count value CNT of the counter 25 as the digital code CODE3 ((J) of FIG. 10A). The digital code CODE3 corresponds to the digital code CODE2 obtained in the same manner at the time when the conversion efficiency is high (the conversion period T2).

(Operations at Timings t41 to t51)

Next, at a timing t41, the scanning section 10 changes the voltage of the signal SFDG from a low level to a high level, and changes the voltage of the signal STGL from a low level to a high level ((D) and (E) of FIG. 10A). This brings both the transistors FDG and TGL into an ON state in the imaging pixel P1A. Further, at the timing t41, the reference signal generator 31 changes the voltage of the reference signal REF to the voltage V1 ((H) of FIG. 10A). Next, at a timing t42, the scanning section 10 changes the voltage of the signal STGL from a high level to a low level ((E) of FIG. 10A). This brings the transistor TGL into an OFF state in the imaging pixel P1A.

As illustrated in FIG. 11A, this causes the transistor FDG to be in an ON state in the imaging pixel P1A, and accordingly the floating diffusion FD and the transistor FDG configure a combined capacitance (conversion capacitance). Hence, the capacitance value of the conversion capacitance in the imaging pixel HA is large, thus resulting in low conversion efficiency from an electric charge to a voltage. This conversion capacitance retains an electric charge transferred from the photodiode PD1 at the timings t31 to t32 and t41 to t42. The pixel 1A outputs the pixel voltage VP (a pixel voltage VP4) corresponding to the voltage in the floating diffusion FD at that time.

Next, during a period of timings t43 to t45 (a conversion period T4), the AD conversion section ADC performs the AD conversion on the basis of the pixel voltage VP4. This operation is similar to the operation in the conversion period T1. The AD conversion section ADC performs the AD conversion on the basis of the pixel voltage VP4, and the latch 26 of the AD conversion section ADC outputs the count value CNT of the counter 25 as the digital code CODE4 ((J) of FIG. 10A). The digital code CODE4 corresponds to the digital code CODE1 obtained in the same manner at the time when the conversion efficiency is low (the conversion period T1).

(Operations at Timings t51 to t61)

Next, at a timing t51, the scanning section 10 changes the voltage of the signal SRST from a low level to a high level ((C) of FIG. 10B). This brings the transistor RST into an ON state in the imaging pixel HA. This causes the voltage of the floating diffusion FD to be set at the power supply voltage VDD because of the ON state of the transistor FDG, and the floating diffusion FD is reset. Next, at a timing t52, the scanning section 10 changes the voltage of the signal SRST from a high level to a low level ((C) of FIG. 10B). This brings the transistor RST into an OFF state in the imaging pixel HA. Further, at the timing t52, the reference signal generator 31 changes the voltage of the reference signal REF to the voltage V1 ((H) of FIG. 10B).

Next, at a timing t53, the scanning section 10 changes the voltage of the signal SFCG from a low level to a high level ((F) of FIG. 10B). This brings the transistor FCG into an ON state in the imaging pixel P1A. Further, the comparator 24 performs the zero adjustment in which the positive input terminal and the negative input terminal are electrically coupled together during a period of timings t53 to t54.

Next, at a timing t54, the comparator 24 ends the zero adjustment to electrically cut the positive input terminal and the negative input terminal from each other. Further, at the timing t54, the reference signal generator 31 changes the voltage of the reference signal REF to the voltage V1 ((H) of FIG. 10A).

As illustrated in FIG. 11C, in the imaging pixel P1A, this brings the transistors FDG, FCG, and SEL into an ON state, and brings all other transistors into an OFF state. The transistors FDG and FCG are both in an ON state, and accordingly the floating diffusion FD, the transistors FDG and FCG, and the capacitor element FC configure a combined capacitance (conversion capacitance). The conversion capacitance retains an electric charge that has been generated at the photodiode PD2 before the timing t53 and has been supplied to through the transistor TGS and accumulated in the capacitor element FC. The imaging pixel P1A outputs the pixel voltage VP (a pixel voltage VP5) corresponding to the voltage in the floating diffusion FD at that time.

Next, during a period of timings t55 to t57 (a conversion period T5), the AD conversion section ADC performs the AD conversion on the basis of the pixel voltage VP5. This operation is similar to the operation in the conversion period T1. The AD conversion section ADC performs the AD conversion on the basis of the pixel voltage VP5, and the latch 26 of the AD conversion section ADC outputs the count value CNT of the counter 25 as the digital code CODE5 ((J) of FIG. 10B).

(Operations at Timings t61 to t71)

Next, at a timing t61, the scanning section 10 changes the voltage of the signal STGS from a low level to a high level ((G) of FIG. 10B). This brings the transistor TGS into an ON state in the imaging pixel P1A. This causes the electric charge generated at the photodiode PD2 to be transferred to the floating diffusion FD and the capacitor element FC. Further, at the timing t61, the reference signal generator 31 changes the voltage of the reference signal REF to the voltage V1 ((H) of FIG. 10B).

Next, at a timing t62, the scanning section 10 changes the voltage of the signal STGS from a high level to a low level ((G) of FIG. 10B). This brings the transistor TGS into an OFF state in the imaging pixel P1A.

As illustrated in FIG. 11C, in the imaging pixel P1A, this causes both the transistors FDG and FCG to be in an ON state, and accordingly the floating diffusion FD, the transistors FDG and FCG, and the capacitor element FC configure a combined capacitance (conversion capacitance). The conversion capacitance retains the electric charge transferred from the photodiode PD2 at the timings t61 to t62, in addition to the electric charge that has been generated at the photodiode PD2 before the timing t53 and has been supplied to through the transistor TGS and accumulated in the capacitor element FC. The imaging pixel P1A outputs the pixel voltage VP (a pixel voltage VP6) corresponding to the voltage in the floating diffusion FD at that time.

Next, during a period of timings t63 to t65 (a conversion period T6), the AD conversion section ADC performs the AD conversion on the basis of the pixel voltage VP6. This operation is similar to the operation in the conversion period T1. The AD conversion section ADC performs the AD conversion on the basis of the pixel voltage VP6, and the latch 26 of the AD conversion section ADC outputs the count value CNT of the counter 25 as the digital code CODE6 ((J) of FIG. 10B). The digital code CODE6 corresponds to the digital code CODE5 obtained at the time when the floating diffusion FD, the transistors FDG and FCG, and the capacitor element FC configure the combined capacitance.

(Operations at Timings t71 to t81)

Next, the comparator 24 performs the zero adjustment in which the positive input terminal and the negative input terminal are electrically coupled together in a period of timings t71 to t72.

Next, at a timing t72, the comparator 24 ends the zero adjustment to electrically cut the positive input terminal and the negative input terminal from each other. Further, at the timing t72, the reference signal generator 31 changes the voltage of the reference signal REF to the voltage V1 ((H) of FIG. 10A).

As illustrated in FIG. 11C, in the imaging pixel P1A, this causes both the transistors FDG and FCG to be in an ON state, and accordingly the floating diffusion FD, the transistors FDG and FCG, and the capacitor element FC configure a combined capacitance (conversion capacitance). The conversion capacitance retains the electric charge transferred from the photodiode PD2 at the timings t61 to t62, in addition to the electric charge that has been generated at the photodiode PD2 before the timing t53 and has been supplied to through the transistor TGS and accumulated in the capacitor element FC. The imaging pixel P1A outputs the pixel voltage VP (a pixel voltage VP7) corresponding to the voltage in the floating diffusion FD at that time.

Next, during a period of timings t73 to t75 (a conversion period T7), the AD conversion section ADC performs the AD conversion on the basis of the pixel voltage VP7. This operation is similar to the operation in the conversion period T1. The AD conversion section ADC performs the AD conversion on the basis of the pixel voltage VP7, and the latch 26 of the AD conversion section ADC outputs the count value CNT of the counter 25 as the digital code CODE? ((J) of FIG. 10B).

(Operations at Timings t81 to t7)

Next, at a timing t81, the scanning section 10 changes the voltage of the signal SRST from a low level to a high level ((C) of FIG. 10B). This brings the transistor RST into an ON state in the imaging pixel P1A. Because of the ON state of the transistors FDG and FCG, the voltage of the floating diffusion FD and the voltage of the capacitor element FC are each set at the power supply voltage VDD, and the floating diffusion FD and the capacitor element FC are reset.

Next, at a timing t82, the scanning section 10 changes the voltage of the signal SFCG from a high level to a low level ((F) of FIG. 10B). This brings the transistor FCG into an OFF state in the imaging pixel P1A.

Next, at a timing t83, the scanning section 10 changes the voltage of the signal SRST from a high level to a low level ((C) of FIG. 10B). This brings the transistor RST into an OFF state in the imaging pixel P1A.

Next, at a timing t84, the scanning section 10 changes the voltage of the signal SFCG from a low level to a high level ((F) of FIG. 10B). This brings the transistor FCG into an ON state in the imaging pixel P1A. Further, at the timing t84, the reference signal generator 31 changes the voltage of the reference signal REF to the voltage V1 ((H) of FIG. 10B).

As illustrated in FIG. 11C, in the imaging pixel P1A, this causes both the transistors FDG and FCG to be in an ON state, and accordingly the floating diffusion FD, the transistors FDG and FCG, and the capacitor element FC configure a combined capacitance (conversion capacitance). The conversion capacitance retains the electric charge at the time when the floating diffusion FD and the capacitor element FC are reset at the timings t81 and t82. The imaging pixel P1A outputs the pixel voltage VP (a pixel voltage VP8) corresponding to the voltage in the floating diffusion FD at that time.

Next, during a period of timings t85 to t87 (a conversion period T8), the AD conversion section ADC performs the AD conversion on the basis of the pixel voltage VP8. This operation is similar to the operation in the conversion period T1. The AD conversion section ADC performs the AD conversion on the basis of the pixel voltage VP8, and the latch 26 of the AD conversion section ADC outputs the count value CNT of the counter 25 as the digital code CODE8 ((J) of FIG. 10B). The digital code CODE8 corresponds to the digital code CODE7 obtained at the time when the floating diffusion FD, the transistors FDG and FCG, and the capacitor element FC configure the combined capacitance.

Next, at a timing t7, the scanning section 10 changes the voltage of the signal SFDG from a high level to a low level, and changes the voltage of the signal SFCG from a high level to a low level ((D) and (F) of FIG. 10B). This brings the transistors FDG and FCG into an OFF state in the imaging pixel P1A.

Thereafter, at a timing t8, the scanning section 10 changes the voltage of the signal SSEL from a high level to a low level ((B) of FIG. 10B). This brings the transistor SEL into an OFF state in the imaging pixel P1A, causing the imaging pixel P1A to be electrically separated from the signal line SGL.

Description is given next of the image synthesis processing in the image processor 41. The image processor 41 generates the four images PIC (images PIC1 to PIC4) on the basis of the digital codes CODE that are supplied from the readout section 20. Further, the image processor 41 synthesizes the four images PIC to thereby generate one captured image PICA.

FIG. 12 schematically illustrates the image synthesis processing. Waveforms illustrated in (A) to (G) of FIG. 12 are similar to the waveforms illustrated in (A) to (G) of FIG. 9. As described referring to FIGS. 9, 10A, and 10B, the readout section 20 generates the digital code CODE1 on the basis of the operation during the period of the timings t11 to t21; the readout section 20 generates the digital code CODE2 on the basis of the operation during the period of the timings t21 to t31; the readout section 20 generates the digital code CODE3 on the basis of the operation during the period of the timings t31 to t41; the readout section 20 generates the digital code CODE4 on the basis of the operation during the period of the timings t41 to t51; the readout section 20 generates the digital code CODE5 on the basis of the operation during the period of the timings t51 to t61; the readout section 20 generates the digital code CODE6 on the basis of the operation during the period of the timings t61 to t71; the readout section 20 generates the digital code CODE7 on the basis of the operation during the period of the timings t71 to t81; and the readout section 20 generates the digital code CODE8 on the basis of the operation during the period of the timings t81 to t7.

The image processor 41 generates a pixel value VAL1 on the basis of the digital code CODE2 and the digital code CODE3. Specifically, the image processor 41 calculates the pixel value VAL1 by subtracting the digital code CODE2 from the digital code CODE3 (CODE3−CODE2). That is, the imaging device 1 uses the digital code CODE2 corresponding to a P-phase (Pre-Charged phase) data and the digital code CODE3 corresponding to a D-phase (Data phase) data by utilizing a principle of so-called correlated double sampling (CDS; Correlated Double Sampling) to calculate the pixel value VAL1.

Likewise, the image processor 41 generates the pixel value VAL2 on the basis of the digital code CODE1 and the digital code CODE4. Specifically, the image processor 41 calculates the pixel value VAL2 by subtracting the digital code CODE1 from the digital code CODE4 (CODE4−CODE1). That is, the imaging device 1 uses the digital code CODE1 corresponding to the P-phase data and the digital code CODE4 corresponding to the D-phase data by utilizing the principle of the correlated double sampling to calculate the pixel value VAL2.

Likewise, the image processor 41 generates the pixel value VAL3 on the basis of the digital code CODE5 and the digital code CODE6. Specifically, the image processor 41 calculates the pixel value VAL3 by subtracting the digital code CODE5 from the digital code CODE6 (CODE6−CODE5). That is, the imaging device 1 uses the digital code CODE5 corresponding to the P-phase data and the digital code CODE6 corresponding to the D-phase data by utilizing the principle of the correlated double sampling to calculate the pixel value VAL3.

The image processor 41 generates a pixel value VAL4 on the basis of the digital code CODE7 and the digital code CODE8. Specifically, the image processor 41 calculates the pixel value VAL4 by subtracting the digital code CODE8 from the digital code CODE7 (CODE7−CODE8). That is, the imaging device 1 uses the digital code CODE7 prior to resetting the floating diffusion FD and the capacitor element FC and the digital code CODE8 subsequent to resetting the floating diffusion FD and the capacitor element FC by utilizing a principle of so-called double data sampling (DDS; Double Data Sampling) to calculate the pixel value VAL4.

Further, the image processor 41 generates the image PIC1 on the basis of respective pixel values VAL1 of all the imaging pixels P1 in the pixel array 9. The image processor 41 generates the image PIC2 on the basis of respective pixel values VAL2 of all the imaging pixels P1 in the pixel array 9. The image processor 41 generates the image PIC3 on the basis of respective pixel values VAL3 of all the imaging pixels P1 in the pixel array 9. The image processor 41 generates the image PIC4 on the basis of respective pixel values VAL4 of all the imaging pixels P1 in the pixel array 9. Thereafter, the image processor 41 synthesizes the captured image PICA by synthesizing these images PIC1 to PIC4.

(Concerning Blooming Detection)

The blooming detector 42 performs the blooming detection on the basis of the digital codes CODE supplied from the readout section 20 in the case where illuminance is within a predetermined range.

FIG. 13 schematically illustrates the blooming. In this example, the dark current of the photodiode in the pixel W1 is increased, causing a pixel W13 to be saturated. Thereafter, an electric charge resulting from the dark current of this photodiode is leaked to pixels (e.g., pixels W12 and W14 in FIG. 13) near the pixel W13, causing the pixels W12 and W14 to be saturated as well. Further, an electric charge in the pixel W12 is leaked to pixels (e.g., a pixel W11 in FIG. 13) near the pixel W12, causing a pixel value in the pixel W11 to be increased. Likewise, an electric charge in the pixel W14 is leaked to pixels (e.g., a pixel W15 in FIG. 13) near the pixel W14, causing a pixel value in the pixel W15 to be increased.

The blooming detector 42 detects such blooming in the unit of pixel line L on the basis of the pixel value VAL2 corresponding to the electric charge amount caused by the photodiode PD1 and the pixel value VAL3 corresponding to the electric charge amount caused by the photodiode PD2. Specifically, the saturation determiner 43 determines whether the photodiode PD1 is in a saturated state on the basis of the pixel value VAL2, and determines whether the photodiode PD2 is in a saturated state on the basis of the pixel value VAL3. The electric charge ratio determiner 44 detects whether the ratio (the electric charge ratio RQ) between the electric charge amount caused by the photodiode PD1 and the electric charge amount caused by the photodiode PD2 is within the predetermined range on the basis of the pixel values VAL2 and VAL3. Further, the pattern determiner 45 detects blooming by generating the determination result pattern PAT corresponding to the pixel line L in one row on the basis of the determination result signal S43 outputted from the saturation determiner 43 and the determination result signal S44 outputted from the electric charge ratio determiner 44, and by determining whether the determination result pattern PAT includes the reference pattern PATR corresponding to the set value information INF supplied from the outside.

FIG. 14 illustrates correspondence between the set value information INF and the reference pattern PATR. In this FIG. 14, data A indicated by rough hatching demonstrates that at least one of the photodiodes PD1 and PD2 is not in a saturated state and that the electric charge ratio RQ is outside the predetermined range. Data B indicated by fine hatching demonstrates that both of the photodiodes PD1 and PD2 are in a saturated state.

For example, in a case where the set value information INF is "1", the reference pattern PATR is a pattern of one type only composed of "A". Further, for example, in a case where the set value information INF is "2", the reference pattern PATR includes patterns of three types composed of "AA", "AB", and "BA". Further, for example, in a case where the set value information INF is "3", the reference pattern PATR includes patterns of three types composed of "ABA", "ABB", and "BBA". Further, for example, in a case where the set value information INF is "4", the reference pattern PATR includes patterns of three types composed of "ABBA", "ABBB", and "BBBA". Further, for example, in a case where the set value information INF is "5", the reference pattern PATR includes patterns of three types composed of "ABBBA", "ABBBB", and "BBBBA". Further, for example, in a case where the set value information INF is "6", the reference pattern PATR includes patterns of three types composed of "ABBBBA", "ABBBBB", and "BBBBBA". Further, for example, in a case where the set value information INF is "7", the reference pattern PATR includes patterns of three types composed of "ABBBBBA", "ABBBBBB", and "BBBBBBA".

The pattern determiner 45 sets the reference pattern PATR to be used for pattern determination on the basis of the set value information INF supplied from the outside. Further, the pattern determiner 45 determines whether one or more of the set reference patterns PATR are included in the determination result pattern PAT corresponding to the pixel line L in one row.

FIG. 15 illustrates an operation example of the blooming detector 42, in which (A) indicates a waveform of the horizontal synchronization signal XHS, (B) schematically indicates the pixel value VAL2, (C) schematically indicates the pixel value VAL3, (D) schematically indicates the determination result pattern PAT, and (E) indicates a waveform of the detection flag signal ER. The pixel values VAL2 and VAL3 of a plurality of pixels including five pixels W21 to W25 are supplied to the blooming detector 42 in the unit pixel line L. In this example, the set value information INF is set to "5". Accordingly, the pattern determiner 45 performs the pattern determination using the reference patterns PATR of the three types composed of "ABBBA", "ABBBB", and "BBBBA".

In this example, the saturation determiner 43 determines that the photodiode PD1 is not in a saturated state on the basis of the pixel value VAL2 of the pixel W21, and determines that the photodiode PD2 is in a saturated state on the basis of the pixel value VAL3 of the pixel W21. Further, the electric charge ratio determiner 44 determines that the ratio (the electric charge ratio RQ) between the electric charge amount caused by the photodiode PD1 and the electric charge amount caused by the photodiode PD2 is outside the predetermined range on the basis of the pixel values VAL2 and VAL3 of the pixel W21. Accordingly, the data A appears in the determination result pattern PAT.

Further, the saturation determiner 43 determines that the photodiode PD1 is in a saturated state on the basis of the pixel value VAL2 of the pixel W22, and determines that the photodiode PD2 is in a saturated state on the basis of the pixel value VAL3 of the pixel W22. Accordingly, the data B appears in the determination result pattern PAT.

Further, the saturation determiner 43 determines that the photodiode PD1 is in a saturated state on the basis of the pixel value VAL2 of the pixel W23, and determines that the photodiode PD2 is in a saturated state on the basis of the pixel value VAL3 of the pixel W23. Accordingly, the data B appears in the determination result pattern PAT.

Further, the saturation determiner 43 determines that the photodiode PD1 is in a saturated state on the basis of the pixel value VAL2 of the pixel W24, and determines that the photodiode PD2 is in a saturated state on the basis of the pixel value VAL3 of the pixel W24. Accordingly, the data B appears in the determination result pattern PAT.

Further, the saturation determiner 43 determines that the photodiode PD1 is in a saturated state on the basis of the pixel value VAL2 of the pixel W25, and determines that the photodiode PD2 is not in a saturated state on the basis of the pixel value VAL3 of the pixel W25. Further, the electric charge ratio determiner 44 determines that the electric charge ratio RQ is outside the predetermined range on the basis of the pixel values VAL2 and VAL3 of the pixel W25. Accordingly, the data A appears in the determination result pattern PAT.

The pattern determiner 45 confirms whether the determination result patter PAT includes any of the reference patterns PATR of the three types ("ABBBA", "ABBBB", and "BBBBA"). In this example, the determination result pattern PAT includes "ABBBA" in the pixels W21 to W25. Accordingly, the pattern determiner 45 causes the detection flag signal ER to be active.

In this manner, the blooming detector 42 performs the blooming detection.

As described above, in the imaging device 1, the blooming detection is performed during a normal imaging operation, which therefore makes it possible to detect possible photodiode abnormality that may have occurred in a later stage, thus making it possible to enhance reliability of a captured image.

Further, in the imaging device 1, the blooming detection is performed on the basis of the ratio (the electric charge ratio RQ) between the electric charge amount caused by the photodiode PD1 and the electric charge amount caused by the photodiode PD2 in each of the plurality of imaging pixels P1 and the plurality of light-shielded pixels P2, thus making it possible to enhance accuracy in the blooming detection.

That is, for example, in a case of performing the blooming detection on the basis of a ratio between an electric charge amount in the photodiode PD1 of a certain imaging pixel P1A and an electric charge amount in the photodiode PD1 of another imaging pixel P1B that belongs to the same column as that of the imaging pixel P1, the accumulation period T10 (FIG. 8) is deviated, thus leading to a possibility that influence of the deviation of the accumulation period T10 on the ratio of the electric charge amounts may lower the accuracy in the blooming detection. Further, for example, in the case of performing the blooming detection on the basis of the ratio between the electric charge amount in the photodiode PD1 of the certain imaging pixel P1A and an electric charge amount in the photodiode PD1 of another imaging pixel P1C that belongs to the same row as that of the imaging pixel P1, the AD conversion sections ADC corresponding to the respective imaging pixels P1A and P1C differ from each other, thus leading to a possibility that influence of the difference between the AD conversion sections ADC on the ratio of the electric charge amounts may lower the accuracy in the blooming detection. Further, in a case where a position of formation of the imaging pixel P1A and a position of formation of the imaging pixel P1B are distant from each other, or in a case where the position of formation of the imaging pixel P1A and a position of formation of the imaging pixel P1C are distant from each other, the ratio of the electric charge amounts varies depending on subjects, thus leading to a possibility that the accuracy in the blooming detection may be lowered.

Meanwhile, in the imaging device 1, the blooming detection is performed on the basis of the ratio of the electric charge amounts between the photodiodes PD1 and PD2 of the same imaging pixel P1A. Accordingly, the photodiodes PD1 and PD2 have the same accumulation period T10, and have the same AD conversion section ADC to be used. A position of formation of the photodiode PD1 and a position of formation of the photodiode PD2 are close to each other. As a result, in the imaging device 1, it is possible to enhance the accuracy in the blooming detection.

Further, in the imaging device 1, the blooming detection is performed in the unit of pixel line L, thus enabling the circuit configuration to be simple. That is, for example, in a case where one captured image is obtained and the blooming detection is performed on the basis of the captured image, there is a possibility that circuit components may be increased due to necessity of a frame memory, etc., for example. Meanwhile, in the imaging device 1, the blooming detection is performed in the unit of pixel line L, which therefore makes it possible to omit the frame memory, etc., for example, thus enabling the circuit configuration to be simple.

Further, in the imaging device 1, illuminance (luminance) is determined on the basis of the captured image, and the blooming detection is performed in a case where the illuminance is within a predetermined range, thus making it possible to enhance the accuracy in the blooming detection. That is, in a case where the illuminance is high, for example, there is a possibility that, for example, the electric charge amount caused by the photodiode PD1 may be saturated, thus leading to a possibility that blooming may not be detected accurately. Further, in a case where the illuminance is low, for example, the S/N ratio caused by the photodiode PD2 is lowered, thus leading to a possibility that blooming may not be detected accurately. In the imaging device 1, the blooming detection is performed in a case where the illuminance is within a predetermined range. Accordingly, the blooming detection is performed in such a range as not to saturate the electric charge amount caused by the photodiode PD1 and as not to lower the S/N ratio caused by the photodiode PD2, thus making it possible to enhance the accuracy in the blooming detection.

Effects

As described above, in the present embodiment, the blooming detection is performed during a normal imaging operation, which therefore makes it possible to detect possible photodiode abnormality that may occur in a later stage, thus making it possible to enhance reliability of a captured image.

In the present embodiment, the blooming detection is performed on the basis of the ratio between the electric charge amount caused by the photodiode PD1 and the electric charge amount caused by the photodiode PD2 in each of the plurality of pixels, thus making it possible to enhance the accuracy in the blooming detection.

In the present embodiment, the blooming detection is performed in the unit of pixel line, thus enabling the circuit configuration to be simple.

In the present embodiment, illuminance is determined on the basis of the captured image, and the blooming detection is performed in the case where the illuminance is within the predetermined range, thus making it possible to enhance the accuracy in the blooming detection.

Modification Example 1-1

In the foregoing embodiment, the blooming detection is performed in the case where the illuminance is within the predetermined range; however, this is not limitative. For example, in the case where the blooming detection is performed, adjustment may be made to allow the illuminance to be within the predetermined range by means of a mechanical shutter, etc. FIG. 16 illustrates a configuration example of an imaging system 100 according to the present modification example. The imaging system 100 includes a lens 101, a shutter 102, an imaging section 103, and a controller 104. The lens 101 forms an image on an imaging surface of the imaging section 103. The shutter 102 is a mechanical shutter that operates on the basis of an instruction from the controller 104. The imaging section 103 captures an image, and corresponds to the imaging device 1 of the foregoing embodiment. The controller 104 controls an operation of each of the shutter 102 and the imaging section 103. The controller 104 controls the operation of the shutter 102 to allow the illumination to be within the predetermined range, for example, in a case where the imaging section 103 performs the blooming detection.

Modification Example 1-2

In the foregoing embodiment, the two photodiodes PD1 and PD2 are provided for each of the plurality of imaging pixels P1 and the plurality of light-shielded pixels P2; however, this is not limitative. In the following, an imaging device 2 according to the present modification example is described in detail.

FIG. 17 illustrates a configuration example of the imaging device 2. The imaging device 2 includes a pixel array 109, a scanning section 110, a readout section 20, an imaging control section 130, and a signal processing section 140.

In the pixel array 109, the plurality of pixels P are disposed in matrix. The plurality of pixels P include a plurality of imaging pixels P11 and a plurality of light-shielded pixels P12. The plurality of imaging pixels P11 are disposed in the normal pixel region R1, and the plurality of light-shielded pixels P12 are disposed in the light-shielded pixel region R2.

FIG. 18 illustrates a configuration example of the imaging pixel P11 in the normal pixel region R1. The pixel array 109 includes, in the normal pixel region R1, the plurality of control lines TGLL, the plurality of control lines RSTL, the plurality of control lines SELL, and the plurality of signal lines SGL. The control line TGLL extends in a horizontal direction (a lateral direction in FIG. 18), and the signal STG is applied to the control line TGLL by the scanning section 110. The control line RSTL extends in a horizontal direction, and the signal SRST is applied to the control line RSTL by the scanning section 110. The control line SELL extends in a horizontal direction, and the signal SSEL is applied to the control line SELL by the scanning section 110. The signal line SGL extends in a vertical direction (a longitudinal direction in FIG. 18), and is coupled to the readout section 20.

The imaging pixel P11 includes a photodiode PD, a transistor TG, the transistor RST, the floating diffusion FD, and the transistors AMP and SEL. The transistors TG, RST, and SEL are each an N-type MOS transistor in this example. The photodiode PD is a photoelectric conversion element that generates an electric charge in an amount corresponding to an amount of light reception and stores it inside. An anode of the photodiode PD is grounded, and a cathode thereof is coupled to a source of the transistor TG. A gate of the transistor TG is coupled to the control line TGLL, a source thereof is coupled to the cathode of the photodiode PD, and a drain thereof is coupled to the floating diffusion FD. The gate of the transistor RST is coupled to the control line RSTL, and the power supply voltage VDD is supplied to the drain thereof, and the source thereof is coupled to the floating diffusion FD.

This configuration brings the transistor SEL into an ON state in the imaging pixel P11 on the basis of the signal SSEL applied to the control line SELL, thereby causing the imaging pixel P11 to be electrically coupled to the signal line SGL. Further, the imaging pixel P11 outputs, as the signal SIG, the pixel voltage VP corresponding to a voltage in the floating diffusion FD to the signal line SGL. Specifically, the imaging pixel P11 sequentially outputs two pixel voltages VP (VP11 and VP12) during two periods (P-phase period TP and D-phase period TD) within the so-called horizontal period H, as described later.

FIG. 19 illustrates an example of an arrangement of photodiodes PD in the normal pixel region R1. In FIG. 19, "R" denotes a red color filter, "G" denotes a green color filter, and "B" denotes a blue color filter. The photodiodes PD are disposed in matrix.

Description is given next of the light-shielded pixel P12 in the light-shielded pixel region R2. Similarly to the normal pixel region R1 (FIG. 2), the pixel array 109 includes, in the light-shielded pixel region R2, the plurality of control lines TGLL, the plurality of control lines RSTL, the plurality of control lines SELL, and the plurality of signal lines SGL. Similarly to the imaging pixel P11 (FIG. 18), the light-shielded pixel P12 includes the photodiode PD, the transistor TG, the transistor RST, the floating diffusion FD, and the transistors AMP and SEL. Unlike the imaging pixel P11, the light-shielded pixel P12 is shielded from light to prevent light from entering the photodiode PD.

The scanning section 110 (FIG. 17) sequentially drives the imaging pixels P11 and the light-shielded pixels P12 in the pixel array 109 in the unit of pixel line L on the basis of an instruction from the imaging control section 130. The scanning section 110 includes the address decoder 11, a logic section 112, and a driver section 113. The logic section 112 generates each of signals STG1, SRST1, and SSEL1 corresponding to respective pixel lines L on the basis of an instruction from the address decoder 11. The driver section 113 generates each of the signals STG, SRST, and SSEL corresponding to the respective pixel lines L on the basis of the signals STG1, SRST1, and SSEL1 corresponding to the respective pixel lines L.

The imaging control section 130 (FIG. 17) supplies a control signal to the scanning section 110, the readout section 20, and the signal processing section 140, and controls operations of these circuits to thereby control an operation of the imaging device 2. The imaging control section 130 includes a reference signal generator 131. The reference signal generator 131 generates the reference signal REF. The reference signal REF has the so-called ramp waveform in which a voltage level is gradually lowered with lapse of time during the two periods (the P-phase period TP and the D-phase period TD) for performing of the AD conversion.

The signal processing section 140 includes an image processor 141 and a blooming detector 142.

The image processor 141 performs a predetermined image processing on an image represented by the image signal DATA0. The predetermined image processing includes a dark current correction processing, for example. In the dark current correction processing, the image processor 141 subtracts a contributed part of the dark current of the photodiodes PD from the digital code CODE included in the image signal DATA0. Thereafter, the image processor 141 outputs as the image signal DATA a captured image having been subjected to a predetermined image processing.

The blooming detector 142 performs the blooming detection by focusing on two imaging pixels P11A and P11B (FIG. 19) that belong to the same column, and by detecting, on the basis of the digital code CODE included in the image signal DATA0, whether the photodiode PD of the imaging pixel P11A is in a saturated state, whether the photodiode PD of the imaging pixel P11B is in a saturated state, and whether a ratio (the electric charge ratio RQ) between an electric charge amount caused by the photodiode PD of the imaging pixel P11A and an electric charge amount caused by the photodiode PD of the imaging pixel P11B is within a predetermined range. The two imaging pixels P11A and P11B are pixels that are coupled to the same signal line SGL, and are pixels in which color filters of the same color are formed as illustrated in FIG. 19. The imaging pixels P11A and P11B are desirably close to each other.

For example, when a plurality of imaging pixels in a pixel line L to which the imaging pixel P11A belongs is set as a first pixel group and a plurality of imaging pixels in a pixel line L to which the imaging pixel P11B belongs is set as a second pixel group, the plurality of pixels in the first pixel group and the plurality of pixels in the second pixel group are associated with each other to form a plurality of pixel pairs. For example, the imaging pixel P11A and the imaging pixel P11B form a pixel pair. For example, in FIG. 19, a pixel P11C of a green color (G) belonging to the first pixel group and a pixel P11D of a green color (G) belonging to the second pixel group form a pixel pair. For example, a pixel P11E of a red color (R) belonging to the first pixel group and a pixel P11E of a red color (R) belonging to the second pixel group form a pixel pair. It is possible for the blooming detector 142 to perform the blooming detection by detecting, for each of the plurality of pixel pairs, whether the photodiode PD of the imaging pixel P11 belonging to the first pixel group is in a saturated state, whether the photodiode PD of the imaging pixel P11 belonging to the second pixel group is in a saturated state, and whether the ratio of the electric charge amounts between the two photodiodes PD is within a predetermined range.

Likewise, the blooming detector 142 performs the blooming detection, on the basis of the digital code CODE included in the image signal DATA0, by focusing on two light-shielded pixels P12A and P12B that belong to the same column, and by detecting whether the photodiode PD of the light-shielded pixel P12A is in a saturated state, whether the photodiode PD of the light-shielded pixel P12B is in a saturated state, and whether a ratio (the electric charge ratio RQ) between the electric charge amount caused by the photodiode PD of the light-shielded pixel P12A and the electric charge amount caused by the photodiode PD of the light-shielded pixel P12B is within a predetermined range.

As illustrated in FIG. 6, the blooming detector 142 performs the blooming detection on the basis of the digital code CODE (digital code CODEA) of the imaging pixel P11A and the digital code CODE (digital code CODEB) of the imaging pixel P11B. Likewise, the blooming detector 142 performs the blooming detection on the basis of the digital code CODE (digital code CODEA) of the light-shielded pixel P12A and the digital code CODE (digital code CODEB) of the light-shielded pixel P12B.

Here, the imaging pixel P11 and the light-shielded pixel P12 correspond to a specific example of a "pixel" in the present disclosure. The blooming detector 142 corresponds to a specific example of a "diagnosis section" in the present disclosure. The control line TGLL corresponds to a specific example of a "control line" in the present disclosure. The signal line SGL corresponds to a specific example of a "signal line" in the present disclosure. The floating diffusion FD corresponds to a specific example of an "accumulation section" in the present disclosure. The transistor TG corresponds to a specific example of a "transistor" in the present disclosure.

Similarly to the case of the imaging device 1 (FIG. 8), in the imaging device 2, the accumulation start drive D1 and the readout drive D2 are performed.

FIG. 20 illustrates an operation example of the imaging device 2, in which (A) indicates a waveform of the horizontal synchronization signal XHS, (B) indicates a waveform of a signal SRST(0) in a control line RSTL(0) of a 0-th pixel line L, (C) indicates a waveform of a signal STG(0) in a control line TGLL(0) of the 0-th pixel line L, (D) indicates a waveform of a signal SSEL(0) in a control line SELL(0) of the 0-th pixel line L, (E) indicates a waveform of a signal SRST(1) in a control line RSTL(1) of a first pixel line L, (F) indicates a waveform of a signal STG(1) in a control line TGLL(1) of the first pixel line L, (G) indicates a waveform of a signal SSEL(1) in a control line SELL(1) of the first pixel line L, (H) indicates a waveform of a signal SRST(2) in a control line RSTL(2) of a second pixel line L, (I) indicates a waveform of a signal STG(2) in a control line TGLL(2) of the second pixel line L, and (J) indicates a waveform of a signal SSEL(2) in a control line SELL(2) of the second pixel line L.

In the accumulation start drive D1, the scanning section 110 sets the transistors TG and RST to be in an ON state during a predetermined period within the horizontal period H, for example, sequentially from above in the vertical direction in the unit of pixel line L. This allows an electric charge to be accumulated in each of the plurality of pixels P during the accumulation period T10 that lasts until the readout drive D2 is performed.

Further, in the readout drive D2, the scanning section 110 controls operations of the transistors TG, RST, and SEL, for example, sequentially from above in the vertical direction in the unit of pixel line L. This allows each of the plurality of pixels P to sequentially output three pixel voltages (VP11 and VP12). The readout section 120 performs the AD conversion on the basis of each of these two pixel voltages VP11, and VP12 to VP8, and outputs the digital codes CODE.

FIG. 21 illustrates an operation example of the readout drive D2 in the imaging pixel P11A on which focus is made, in which (A) indicates a waveform of the horizontal synchronization signal XHS, (B) indicates a waveform of the signal SRST, (C) indicates a waveform of the signal STG, (D) indicates a waveform of the signal SSEL, (E) indicates a waveform of the reference signal REF, (F) indicates a waveform of the signal SIG, (G) indicates a waveform of the signal CMP outputted from the comparator 24 of the AD conversion section ADC, (H) indicates a waveform of the clock signal CLK, and (I) indicates the count value CNT in the counter 25 of the AD conversion section ADC. Here, in (E) and (F) of FIG. 21, waveforms of the respective signals are indicated in the same voltage axis. The reference signal REF of (E) of FIG. 21 indicates a waveform of the comparator 24 at the positive input terminal, and the signal SIG of (F) of FIG. 22 indicates a waveform of the comparator 24 at the negative input terminal.

In the imaging device 2, in the certain horizontal period (H), the scanning section 110 first performs a reset operation on the imaging pixel P11A, and the AD conversion section ADC performs the AD conversion on the basis of the pixel voltage VP1 outputted by the imaging pixel P11A during the following P-phase period TP. Thereafter, the scanning section 110 performs an electric charge transfer operation on the imaging pixel P11A, and the AD conversion section ADC performs the AD conversion on the basis of the pixel voltage VP2 outputted by the imaging pixel P11A during the D-phase period TD. In the following, this operation is described in detail.

First, when the horizontal period H is started at a timing t91, the scanning section 110 changes the voltage of the signal SSEL from a low level to a high level at a timing t92 ((D) of FIG. 21). This brings the transistor SEL into an ON state in the imaging pixel P11A, causing the imaging pixel P11A to be electrically coupled to the signal line SGL.

Next, at a timing t93, the scanning section 110 changes the voltage of the signal SRST from a low level to a high level ((B) of FIG. 21). This brings the transistor RST into an ON state in the imaging pixel P11A, causing the voltage of the floating diffusion FD to be set at the power supply voltage VDD (reset operation).

Next, at a timing t94, the scanning section 110 changes the voltage of the signal SRST from a high level to a low level ((B) of FIG. 21). This brings the transistor RST into an OFF state in the imaging pixel P11A. Further, the comparator 24 performs the zero adjustment in which the positive input terminal and the negative input terminal are electrically coupled together during a period of timings t94 to t95.

Next, at the timing t95, the comparator 24 ends the zero adjustment to electrically cut the positive input terminal and the negative input terminal from each other. Further, at the timing t95, the reference signal generator 131 changes the voltage of the reference signal REF to the voltage V1 ((E) of FIG. 21).

In the imaging pixel P11A, this brings the transistor SEL into an ON state, and brings each of the transistors TG and RST into an OFF state. The floating diffusion FD retains an electric charge at a time when the floating diffusion FD is reset during the period of the timings t93 to 94. The imaging pixel P11A outputs the pixel voltage VP (the pixel voltage VP11) corresponding to the voltage in the floating diffusion FD at that time.

Next, during a period of timings t96 to t98 (P-phase period TP), the readout section 20 performs the AD conversion on the basis of the pixel voltage VP11. Specifically, first, at the timing t96, the imaging control section 130 starts generating the clock signal CLK ((H) of FIG. 21). At the same time, the reference signal generator 131 starts lowering the voltage of the reference signal REF from the voltage V1 at a predetermined change degree ((E) of FIG. 21). The counter 25 of the AD conversion section ADC accordingly starts the counting operation, and sequentially changes the count value CNT ((I) of FIG. 21).

Further, at a timing t97, the voltage of the reference signal REF falls below the pixel voltage VP11 ((E) and (F) of FIG. 21). The comparator 24 of the AD conversion section ADC accordingly changes the voltage of the signal CMP from a high level to a low level ((G) of FIG. 21). As a result, the counter 25 stops the counting operation ((I) of FIG. 21).

Next, at a timing t98, the imaging control section 130 stops generating the clock signal CLK along with the end of the P-phase period TP ((H) of FIG. 21). At the same time, the reference signal generator 131 stops changing the voltage of the reference signal REF, and changes the voltage of the reference signal REF to the voltage V1 thereafter at a timing t99 ((E) of FIG. 21). Along with this, the voltage of the reference signal REF exceeds the pixel voltage VP11 ((E) and (F) of FIG. 21), and thus the comparator 24 of the AD conversion section ADC changes the voltage of the signal CMP from a low level to a high level ((G) of FIG. 21).

Next, at a timing t100, the counter 25 of the AD conversion section ADC inverts a polarity of the count value CNT on the basis of the control signal CC ((I) of FIG. 21).

Next, at a timing t101, the scanning section 110 changes the voltage of the signal STG from a low level to a high level ((C) of FIG. 21). This brings the transistor TG into an ON state in the imaging pixel P11A. As a result, an electric charge generated at the photodiode PD is transferred to the floating diffusion FD (electric charge transfer operation). The voltage of the signal SIG is lowered accordingly ((F) of FIG. 21).

Thereafter, at a timing t102, the scanning section 110 changes the voltage of the signal STG from a high level to a low level ((C) of FIG. 21). This brings the transistor TG into an OFF state in the imaging pixel P11A.

In the imaging pixel P11A, this brings the transistor SEL into an ON state, and brings each of the transistors TG and RST into an OFF state. The floating diffusion FD retains an electric charge transferred from the photodiode PD during the period of the timings t101 to 102. The imaging pixel P11A outputs the pixel voltage VP (the pixel voltage VP12) corresponding to the voltage in the floating diffusion FD at that time.

Next, during a period of timings t103 to t105 (D-phase period TD), the readout section 20 performs the AD conversion on the basis of the pixel voltage VP12. Specifically, first, at the timing t103, the imaging control section 130 starts generating the clock signal CLK ((H) of FIG. 21). At the same time, the reference signal generator 131 starts lowering the voltage of the reference signal REF from the voltage V1 at a predetermined change degree ((E) of FIG. 21). The counter 25 of the AD conversion section ADC accordingly starts the counting operation, and sequentially changes the count value CNT ((I) of FIG. 21).

Further, at the timing t104, the voltage of the reference signal REF falls below the pixel voltage VP12 ((E) and (F) of FIG. 21). The comparator 24 of the AD conversion section ADC accordingly changes the voltage of the signal CMP from a high level to a low level ((G) of FIG. 21). As a result, the counter 25 stops the counting operation ((I) of FIG. 21). In this manner, the AD conversion section ADC obtains the count value CNT corresponding to a difference between the pixel voltages VP11 and VP12. Thereafter, the latch 26 of the AD conversion section ADC outputs this count value CNT as the digital code CODE.

Next, at a timing t105, the imaging control section 130 stops generating the clock signal CLK along with the end of the D-phase period TD ((H) of FIG. 21). At the same time, the reference signal generator 131 stops changing the voltage of the reference signal REF, and changes the voltage of the reference signal REF to the voltage V2 thereafter at a timing t106 ((E) of FIG. 21). Along with this, the voltage of the reference signal REF exceeds the pixel voltage VP12 ((E) and (F) of FIG. 21), and thus the comparator 24 of the AD conversion section ADC changes the voltage of the signal CMP from a low level to a high level ((G) of FIG. 21).

Next, at a timing t107, the scanning section 110 changes the voltage of the signal SSEL from a high level to a low level ((D) of FIG. 21). This brings the transistor SEL into an OFF state in the imaging pixel P11A, causing the imaging pixel P11A to be electrically separated from the signal line SGL.

Thereafter, at a timing t108, the counter 25 of the AD conversion section ADC resets the count value CNT to "0" on the basis of the control signal CC ((I) of FIG. 21).

In this manner, in the imaging device 2, the counting operation is performed on the basis of the pixel voltage VP11 during the P-phase period TP, the polarity of the count value CNT is inverted, and thereafter the counting operation is performed on the basis of the pixel voltage VP12 during the D-phase period TD. This enables the imaging device 2 to obtain the digital code CODE corresponding to the voltage difference between the pixel voltages VP11 and VP12. In the imaging device 2, such correlated double sampling is performed, thus making it possible to remove a noise component included in the pixel voltage VP12. As a result, it is possible to enhance an image quality of a captured image.

Modification Example 1-3

In the foregoing embodiment, for example, a plurality of pixels coupled to the same control lines TGLL, FDGL, RSTL, FCGL, TGSL, and SELL are arranged in a horizontal direction in the pixel array 9; however, this is not limitative. Alternatively, for example, as in an imaging device 1C illustrated in FIG. 22, a plurality of (in this example, four) pixels coupled to the same control lines TGLL, FDGL, RSTL, FCGL, TGSL, and SELL may be arranged in a vertical direction. The imaging device 1C includes a pixel array 9C, a scanning section 10C, readout sections 20C1 and 20C2, an imaging control section 30C, and a signal processing section 40C. Even-numbered (0-th, second, fourth, ...) signal lines SGL of the pixel array 9C are coupled to the readout section 20C1, and odd-numbered (first, third, fifth, ...) signal lines SGL of the pixel array 9C are coupled to the readout section 20C2. The control lines TGLL, FDGL, RSTL, FCGL, TGSL, and SELL are coupled to the scanning section 10C. In this example, four pixels P coupled to the same control lines TGLL, FDGL, RSTL, FCGL, TGSL, and SELL are arranged in the vertical direction (longitudinal direction in FIG. 22). The scanning section 10C includes a logic section 12C and a driver section 13C. The readout section 20C1 performs the AD conversion on the basis of the signal SIG supplied from the pixel array 9 through the even-numbered signal lines SGL to thereby generate image signal DATAC1. The readout section 20C2 performs the AD conversion on the basis of the signal SIG supplied from the pixel array 9 through the odd-numbered signal lines SGL to thereby generate image signal DATAC2. The signal processing section 40C performs a signal processing on an image represented by each of the image signals DATAC1 and DATAC2.

Modification Example 1-4

In the foregoing embodiment, for example, the blooming detector 42 of the signal processing section 40 performs the blooming detection; however, this is not limitative. In addition, for example, a pixel value of a pixel in which blooming is detected, in a captured image, may be corrected. FIG. 23 illustrates a configuration example of an imaging device 1D according to the present modification example. The imaging device 1D includes a signal processing section 40D. The signal processing section 40D includes a blooming detector 42D and an image processor 41D. Similarly to the blooming detector 42 according to the foregoing embodiment, the blooming detector 42D detects blooming. Further, the blooming detector 42D also has a function of supplying to the image processor 41D coordinate information INF2 for specifying one or a plurality of pixels in which blooming is detected. The image processor 41D has functions of specifying one or a plurality of pixels in which blooming is detected on the basis of this coordinate information INF2, and correcting a pixel value of the one or a plurality of pixels in which blooming is detected on the basis of pixel values of a plurality of pixels surrounding the one or a plurality of pixels.

In this example, the imaging device 1D corrects a pixel value of the pixel in which blooming is detected; however, this is not limitative. A circuit in a stage subsequent to the imaging device 1D may correct the pixel value of the pixel in which blooming is detected. FIG. 24 illustrates a configuration example of an imaging device 1E according to the present modification example. The imaging device 1E includes a signal processing section 40E. The signal processing section 40E includes the blooming detector 42D and the image processor 41. The blooming detector 42D also has a function of outputting the coordinate information INF2 for specifying one or a plurality of pixels in which blooming is detected. A processing device 5 in a stage subsequent to the imaging device 1D specifies one or a plurality of pixels in which blooming is detected on the basis of this coordinate information INF2 supplied from the imaging device 1E, and corrects a pixel value of the one or a plurality of pixels in which blooming is detected on the basis of pixel values of a plurality of pixels surrounding the one or a plurality of pixels, included in the image signal DATA supplied from the imaging device 1E. It is possible for the processing device 5 to be configured using an application processor, etc., for example.

Modification Example 1-5

In the foregoing embodiment, the imaging device 1 is formed on one semiconductor substrate 200 as illustrated in FIG. 7; however, this is not limitative. Alternatively, for example, as in an imaging device 1F illustrated in FIG. 25, formation may be made on a plurality of (in this example, two) semiconductor substrates (semiconductor substrates 301 and 302). In this example, the semiconductor substrate 301 and the semiconductor substrate 302 are overlapped each other, and are coupled to each other through a plurality of vias 303. For example, it is possible for the pixel array 9 to be formed on the semiconductor substrate 301. Further, it is possible for the scanning section 10, the readout section 20, the imaging control section 30, and the signal processing section 40 to be formed on the semiconductor substrate 302. For example, the plurality of control lines TGLL, FDGL, RSTL, FCGL, TGSL, and SELL on the semiconductor substrate 301 are coupled to the scanning section 10 on the semiconductor substrate 302 through a plurality of vias 303A. Further, for example, the plurality of signal lines SGL on the semiconductor substrate 301 are coupled to the readout section 20 on the semiconductor substrate 302 through a plurality of vias 303B. It is to be noted that the disposition of each of the circuits is not limited thereto; for example, the scanning section 10 may be formed on the semiconductor substrate 301.

Modification Example 1-6

In the foregoing embodiment, each of the AD conversion sections ADC is coupled to the plurality of pixels P in one column in the pixel array 9; however, this is not limitative. Alternatively, for example, each of the AD conversion sections ADC may be coupled to a plurality of pixels P belonging to a predetermined area as in an imaging device 1G illustrated in FIG. 26. The imaging device 1G is formed on two semiconductor substrates 401 and 402. The pixel array 9 is formed on the semiconductor substrate 401. The pixel array 9 is divided into a plurality of (in this example, 21) areas AR, and each of the areas AR includes a plurality of (in this example, 16) pixels P. The readout section 20 is formed on the semiconductor substrate 402. Specifically, on the semiconductor substrate 402, the AD conversion section ADC, to be coupled to the plurality of pixels P belonging to an area AR, is formed on each of a plurality of regions corresponding to a respective plurality of areas AR on the semiconductor substrate 401. The semiconductor substrate 401 and the semiconductor substrate 402 are overlapped each other, and are electrically coupled to each other by a coupling section 403 using Cu—Cu coupling, for example. It is to be noted that, in this example, the pixel array 9 is divided into 21 areas AR; however, this is not limitative. Alternatively, the division may be made into 20 areas AR or less, or into 22 areas AR or more. Further, in this example, 160 pixels P are provided in each of the areas AR; however, this is not limitative. Alternatively, for example, 159 pixels P or less or 161 pixels P or more may be provided.

Other Modification Example

Further, two or more of these modification examples may be combined.

2. Use Examples of Imaging Device

FIG. 27 illustrates use examples of the imaging device 1, etc. according to the foregoing embodiment. The above-described imaging device 1, etc. may be used for various cases where, for example, light such as visible light, infrared light, ultraviolet light, and an X-ray is sensed, as described below.

An apparatus that photographs an image to be used for appreciation, such as a digital camera and a mobile phone equipped with a camera function An apparatus to be used for traffic for safety driving including an automatic stop and for recognition, etc. of the state of a driver, such as an vehicle-mounted sensor that photographs a front, a rear, a surrounding, an inside, and the like of an automobile, a monitor camera that monitors traveling vehicles and a road, and a distance measuring sensor that measures a distance between vehicles, etc.

An apparatus to be used for household appliances such as a television, a refrigerator, and an air conditioner, in order to photograph a user's gesture and to perform an equipment operation in accordance with the gesture An apparatus to be used for a medical treatment and a healthcare, such as an endoscope and an apparatus that photographs a blood vessel by means of light reception of infrared light An apparatus to be used for security, such as a monitoring camera for an application of crime prevention and a camera for a person authentication application An apparatus to be used for beauty care, such as a skin measuring instrument that photographs a skin and a microscope that photographs a scalp An apparatus to be used for sports, such as an action camera and a wearable camera for a sports application, etc.

An apparatus to be used for agriculture, such as a camera for monitoring states of fields and crops 3. Example of Application to Mobile Body A technique according to the present disclosure (the present technology) may be applied to various products. For example, the technique according to the present disclosure may be achieved as an apparatus to be mounted on a mobile body of any type, such as an automobile, an electric vehicle, a hybrid electric vehicle, a two-wheeled vehicle, a bicycle, a personal mobility, an aircraft, a drone, a vessel, and a robot.

FIG. 28 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 36, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 36, an audio speaker 12061, a display section 12062, and an instrument panel 12063 are illustrated as the output device. The display section 12062 may, for example, include at least one of an on-board display and a head-up display.

FIG. 29 is a diagram depicting an example of the installation position of the imaging section 12031.

In FIG. 29, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 37 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The description has been given hereinabove of an example of the vehicle control system to which the technique of the present disclosure may be applied. The technique according to the present disclosure may be applied to the imaging section 12031 out of the configurations as described above. This enables the vehicle control system 12000 to diagnose whether the imaging section 12031 operates normally by performing a diagnosis processing. Further, in a case where a malfunction occurs to the imaging section 12031, for example, notifying the microcomputer 12051 of the diagnosis result enables the vehicle control system 12000 to grasp that the malfunction has occurred to the imaging section 12031. This makes it possible to perform a proper processing such as exciting attention from a driver, for example, in the vehicle control system 12000, thus making it possible to enhance reliability. Further, it is possible, in the vehicle control system 12000, to limit functions of controlling a vehicle on the basis of the result of the diagnosis processing. Specific examples of the functions of controlling a vehicle include a function of collision avoidance or shock mitigation for the vehicle, a following driving function based on a following distance, a vehicle speed maintaining driving function, a function of warning collision of the vehicle, a function of warning of deviation of the vehicle from a lane, and the like. In a case where determination is made that a malfunction has occurred to the imaging section 12031 as a result of the diagnosis processing, it is possible to limit or prohibit functions of controlling the vehicle. Specifically, it is possible for the vehicle control system 12000 to control a brake, an engine output, and a transmission. This makes it possible, in the vehicle control system 12000, to prevent an accident caused by a detection error based on the malfunction of the imaging section 12031.

Further, for example, in a case where the vehicle control system 12000 includes two redundant imaging sections 12031 (imaging sections 12031A and 12031B), when determination is made that a malfunction has occurred to one imaging section 12031A, the other imaging section 12031B may be operated. Further, for example, in a case where the vehicle control system 12000 includes, in addition to the imaging section 12031, a distance measuring section (e.g., a LIDAR device (Light Detection and Ranging) or a TOF (Time Of Flight) image sensor) that detects a distance to a target object, when determination is made that a malfunction has occurred to the imaging section 12031, the distance measuring section may be operated. Even in this case, it is possible to detect at least the distance to the target object, thus making it possible to prevent the accident caused by a detection error based on the malfunction of the imaging section 12031.

The description has been given of the present technology with reference to the embodiment, the modification examples, and specific application examples thereof. However, the present technology is not limited to the embodiment, etc., and may be modified in a variety of ways.

For example, as illustrated in FIG. 12, in the imaging device 1, the readout section 20 outputs the digital codes CODE2 and CODE3, and the image processor 41 subtracts the digital code CODE2 from the digital code CODE3

(CODE3−CODE2) to thereby calculate the pixel value VAL1; however, this is not limitative. Alternatively, similarly to the case of the imaging device 2 according to the second embodiment (FIG. 21), the readout section 20 may output a digital code CODE corresponding to a difference between the digital codes CODE2 and CODE3 by inverting the polarity of the count value CNT after the conversion period T2. The same holds true also for the digital codes CODE5 and CODE6, and the same holds true also for the digital codes CODE7 and CODER.

Further, for example, as illustrated in FIG. 12, in the imaging device 1, the readout section 20 outputs the digital codes CODE1 and CODE4, and the image processor 41 subtracts the digital code CODE1 from the digital code CODE4 (CODE4−CODE1) to thereby calculate the pixel value VAL2; however, this is not limitative. Alternatively, after the conversion period T1, the readout section 20 may store once the count value CNT at that time inside, and, before the conversion period T4, may set the count value CNT in the counter 25 and invert the polarity of the count value CNT. Even in this case, similarly to the case of the imaging device 2 according to the second embodiment (FIG. 21), it is possible for the readout section 20 to output a digital code CODE corresponding to a difference between the digital codes CODE1 and CODE4.

Further, for example, the imaging device 1 is not limited to the configuration illustrated in FIG. 1, etc., and may be changed where appropriate. Likewise, for example, the imaging device 2 is not limited to the configuration illustrated in FIG. 17, etc., and may be changed where appropriate.

It is to be noted that the effects described herein are merely exemplified and are not limitative, and may have other effects.

It is to be noted that the present technology may include the following configurations.

(1)
An imaging device including:
a plurality of pixels each including a first light-receiving element and a second light-receiving element, the plurality of pixels including a first pixel;
a generating section that is able to generate a first detection value on a basis of a light-receiving result by the first light-receiving element of each of the plurality of pixels, and is able to generate a second detection value on a basis of a light-receiving result by the second light-receiving element of each of the plurality of pixels; and
a diagnosis section that is able to perform a diagnosis processing on a basis of a detection ratio that is a ratio between the first detection value and the second detection value in the first pixel.

(2)
The imaging device according to (1), in which the diagnosis section is able to perform the diagnosis processing also on a basis of whether the first detection value in the first pixel is saturated and whether the second detection value in the first pixel is saturated, in addition to the detection ratio in the first pixel.

(3)
The imaging device according to (2), in which
the plurality of pixels further include a second pixel, and
the diagnosis section is able to perform the diagnosis processing further on a basis of the detection ratio in the second pixel, whether the second detection value in the second pixel is saturated, and whether the second detection value in the second pixel is saturated.

(4)
The imaging device according to (2) or (3), in which the diagnosis section is able to perform the diagnosis processing by generating a detection pattern on a basis of whether the detection ratio is within a predetermined detection ratio range, whether the first detection value is saturated, and whether the second detection value is saturated, in each of the plurality of pixels, and by comparing the detection pattern with a predetermined reference pattern.

(5)
The imaging device according to any one of (1) to (4), further including a first control line, in which the plurality of pixels each further include
a first accumulation section that is able to accumulate an electric charge,
a first transistor that is able to couple the first light-receiving element to the first accumulation section on a basis of a voltage in the first control line, and
an output section that is able to output a signal corresponding to a voltage in the first accumulation section.

(6)
The imaging device according to (5), further including: a second control line; a third control line; a fourth control line; and a fifth control line, in which the plurality of pixels each further include a second transistor that is able to apply a predetermined voltage to a predetermined node on a basis of a voltage in the second control line,
a third transistor that is able to couple the predetermined node and the first accumulation section with each other on a basis of a voltage in the third control line,
a second accumulation section that is able to accumulate an electric charge,
a fourth transistor that is able to couple the second light-receiving element and the second accumulation section with each other on a basis of a voltage in the fourth control line, and
a fifth transistor that is able to couple the second accumulation section and the predetermined node with each other on a basis of a voltage in the fifth control line.

(7)
The imaging device according to any one of (1) to (6), in which a size of a light-receiving region of the first light-receiving element is different from a size of a light-receiving region of the second light-receiving element.

(8)
The imaging device according to any one of (1) to (7), in which, in each of the pixels, a color of light receivable by the first light-receiving element is same as a color of light receivable by the second light-receiving element.

(9)
The imaging device according to any one of (1) to (8), in which the diagnosis section is able to perform the diagnosis processing in a case where illuminance is within a predetermined range.

(10)
The imaging device according to any one of (1) to (9), in which the generating section includes a conversion circuit that is able to generate the first detection value by performing an AD conversion on the basis of the light-receiving result by the first light-receiving element of each of the plurality of pixels, and is able to generate the second detection value by performing the AD conversion on the basis of the light-receiving result by the second light-receiving element of each of the plurality of pixels.

(11)

An imaging device including:

a plurality of pixels each including a light-receiving element, the plurality of pixels being divided into a first pixel group and a second pixel group;

a generating section that is able to generate a first detection value on a basis of a light-receiving result by the light-receiving element of each of the plurality of pixels belonging to the first pixel group, and is able to generate a second detection value on a basis of a light-receiving result by the light-receiving element of each of the plurality of pixels belonging to the second pixel group; and a diagnosis section, in which the plurality of pixels belonging to the first pixel group and the plurality of pixels belonging to the second pixel group are associated with each other respectively to form a plurality of pixel pairs, the plurality of pixel pairs include a first pixel pair, and the diagnosis section is able to perform a diagnosis processing on a basis of a detection ratio that is a ratio between the first detection value and the second detection value in the first pixel pair.

(12)

The imaging device according to (11), in which the diagnosis section is able to perform the diagnosis processing also on a basis of whether the first detection value in the first pixel pair is saturated and whether the second detection value in the first pixel pair is saturated, in addition to the detection ratio in the first pixel pair.

(13)

The imaging device according to (12), in which the plurality of pixel pairs include a second pixel pair, and the diagnosis section is able to perform the diagnosis processing further on a basis of the detection ratio in the second pixel pair, whether the first detection value in the second pixel pair is saturated, and whether the second detection value in the second pixel pair is saturated.

(14)

The imaging device according to (12) or (13), in which the diagnosis section is able to perform the diagnosis processing by generating a detection pattern on a basis of whether the detection ratio is within a predetermined detection ratio range, whether the first detection value is saturated, and whether the second detection value is saturated, in each of the plurality of pixel pairs, and by comparing the detection pattern with a predetermined reference pattern.

(15)

The imaging device according to any one of (11) to (14), further including a signal line, in which each of two pixels of the first pixel pair each further include an accumulation section that is able to accumulate an electric charge, a transistor that is able to couple the light-receiving element to the accumulation section by being brought into an ON state, and an output section that is able to output to the signal line a signal corresponding to a voltage in the accumulation section.

(16)

The imaging device according to any one of (11) to (15), in which colors of light beams receivable by the respective light-receiving elements of the two pixels in each of the pixel pairs are same as each other.

(17)

The imaging device according to any one of (11) to (16), further including a control line, in which the plurality of pixels belonging to the first pixel group each further include an accumulation section that is able to accumulate an electric charge, a transistor that is able to couple the light-receiving element to the accumulation section on a basis of a voltage in the control line, and an output section that is able to output the signal corresponding to the voltage in the accumulation section.

(18)

A diagnosis method including:

generating a first detection value on a basis of a light-receiving result by a first light-receiving element of each of a plurality of pixels each including the first light-receiving element and a second light-receiving element;

generating a second detection value on a basis of a light-receiving result by the second light-receiving element of each of the plurality of pixels; and performing a diagnosis processing on a basis of a detection ratio that is a ratio between the first detection value and the second detection value in a first pixel of the plurality of pixels.

(19)

A diagnosis method including:

generating a first detection value on a basis of a light-receiving result by a light-receiving element of each of a plurality of pixels belonging to a first pixel group of a plurality of pixels that each include the light-receiving element and are divided into the first pixel group and a second pixel group;

generating a second detection value on a basis of a light-receiving result by the light-receiving element of each of a plurality of pixels belonging to the second pixel group; and performing a diagnosis processing on a basis of a detection ratio that is a ratio between the first detection value and the second detection value in a first pixel pair of a plurality of pixel pairs formed by the plurality of pixels belonging to the first pixel group and the plurality of pixels belonging to the second pixel group that are associated with each other respectively.

REFERENCE SIGNS LIST 1, 1C, 1D, 1E, 1F, 1G, and 2 imaging device
5 processing device
9, 9C, and 109 pixel array
10, 10C, and 110 scanning section
11 address decoder
12, 12C, and 112 logic section
13, 13C, and 113 driver section
20, 20C1, and 20C2 readout section
21 and 22 capacitor element
23 current source
24 comparator
25 counter
26 latch
30, 30C, and 130 imaging control section
31 and 131 reference signal generator
40, 40C, 40D, 40E, and 140 signal processing section
41, 41D, and 141 image processor
42, 42D, and 142 blooming detector
43 saturation determiner
44 electric charge ratio determiner
45 pattern determiner
46 and 47 register
51 and 53 multiplication circuit
52 and 54 comparator
55 OR circuit 100 imaging system
101 lens
102 shutter
103 imaging section
104 controller
200 semiconductor substrate
201 logic circuit section
202 and 203 terminal section
301 and 302 semiconductor substrate
303 via
401 and 402 semiconductor substrate
AMP, FCG, FDG, RST, SEL, TG, TGL, and TGS transistor
BUS bus wiring line
CC control signal
CLK clock signal
CODE and CODE1 to CODE8 digital code
DATA, DATA0, DATAC1, and DATAC2 image signal
D1 accumulation start drive
D2 readout drive
ER detection flag signal
FC capacitor element
FCGL, FDGL, RSTL, SELL, TGLL, and TGSL control line
FD floating diffusion
INF set value information
INF2 coordinate information
L pixel line
P pixel
P1 and P11 imaging pixel
P2 and P12 light-shielded pixel
PAT determination result pattern
PATR reference pattern
PD, PD1, and PD2 photodiode
REF reference signal
R1 normal pixel region
R2 light-shielded pixel region
SFCG, SFDG, SIG, SRST, SSEL, STG, STGL, and STGS signal
SSW control signal
SW switch section
THmax and THmin threshold value
T10 accumulation period
T20 blanking period
VAL1 to VAL4 pixel value
VP1 to VP8, VP11, and VP12 pixel voltage
XHS horizontal synchronization signal

The invention claimed is:

1. An imaging device comprising:
a plurality of pixels, wherein each pixel of the plurality of pixels includes a first light-receiving element and a second light-receiving element, and wherein the plurality of pixels include a first pixel;
a generating circuit that is able to:
generate aa first detection value on a basis of a light-receiving result by the first light-receiving element of each of the plurality of pixels and (ii) a second detection value on a basis of a light-receiving result by the second light-receiving element of each of the plurality of pixels; and
a diagnosis circuit that is able to perform a diagnosis processing on a basis of a detection ratio that is a ratio between the first detection value and the second detection value in the first pixel.

2. The imaging device according to claim 1, wherein the diagnosis circuit is able to perform the diagnosis processing further on a basis of whether the first detection value in the first pixel is saturated and whether the second detection value in the first pixel is saturated, in addition to the detection ratio in the first pixel.

3. The imaging device according to claim 2, wherein
the plurality of pixels further include a second pixel, and
the diagnosis circuit is able to perform the diagnosis processing further on a basis of a detection ratio in the second pixel, whether the first detection value in the second pixel is saturated, and whether the second detection value in the second pixel is saturated, wherein the detection ratio in the second pixel is a ratio between the first detection value and the second detection value in the second pixel.

4. The imaging device according to claim 2, wherein the diagnosis circuit is able to perform the diagnosis processing by generation of a detection pattern on a basis of whether the detection ratio is within a predetermined detection ratio range, whether the first detection value is saturated, and whether the second detection value is saturated, in each of the plurality of pixels, and by a comparison of the detection pattern with a predetermined reference pattern.

5. The imaging device according to claim 1, further comprising a first control line, wherein each pixel of the plurality of pixels further includes:
a first accumulation circuit that is able to accumulate an electric charge;
a first transistor that is able to couple the first light-receiving element to the first accumulation circuit on a basis of a voltage in the first control line; and
an output circuit that is able to output a signal that corresponds to a voltage in the first accumulation circuit.

6. The imaging device according to claim 5, further comprising:
a second control line;
a third control line;
a fourth control line; and
a fifth control line, wherein each pixel of the plurality of pixels further includes:
a second transistor that is able to apply a predetermined voltage to a predetermined node on a basis of a voltage in the second control line;
a third transistor that is able to couple the predetermined node and the first accumulation circuit with each other on a basis of a voltage in the third control line;
a second accumulation circuit that is able to accumulate an electric charge;
a fourth transistor that is able to couple the second light-receiving element and the second accumulation circuit with each other on a basis of a voltage in the fourth control line; and
a fifth transistor that is able to couple the second accumulation circuit and the predetermined node with each other on a basis of a voltage in the fifth control line.

7. The imaging device according to claim 1, wherein a size of a light-receiving region of the first light-receiving element is different from a size of a light-receiving region of the second light-receiving element.

8. The imaging device according to claim 1, wherein, in each of the plurality of pixels, a color of light receivable by the first light-receiving element is same as a color of light receivable by the second light-receiving element.

9. The imaging device according to claim 1, wherein the diagnosis circuit is able to perform the diagnosis processing in a case where illuminance is within a predetermined range.

10. The imaging device according to claim 1, wherein the generating circuit includes a conversion circuit that is able to:
generate the first detection value by an AD conversion on a basis of the light-receiving result by the first light-receiving element of each of the plurality of pixels; and
generate the second detection value by an AD conversion on a basis of the light-receiving result by the second light-receiving element of each of the plurality of pixels.

11. An imaging device comprising:
a plurality of pixels, wherein each pixel of the plurality of pixels includes a light-receiving element, the plurality of pixels are divided into a first pixel group and a second pixel group;
a generating circuit that is able to generate (i) a first detection value on a basis of a light-receiving result by the light-receiving element of each of the plurality of pixels that belong to the first pixel group, and (ii) a second detection value on a basis of a light-receiving result by the light-receiving element of each of the plurality of pixels that belong to the second pixel group; and
a diagnosis circuit, wherein
the plurality of pixels that belong to the first pixel group and the plurality of pixels that belong to the second pixel group are associated with each other respectively to form a plurality of pixel pairs,
colors of light beams receivable by the respective light-receiving elements of each pixel in each of the pixel pairs are same as each other,
the plurality of pixel pairs include a first pixel pair, and
the diagnosis circuit is able to perform a diagnosis processing on a basis of a detection ratio that is a ratio between the first detection value and the second detection value in the first pixel pair.

12. The imaging device according to claim 11, wherein the diagnosis circuit is able to perform the diagnosis processing further on a basis of whether the first detection value in the first pixel pair is saturated and whether the second detection value in the first pixel pair is saturated, in addition to the detection ratio in the first pixel pair.

13. The imaging device according to claim 12, wherein the plurality of pixel pairs further include a second pixel pair, and
the diagnosis circuit is able to perform the diagnosis processing further on a basis of a detection ratio in the second pixel pair, whether the first detection value in the second pixel pair is saturated, and whether the second detection value in the second pixel pair is saturated, wherein the detection ratio in the second pixel pair is a ratio between the first detection value and the second detection value in the second pixel pair.

14. The imaging device according to claim 12, wherein the diagnosis circuit is able to perform the diagnosis processing by generation of a detection pattern on a basis of whether the detection ratio is within a predetermined detection ratio range, whether the first detection value is saturated, and whether the second detection value is saturated, in each of the plurality of pixel pairs, and by comparison of the detection pattern with a predetermined reference pattern.

15. The imaging device according to claim 11, further comprising a signal line, wherein each of two pixels of the first pixel pair further include:
an accumulation circuit that is able to accumulate an electric charge;
a transistor that is able to couple the light-receiving element to the accumulation circuit by being brought into an ON state; and
an output circuit that is able to output to the signal line a signal corresponding to a voltage in the accumulation circuit.

16. The imaging device according to claim 11, further comprising a control line, wherein each of the plurality of pixels that belongs to the first pixel group further includes:
an accumulation circuit that is able to accumulate an electric charge;
a transistor that is able to couple the light-receiving element to the accumulation circuit on a basis of a voltage in the control line; and
an output circuit that is able to output a signal corresponding to a voltage in the accumulation circuit.

17. A diagnosis method comprising:
generating, by a circuit, a first detection value on a basis of a light-receiving result by a first light-receiving element of each of a plurality of pixels, wherein each pixel of the plurality of pixels includes the first light-receiving element and a second light-receiving element;
generating, by the circuit, a second detection value on a basis of a light-receiving result by the second light-receiving element of each of the plurality of pixels; and
performing, by the circuit, a diagnosis processing on a basis of a detection ratio that is a ratio between the first detection value and the second detection value in a first pixel of the plurality of pixels.

18. A diagnosis method comprising:
generating, by a circuit, a first detection value on a basis of a light-receiving result by a light-receiving element of each of a plurality of pixels belonging to a first pixel group;
generating, by the circuit, a second detection value on a basis of a light-receiving result by a light-receiving element of each of a plurality of pixels belonging to a second pixel group, wherein a plurality of pixels each including the light-receiving element are divided into the first pixel group and the second pixel group; and
performing, by the circuit, a diagnosis processing on a basis of a detection ratio that is a ratio between the first detection value and the second detection value in a first pixel pair of a plurality of pixel pairs, wherein the plurality of pixel pairs are formed by the plurality of pixels belonging to the first pixel group and the plurality of pixels belonging to the second pixel group that are associated with each other respectively, and wherein colors of light beams receivable by the respective light-receiving elements of each pixel in each of the plurality of pixel pairs are same as each other.

* * * * *